(12) United States Patent
Dietle

(10) Patent No.: US 10,330,203 B2
(45) Date of Patent: Jun. 25, 2019

(54) HIGH PRESSURE DYNAMIC SEALING DEVICE

(71) Applicant: KALSI ENGINEERING INC., Sugar Land, TX (US)

(72) Inventor: Lannie Laroy Dietle, Houston, TX (US)

(73) Assignee: KALSI ENGINEERING INC., Sugar Land, TX (US)

( * ) Notice: Subject to any disclaimer, the term of this patent is extended or adjusted under 35 U.S.C. 154(b) by 55 days.

(21) Appl. No.: 15/833,593

(22) Filed: Dec. 6, 2017

(65) Prior Publication Data

US 2018/0216735 A1 Aug. 2, 2018

Related U.S. Application Data

(60) Provisional application No. 62/600,949, filed on Mar. 6, 2017, provisional application No. 62/498,823, filed on Jan. 6, 2017.

(51) Int. Cl.
*F16J 15/34* (2006.01)
*F16J 15/16* (2006.01)
(Continued)

(52) U.S. Cl.
CPC ......... *F16J 15/3268* (2013.01); *F16J 15/166* (2013.01); *F16J 15/441* (2013.01); *F16J 15/3404* (2013.01)

(58) Field of Classification Search
CPC .... F16J 15/166; F16J 15/3244; F16J 15/3404; F16J 15/38; F16J 15/441
See application file for complete search history.

(56) References Cited

U.S. PATENT DOCUMENTS

| 2,253,932 A | 8/1941 | Gilkerson |
| 2,394,800 A | 2/1946 | Murphy |

(Continued)

FOREIGN PATENT DOCUMENTS

| JP | 01-152151 U | 10/1989 |
| JP | 06-147327 A | 5/1994 |

(Continued)

OTHER PUBLICATIONS

English Machine Translation of JP 06-147327.
(Continued)

*Primary Examiner* — Nicholas L Foster
(74) *Attorney, Agent, or Firm* — Bracewell LLP; Douglas W. Rommelmann

(57) ABSTRACT

A sealing assembly includes a first machine component having a seal groove defined by radially oriented jacket support and energizer positioning walls and an energizer compressing wall that faces axially toward a second machine component. A seal located within the seal groove has an energizer element and a telescoping jacket. The jacket has a first leg portion having a jacket sealing surface facing toward the second machine component and an energizer contacting wall facing toward the energizer element. The energizer element is compressed between the energizer contacting and energizer compressing walls and loads the jacket sealing surface against the second machine component. A jacket second leg portion extends generally axially and has an energizer supporting wall facing toward the energizer element and a supported wall facing radially and adjoining the jacket support wall. The second leg portion is interposed between the energizer element and the jacket support wall.

36 Claims, 5 Drawing Sheets

(51) Int. Cl.
*F16J 15/44* (2006.01)
*F16J 15/3268* (2016.01)

(56) References Cited

U.S. PATENT DOCUMENTS

| | | |
|---|---|---|
| 2,442,687 A | 6/1948 | Heathcott |
| 2,459,472 A | 1/1949 | Tremolada |
| 2,520,306 A | 8/1950 | Detweiler |
| 2,608,385 A | 8/1952 | Stahl |
| 2,706,655 A | 4/1955 | Showalter |
| 2,728,620 A | 12/1955 | Krueger |
| 2,934,368 A | 4/1960 | Adamson |
| 2,998,288 A | 4/1961 | Newhouse |
| 3,271,039 A | 9/1966 | Kohl |
| 3,305,241 A | 2/1967 | Hart |
| 3,497,225 A | 2/1970 | Workman |
| 3,544,118 A | 12/1970 | Klein |
| 3,575,424 A | 4/1971 | Taschenberg |
| 3,627,337 A | 12/1971 | Pippert |
| 3,730,284 A | 5/1973 | Striegler |
| 3,801,114 A | 4/1974 | Bentley |
| 3,848,880 A | 11/1974 | Tanner |
| 3,868,105 A | 2/1975 | Bentley |
| 3,887,198 A | 6/1975 | McClure et al. |
| 3,921,987 A | 11/1975 | Johnston et al. |
| 3,923,315 A | 12/1975 | Hadaway |
| 3,929,340 A | 12/1975 | Peisker |
| 3,970,321 A | 7/1976 | Dechavanne |
| 3,973,781 A | 8/1976 | Groich |
| 3,984,113 A | 10/1976 | Bentley |
| 4,084,826 A | 4/1978 | Vossieck et al. |
| 4,094,519 A | 6/1978 | Heyn et al. |
| 4,114,900 A | 9/1978 | Wiese |
| 4,118,856 A | 10/1978 | Bainard et al. |
| 4,183,543 A | 1/1980 | Antonini |
| 4,240,676 A | 12/1980 | Anderson et al. |
| 4,288,083 A | 9/1981 | Braconier |
| 4,336,945 A | 6/1982 | Christiansen et al. |
| 4,387,902 A | 6/1983 | Conover |
| 4,421,425 A | 12/1983 | Foucher et al. |
| 4,440,405 A | 4/1984 | Schaus et al. |
| 4,441,722 A | 4/1984 | Pichler |
| 4,484,753 A | 11/1984 | Kalsi |
| 4,496,251 A | 1/1985 | Ide |
| 4,501,431 A | 2/1985 | Peisker et al. |
| 4,515,486 A | 5/1985 | Ide |
| 4,602,806 A | 7/1986 | Saliger |
| 4,610,319 A | 9/1986 | Kalsi |
| 4,619,534 A | 10/1986 | Daly |
| 4,671,519 A | 6/1987 | Bras |
| 4,676,668 A | 6/1987 | Ide |
| 4,695,063 A | 9/1987 | Schmitt et al. |
| 4,705,277 A | 11/1987 | Repella |
| 4,717,160 A | 1/1988 | Zitting et al. |
| 4,726,695 A | 2/1988 | Showalter |
| 4,729,569 A | 3/1988 | Muller et al. |
| 4,739,998 A | 4/1988 | Steusloff et al. |
| 4,750,747 A | 6/1988 | Holzer |
| 4,770,548 A | 9/1988 | Otto |
| 4,783,086 A | 11/1988 | Bras et al. |
| 4,789,166 A | 12/1988 | Rericha et al. |
| 4,848,774 A | 7/1989 | Nyilas et al. |
| 5,002,289 A | 3/1991 | Yasui et al. |
| 5,024,364 A | 6/1991 | Nash |
| 5,046,906 A | 9/1991 | Bucknell |
| 5,054,938 A | 10/1991 | Ide |
| 5,066,144 A | 11/1991 | Ide |
| 5,102,236 A | 4/1992 | Ide |
| 5,112,143 A | 5/1992 | Ide |
| 5,137,373 A | 8/1992 | Ide |
| 5,139,275 A | 8/1992 | Ehrmann et al. |
| 5,172,921 A | 12/1992 | Stendlund |
| 5,178,215 A | 1/1993 | Glenn |
| 5,188,462 A | 2/1993 | Hooper et al. |
| 5,190,299 A | 3/1993 | Johnston |
| 5,195,754 A | 3/1993 | Dietle |
| 5,195,757 A | 3/1993 | Dahll |
| 5,199,514 A | 4/1993 | Titus |
| 5,222,815 A | 6/1993 | Ide |
| 5,224,557 A | 7/1993 | Yenulis et al. |
| 5,230,520 A | 7/1993 | Dietle et al. |
| 5,265,964 A | 11/1993 | Hooper |
| 5,279,365 A | 1/1994 | Yenulis et al. |
| 5,284,392 A | 2/1994 | Ide |
| 5,306,021 A | 4/1994 | Morvant |
| 5,372,431 A | 12/1994 | Ide |
| 5,427,387 A | 6/1995 | Johnston |
| 5,489,155 A | 2/1996 | Ide |
| 5,503,479 A | 4/1996 | Ide |
| 5,511,886 A | 4/1996 | Sink |
| 5,513,917 A | 5/1996 | Ide et al. |
| 5,527,045 A | 6/1996 | Pondelick |
| 5,558,444 A | 9/1996 | Ide |
| 5,588,491 A | 12/1996 | Brugman et al. |
| 5,593,231 A | 1/1997 | Ippolito |
| 5,647,444 A | 7/1997 | Williams |
| 5,662,171 A | 9/1997 | Brugman et al. |
| 5,662,181 A | 9/1997 | Williams |
| 5,662,335 A | 9/1997 | Larsen |
| 5,664,888 A | 9/1997 | Sabin |
| 5,678,829 A | 10/1997 | Kalsi et al. |
| 5,692,757 A | 12/1997 | Straub |
| 5,711,534 A | 1/1998 | Bengoa et al. |
| 5,738,358 A | 4/1998 | Kalsi et al. |
| 5,791,658 A | 8/1998 | Johnston |
| 5,823,541 A | 10/1998 | Dietle et al. |
| 5,829,338 A | 11/1998 | Chrestoff et al. |
| 5,873,576 A | 2/1999 | Dietle et al. |
| 5,915,696 A | 6/1999 | Onuma et al. |
| 5,921,555 A | 7/1999 | Johnston |
| 5,938,344 A | 8/1999 | Sabin |
| 6,007,105 A | 12/1999 | Dietle et al. |
| 6,016,880 A | 1/2000 | Hall et al. |
| 6,036,192 A | 3/2000 | Dietle et al. |
| 6,105,968 A | 8/2000 | Yen et al. |
| 6,109,618 A | 8/2000 | Dietle |
| 6,120,036 A | 9/2000 | Kalsi et al. |
| 6,139,020 A | 10/2000 | Friend et al. |
| 6,182,750 B1 | 2/2001 | Edwards et al. |
| 6,189,896 B1 | 2/2001 | Dickey et al. |
| 6,227,547 B1 | 5/2001 | Dietle et al. |
| 6,315,302 B1 | 11/2001 | Conroy et al. |
| 6,334,619 B1 | 1/2002 | Dietle et al. |
| 6,354,374 B1 | 3/2002 | Edwards et al. |
| 6,371,488 B1 | 4/2002 | Szymborski et al. |
| 6,382,634 B1 | 5/2002 | Dietle et al. |
| 6,416,225 B1 | 7/2002 | Cioceanu et al. |
| 6,460,635 B1 | 10/2002 | Kalsi et al. |
| 6,467,774 B1 | 10/2002 | Amaral et al. |
| 6,481,720 B1 | 11/2002 | Yoshida et al. |
| 6,494,462 B2 | 12/2002 | Dietle |
| 6,554,016 B2 | 4/2003 | Kinder |
| 6,561,520 B2 | 5/2003 | Kalsi et al. |
| 6,619,664 B1 | 9/2003 | Metz |
| 6,685,194 B2 | 2/2004 | Dietle et al. |
| 6,688,603 B2 | 2/2004 | Schemm |
| 6,749,172 B2 | 6/2004 | Kinder |
| 6,767,016 B2 | 7/2004 | Gobeli et al. |
| 7,004,444 B2 | 2/2006 | Kinder |
| 7,007,913 B2 | 3/2006 | Kinder |
| 7,052,020 B2 | 5/2006 | Gobeli et al. |
| 7,341,258 B2 | 3/2008 | Holt et al. |
| 7,562,878 B2 | 7/2009 | Dietle et al. |
| 7,770,898 B2 | 8/2010 | Dietle et al. |
| 7,798,496 B2 | 9/2010 | Dietle et al. |
| 7,934,545 B2 | 5/2011 | Bailey et al. |
| 8,083,235 B2 | 12/2011 | Azibert et al. |
| 8,282,107 B2 | 10/2012 | Horiba et al. |
| 9,429,238 B2 * | 8/2016 | Richie .................. F16J 15/441 |
| 2001/0024016 A1 | 9/2001 | Gobeli et al. |
| 2003/0205864 A1 | 11/2003 | Dietle et al. |
| 2005/0156386 A1 | 7/2005 | Ota et al. |
| 2006/0066058 A1 | 3/2006 | Holt et al. |
| 2006/0171616 A1 | 8/2006 | Richie et al. |

(56) References Cited

U.S. PATENT DOCUMENTS

| | | |
|---|---|---|
| 2006/0214379 A1 | 9/2006 | James et al. |
| 2007/0013143 A1 | 1/2007 | Schroeder et al. |
| 2007/0160314 A1 | 7/2007 | Richie et al. |
| 2009/0001671 A1 | 1/2009 | Dietle et al. |
| 2010/0259015 A1 | 10/2010 | Dietle |
| 2010/0264603 A1 | 10/2010 | Schroeder et al. |
| 2011/0127725 A1 | 6/2011 | Dietle et al. |
| 2012/0038113 A1 | 2/2012 | Dietle et al. |
| 2014/0035238 A1* | 2/2014 | Richie .................. F16J 15/441 277/559 |
| 2016/0356382 A1 | 12/2016 | Dietle et al. |
| 2018/0216735 A1* | 8/2018 | Dietle .................. F16J 15/166 |

FOREIGN PATENT DOCUMENTS

| | | |
|---|---|---|
| WO | 00/71914 A1 | 11/2000 |
| WO | 2008029786 A1 | 3/2008 |
| WO | 2015182408 A1 | 12/2015 |

OTHER PUBLICATIONS

English Machine Translation of JP 01-152151.
International Search Report and Written Opinion dated Apr. 20, 2018 for corresponding PCT/US2017/068511.
English Machine Translation of WO 2015182408 (NOK Corporation) dated Dec. 3, 2015, "Sealing Structure and Sealing Device".

* cited by examiner

HIGH PRESSURE DYNAMIC SEALING DEVICE

CROSS-REFERENCE TO RELATED APPLICATIONS

This application claims the benefit of U.S. Provisional Application Ser. No. 62/498,823 filed on Jan. 6, 2017, by Lannie Laroy Dietle and entitled "High Pressure Dynamic Sealing Arrangement With Backup Shoe," and claims the benefit of U.S. Provisional Application Ser. No. 62/600,949 filed on Mar. 6, 2017, by Lannie Dietle and entitled "High Pressure Dynamic Sealing Arrangement With Backup Shoe With Torsion Control."

STATEMENT OF FEDERALLY SPONSORED RESEARCH OR DEVELOPMENT

Not applicable.

BACKGROUND OF THE INVENTION

1. Field of the Invention

The present invention is related to equipment having a relatively movable shaft element, where a pressure-retaining seal establishes sealing contact with the relatively movable shaft element to retain a pressurized first fluid and partition the first fluid from a second fluid having lower pressure. Examples of relatively movable shaft elements include those that have relative rotation and/or relative reciprocation with respect to the pressure-retaining seal and/or relative lateral motion with respect to other components of the equipment.

The present invention is also related to a sealing assembly that applies the pressures of the first and second fluids to controlled locations on a backup ring in order to provide relative immunity to pressure-induced distortion, and in order to provide opposed axially acting hydraulic forces that substantially balance one another, allowing the backup ring to align on the shaft element and follow lateral deflection and runout of the shaft element, allowing the backup ring to define a small initial extrusion gap for the pressure-retaining seal, minimizing pressure-induced extrusion damage thereof.

More specifically, the present invention is related to a sealing assembly that applies the pressure of the first fluid to a projection outer surface of the backup ring to minimize pressure induced distortion of the backup ring, and applies extrusion resistant, self-aligning telescoping jackets to hydraulic area-defining face seals to accommodate the increased face seal extrusion gaps that can occur because of incorporating the projection outer surface.

2. Description of the Related Art

The most relevant prior art is described in commonly assigned U.S. Pat. No. 9,429,238, entitled "Dynamic Backup Ring Assembly," and commonly assigned U.S. patent application Ser. No. 15/240,823, entitled "High Pressure Dynamic Sealing Arrangement."

SUMMARY OF THE INVENTION

The invention is a sealing assembly for equipment with a relatively movable shaft element that prevents the loss of a fluid through clearance surrounding the shaft element. Within this specification, the word "element" in the name "shaft element" is based on one of the typical definitions of the word "element", i.e., a specific component of a device.

Although appropriate for a variety of equipment having a relatively movable shaft element, the invention is disclosed herein in the context of a sealing assembly where the shaft element may have dynamic runout and lateral deflection, and where the shaft element may be misaligned relative to other parts of the sealing assembly.

The sealing assembly includes a backup ring of generally circular form that mounts a pressure-retaining seal of annular form that retains a first fluid. The first fluid is preferably a liquid-type seal lubricant having a pressure that may be referred to herein as the first fluid pressure. The pressure-retaining seal retains the pressure of the first fluid, and partitions the first fluid from a second fluid that typically has a much lower pressure than the first fluid. The second fluid may be any fluid, including, but not limited to, the atmosphere of the earth. The second fluid has a pressure that may be referred to herein as the second fluid pressure. The backup ring is preferably configured so that neither differential pressure acting across the pressure-retaining seal, nor the pressure of the second fluid, causes the backup ring to significantly change diameter.

The backup ring is located (i.e., positioned) axially by the presence of one or more (and at least one) generally axially facing locating shoulder of a bulkhead housing and a generally axially facing retaining shoulder of a ring retainer. At least a portion of the backup ring is located between the retaining shoulder of the ring retainer and the locating shoulder of the bulkhead housing. The backup ring is sealed with respect to the one or more locating shoulders and with respect to the retaining shoulder. The retaining shoulder and least one locating shoulder face generally toward one another. The bulkhead housing and the ring retainer are preferably threadedly secured (i.e., retained) together. The bulkhead housing has a portion thereof exposed to the first fluid and the first fluid pressure and has a portion thereof exposed to the second fluid and the second fluid pressure. The bulkhead housing is of annular form, and preferably includes a shaft passageway of annular form that faces generally radially inward toward the shaft element. The shaft passageway is preferably the innermost surface of the bulkhead housing.

The backup ring has a ring inner surface that is larger than, and faces generally radially inward toward, the sealing surface of the shaft element. The shaft element has an externally oriented and generally radially outward facing sealing surface of generally cylindrical form that is smaller in diameter than the ring inner surface of the backup ring. At least part of the sealing surface is located within and encircled by the ring inner surface of the backup ring, and forms a region of clearance therewith. The ring inner surface establishes a journal bearing relationship with the sealing surface, and the sealing surface locates the backup ring laterally (i.e., radially). In other words, the backup ring is laterally translatable, and is guided laterally by a journal bearing relationship with the sealing surface of the shaft element.

At least part of the shaft element is preferably located within and encircled by the shaft passageway of the bulkhead housing. The shaft element is relatively movable with respect to the bulkhead housing and the ring retainer. The shaft element has a portion thereof located inboard of the pressure-retaining seal that is exposed to the first fluid and has a portion thereof located outboard of the pressure-retaining seal that is exposed to the second fluid.

The ring retainer is preferably of annular form and is preferably located radially outward of and encircles at least a portion of the sealing surface of the shaft element.

The sealing surface of the shaft element is sealingly engaged by the pressure-retaining seal. Preferably, during relative movement of the shaft element, the backup ring and the pressure-retaining seal slip with respect to the sealing surface of the shaft element.

An outer first ring end of the backup ring faces in a generally axial direction toward and adjoining the retaining shoulder of the ring retainer, and faces generally axially away from the one or more locating shoulders of the backup ring. The outer first ring end is sealed with respect to the retaining shoulder by a ring first end seal. The ring first end seal preferably has a face-sealing configuration. The ring first end seal contacts and provides sealing between the ring retainer and the backup ring, partitioning the first fluid and the first fluid pressure from the second fluid and the second fluid pressure, and preventing the first fluid from escaping between the retaining shoulder of the ring retainer and the outer first ring end of the backup ring and into the second fluid. The ring first end seal is preferably located radially farther than the pressure-retaining seal from the sealing surface of the shaft element and is preferably located radially outward from the pressure-retaining seal.

Preferably, the backup ring has a first end groove of annular form opening toward the retaining shoulder of the ring retainer. Preferably, this first end groove includes a jacket support wall, an energizer compressing wall, and an energizer positioning wall. The jacket support wall faces generally radially inward toward the energizer positioning wall and the energizer positioning wall faces generally radially outward toward the jacket support wall. The energizer compressing wall faces in a generally axial direction toward the retaining shoulder of the ring retainer.

Preferably, the ring first end seal includes an energizer element composed at least in part from elastomer and includes a telescoping jacket composed at least in part from plastic. The telescoping jacket has a first leg portion extending in a radial direction and a second leg portion extending in a generally axial direction. The first leg portion of the telescoping jacket has a jacket sealing surface facing toward and contacting the retaining shoulder of the ring retainer and an energizer contacting wall facing toward and contacting the energizer element. The energizer element is compressed in a generally axial direction between the energizer contacting wall and the energizer compressing wall and in a generally axial direction loading the jacket sealing surface against the retaining shoulder of the ring retainer. The second leg portion of the telescoping jacket has an energizer supporting wall facing toward the energizer element and a supported wall facing radially outward toward and adjoining the jacket support wall. The second leg portion is interposed between at least part of the energizer element and at least part of the jacket support wall. Preferably, the second leg portion of the telescoping jacket of the ring first end seal extends from the energizer contacting wall, and the farther the second leg portion extends from the energizer contacting wall, the radially thinner the second leg portion becomes. Preferably, prior to final assembly, the second leg portion of the telescoping jacket of the ring first end seal projects into the first end groove, overlapping the jacket support wall and aligning the telescoping jacket of the ring first end seal with the first end groove.

Preferably, the backup ring has an inner second ring end and an outer second ring end (or at least the one second ring end that is taught by the prior art) of generally planar, axially facing form that are axially offset with respect to one another. Preferably, the inner second ring end is axially more distant from the outer first ring end, compared to the outer second ring end. Preferably, the bulkhead housing has an inner locating shoulder and an outer locating shoulder (or at least the one locating shoulder that is taught by the prior art) of generally planar, axially facing form that are axially offset with respect to one another, the inner locating shoulder being axially more distant from the retaining shoulder of the ring retainer, compared to the outer locating shoulder, and the inner locating shoulder being axially more distant from the outer first ring end of the backup ring, compared to the outer locating shoulder. The retaining shoulder and the outer first ring end preferably encircle at least a portion of the sealing surface of the shaft element.

Preferably, at least a portion of the inner second ring end of the backup ring faces and adjoins the inner locating shoulder of the bulkhead housing, and is sealed with respect to the inner locating shoulder by an inner balancing seal of face-sealing configuration. Preferably, at least a portion of the outer second ring end of the backup ring faces and adjoins the outer locating shoulder of the bulkhead housing, and is sealed with respect to the outer locating shoulder by an outer balancing seal of face-sealing configuration.

An inner first ring end of the backup ring and the outer first ring end of the backup ring face in the same general axial direction, and are preferably axially offset from one another. The inner first ring end and the inner second ring end face in generally opposite directions, and the outer first ring end and the outer second ring end face in generally opposite directions. The inner second ring end and the outer second ring end face in the same general axial direction, and face generally axially away from the ring retainer.

The inner and outer balancing seals are located radially outward of and encircle the shaft element, and are exposed to and located between the first and second fluids, and contact both the bulkhead housing and the backup ring. The inner and outer balancing seals provide sealing between the backup ring and the bulkhead housing, partition the first fluid and the first fluid pressure from the second fluid and the second fluid pressure, and prevent the first fluid from escaping between the bulkhead housing and the backup ring and into the second fluid.

Most of the material forming the backup ring is located in an axially intermediate location to the outer first ring end and the inner second ring end of the backup ring. An annular extension of the backup ring extends generally axially from the portion of the backup ring that is located in axially intermediate relation to the outer first ring end and the inner second ring end. This annular extension forms at least part of a radially inward facing gland bore of preferably annular form, within which preferably resides at least part of the pressure-retaining seal. The pressure-retaining seal is preferably compressed radially between the gland bore and the sealing surface of the shaft element. One end of the gland bore preferably extends to a location that is axially intermediate to the outer first ring end and the outer second ring end, preferably terminating at a gland inside corner that is an intersection between the gland bore and the inner first ring end. The other end of the gland bore preferably terminates at a seal installation chamfer of generally conical form, the installation chamfer being more axially distant from the inner first ring end, compared to the gland bore. Preferably, all of the inner first ring end is located in axially intermediate relation to the outer first ring end and the inner second ring end. Preferably, at least part of the sealing surface of the shaft element is located within and encircled by the annular extension of the backup ring.

The difference in pressure between one fluid and another, such as between the first fluid and the second fluid, is referred to as differential pressure or pressure differential. The inner first ring end supports the pressure-retaining seal against the differential pressure that may be present between the first fluid and the second fluid, when the pressure of the first fluid is greater than the pressure of the second fluid.

Preferably, the annular extension is located in radially intermediate relation to the inner first ring end and the outer first ring end. Preferably, the pressure-retaining seal is located at least partially within the gland bore of the backup ring. Preferably, the ring first end seal and the outer first ring end are located radially outward from and encircle at least part of the gland bore and are located radially outward from and encircle at least part of the pressure-retaining seal.

Between the inner first ring end and the inner second ring end, the backup ring preferably forms a radially inward facing ring inner surface that faces toward and forms a journal bearing type fit with the radially outward facing, generally cylindrical sealing surface of the shaft element. An intersection is preferably present between the ring inner surface and the inner first ring end forming an extrusion gap corner. The clearance between the ring inner surface and the sealing surface of the shaft element forms an extrusion gap at the extrusion gap corner, and radially between the extrusion gap corner and the sealing surface of the shaft element. The pressure-retaining seal bridges this extrusion gap, and is exposed to the pressure of the second fluid at the extrusion gap. Preferably, the extrusion gap corner is an external corner, and may be a slightly rounded or slightly chamfered corner.

Preferably, the backup ring has a ring outer surface that is located in axially intermediate location to the outer first ring end and the outer second ring end, and is located in axially intermediate relation to the retaining shoulder and the outer locating shoulder. The ring outer surface of the backup ring is located radially outward of and encircles at least a portion of the ring inner surface.

The ring outer surface faces in a generally radially outward direction, and generally away from the sealing surface of the shaft element. Preferably, the ring inner surface and the ring outer surface are exposed to the pressure of the second fluid. The pressure of the second fluid can be communicated to the ring outer surface by a variety of means, such as an unsealed interface between the bulkhead housing and the ring retainer, or a pressure communication hole that passes in a generally radial direction through the bulkhead housing, or a communication hole that passes in a generally radial direction through the backup ring, communicating the second fluid pressure from the clearance between the ring inner surface and the sealing surface to the ring outer surface.

Preferably, the pressure-retaining seal and the ring first end seal establish and define a first hydraulic area that is exposed to and acted on by the first fluid pressure, producing an axially oriented first hydraulic force acting on the backup ring in a first hydraulic force direction generally toward the inner and outer locating shoulders of the bulkhead housing and generally away from the ring retainer.

Preferably, the inner and outer balancing seals establish and define a second hydraulic area that is exposed to and acted on by the first fluid pressure, producing a second axially acting hydraulic force acting on the backup ring in a second hydraulic force direction, generally toward the retaining shoulder of the ring retainer and generally away from the inner and outer locating shoulders of the bulkhead housing. The first and second axial hydraulic force directions are opposite to one another. The first and second axially acting hydraulic forces are preferably substantially equal, substantially freeing the backup ring from axially-acting hydraulic force imbalance that would create friction that would inhibit lateral motion of the backup ring. This condition of being substantially hydraulic force-balanced in the axial direction leaves the backup ring free to move laterally to accommodate any misalignment, deflection, and/or dynamic runout of the sealing surface of the shaft element. The first fluid pressure can be transmitted to the second hydraulic area by any suitable fluid communication passageway, such as but not limited to a fluid communication passageway in the form of a generally axially oriented hole in the backup ring itself. Preferably, when the fluid communication passageway is thusly formed, at least part of the fluid communication passageway is encircled by the ring outer surface of the backup ring, and at least part the fluid communication passageway is located between and in radially intermediate relation to the ring inner surface and the ring outer surface. As another example, if desired, the fluid communication passageway could comprise interconnected cross-drilled holes that are formed in the retainer and bulkhead housing.

The second hydraulic area is located radially farther from the sealing surface of the shaft element, compared to the first hydraulic area, which means that the first and second axially acting forces are radially misaligned. This radial misalignment creates a moment that tends to twist the backup ring, causing the ring inner surface to become slightly conical in service, even though the ring inner surface is preferably cylindrical in its relaxed, unstressed state. This coning effect resulting from the radial offset of the oppositely acting hydraulic forces can be addressed in part by providing an axial offset between the inner first ring end and the inner second ring end. In other words, one can have the axial distance between the inner first ring end and the inner second ring end be less than the axial distance between the outer first ring end and the inner second ring end, so that some of the pressure of the first fluid acts through the material of the pressure-retaining seal in a radially outward direction on the backup ring, applying a countervailing moment to the backup ring to minimize the aforesaid coning issue. This coning effect can be further minimized, or controlled to a specific value or range, by having the axial distance between the outer first ring end and the outer second ring end be less than the axial distance between the outer first ring end and the inner second ring end, so that some of the pressure of the first fluid acts on the portion of the backup ring that is located between the inner and outer second ring ends in a radially inward direction, applying a countervailing moment to the backup ring. In this specification, the referenced portion of the backup ring is referred to as the projection outer surface because the preferred axial offset between the inner and outer second ring ends causes the inner second ring end to project past the outer second ring end.

The annular extension of the backup ring preferably incorporates a seal installation chamfer, and the gland bore of the backup ring is preferably located in axially intermediate location to the seal installation chamfer and the inner first ring end. The seal installation chamfer preferably forms an external corner with, and adjoins, the gland bore of the backup ring.

The gland bore has first and second axial extremities, and the retaining shoulder and the outer first ring end are preferably located in axially intermediate location to the first and second axial extremities of the gland bore. Preferably, the outer first ring end and the retaining shoulder are located radially outward of and encircle at least a portion of the gland bore, and are located radially outward of and encircle a portion of the sealing surface of the shaft element.

Preferably, the fluid communication passageway is in the form of a hole that is formed in and passes in a generally axial direction through the backup ring, penetrating and communicating from the outer first ring end to the outer second ring end. The fluid communication passageway is preferably located in radially intermediate relation to the pressure-retaining seal and the ring first end seal and is preferably located in radially intermediate relation to the inner and outer balancing seals, and is preferably located in radially intermediate relation to the annular extension and the ring first end seal, and preferably communicates the pressure of the first fluid to a sealed region between the inner and outer balancing seals.

Preferably, the fluid communication passageway has a first open end facing in a generally axial direction away from the outer second ring end, and has a second open end facing in a generally axial direction away from the outer first ring end. The first open end is located in radially intermediate relation to the pressure-retaining seal and the ring first end seal, and the second open end is located in radially intermediate relation to the inner and outer balancing seals. The fluid communication passageway communicates the first fluid pressure through the backup ring from the outer first ring end to the outer second ring end, and to the second hydraulic area; i.e., the fluid communication passageway provides the first fluid pressure to the second hydraulic area. The fluid communication passageway is preferably located radially inward from the ring outer surface of the backup ring, and is preferably located radially inward from the ring first end seal and the outer balancing seal.

An intersection between the inner first ring end and the ring inner surface of the backup ring forms the aforementioned extrusion gap corner. The outer first ring end is separated from the outer second ring end by an axial distance, and the extrusion gap corner is separated from the outer second ring end by an axial distance. The axial distance separating the extrusion gap corner from the outer second ring end preferably is less than the axial distance separating the outer first ring end and the outer second ring end. The extrusion gap corner preferably is located in axially intermediate relation to the outer first ring end and the outer second ring end.

Preferably, an intersection between the inner first ring end and the gland bore of the backup ring forms the aforementioned gland inside corner. The gland inside corner is separated from the outer second ring end by an axial distance. The axial distance separating the gland inside corner from the outer second ring end preferably is less than the axial distance separating the outer first ring end from the outer second ring end. The gland inside corner preferably is located in axially intermediate relation to the outer first ring end and the outer second ring end.

The pressure-retaining seal preferably has first and second seal ends. The first seal end faces generally away from the inner first ring end of the backup ring, and the second seal end faces generally toward and adjoins and preferably abuts the inner first ring end. The outer first ring end of the backup ring is preferably located in axially intermediate relation to the first and second seal ends. The outer first ring end of the backup ring preferably encircles at least a portion of the gland bore and is preferably located radially outward of and encircles at least a portion of the sealing surface of the shaft element.

Preferably, the pressure-retaining seal is in sealing contact with the backup ring and with the sealing surface of the shaft element and more specifically, is preferably in sealing contact with the gland bore of the backup ring. The pressure-retaining seal partitions the first fluid from the second fluid. At least a portion of the gland bore encircles a part of the sealing surface. The pressure-retaining seal is preferably a dynamic seal.

The annular extension protrudes axially from the backup ring at a location that is radially intermediate to the outer first ring end and the ring inner surface. A surface of the annular extension preferably forms at least part of the gland bore. The gland bore faces generally radially inward toward, encircling, and separated radially from the sealing surface of the shaft element. At least a portion of the annular extension preferably is located within and encircled by an annular receiving recess of the ring retainer and at least part of the annular extension preferably is located within and encircled by the retaining shoulder. The annular extension is at a location radially inward of the outer first ring end and closer to the sealing surface of the shaft element, compared to the ring outer surface. The annular extension is also located in radially intermediate location to the inner first ring end and the outer first ring end. Preferably, the annular receiving recess of the ring retainer is a generally radially inward facing feature. Preferably, the annular receiving recess of the ring retainer is located in radially spaced relation to the sealing surface and preferably encircles at least part of the sealing surface.

Preferably, the inner first ring end of the backup ring is located in radially intermediate relation to the annular extension and the sealing surface of the shaft element and is located radially outward of and encircles a portion of the sealing surface. Preferably the inner first ring end is located in axially intermediate location to the outer first ring end and the inner second ring end, and the inner first ring end faces in a generally axial direction away from the inner second ring end.

The backup ring has at least one modulus of elasticity, and preferably, this modulus of elasticity is greater than the modulus of elasticity of the material of the pressure-retaining seal. The preferred material for construction of the majority of the backup ring is metal, and preferably is a high modulus metal such as steel. If desired, the backup ring may incorporate a bearing liner made of a bearing type material, such as, but not limited to, a copper nickel tin alloy. Preferably, this bearing liner is retained by a press or shrink fit, or by one or more radial pins, or by solder, within a steel ring portion of the backup ring.

The backup ring of the present invention is suitable for use with both compression-type (i.e., interference-type) and flexing, lip-type pressure-retaining seals. A compression-type pressure-retaining seal is maintained in direct compression against the sealing surface of the shaft element to establish sealing contact force with the sealing surface. Such seals are well-known in the art. A flexing lip-type seal includes a flexible dynamic lip that contacts the sealing surface. Sealing contact force is established by flexure of the dynamic lip, which can be assisted by energizer elements such as a spring or a compressed rubber element. Such seals are well-known in the art.

Preferably, the axial distance between the retaining shoulder and the outer locating shoulder is slightly greater than the axial distance between the outer first ring end and the outer second ring end so that the backup ring is not pinched (i.e., clamped) between the retaining shoulder and the outer locating shoulder, leaving the backup ring free to move laterally in concert with any lateral motion, deflection, and/or runout of the shaft element.

In some cases, the axial forces acting on the backup ring may include other axially acting forces in addition to the aforementioned hydraulic forces. For example, in a vertical shaft application, the weight of the backup ring acts in an axial direction. For another example, the compressive force of the inner and outer balancing seals and the ring first end seal act in axial directions. Such forces are relatively negligible, and only the hydraulic forces typically need to be taken into account. Whether one is only balancing the axial hydraulic forces, or also balancing other axial forces such as, but not limited to, backup ring weight and seal compressive force, such balancing can be accomplished in the present invention by proper sizing of the first and second hydraulic areas. In some cases, it may be desirable to design in a slight hydraulic imbalance to eliminate or reduce any axial clearance between one of the second ring ends and the mating locating shoulder. All of these slight hydraulic imbalances are intended to fall within the scope of what is meant by a condition of substantial axial force balance, or substantial axial pressure balance. Additionally, the slight but unintentional axial force imbalances that may occur as the result of design tolerances fall within the meaning of the description of the first and second axially-acting hydraulic forces being substantially equal.

The pressure-retaining seal and other seals that are used with the backup ring of the present invention may, if desired, incorporate one or more seal materials without departing from the spirit or scope of the invention. The seals may be composed of any suitable sealing material or materials, including elastomeric or rubber-like materials which may, if desired, be combined with various, plastic materials such as reinforced polytetrafluoroethylene ("PTFE") based plastic. If desired, the seals may be of monolithic integral, one piece construction or may also incorporate different materials bonded, co-vulcanized, or otherwise joined together to form a composite structure. Different materials may also be simply layered together radially or axially to create an effective seal.

The pressure-retaining seal is preferably a hydrodynamic seal that exploits relative motion to lubricate the interface between the pressure-retaining seal and the sealing surface of the shaft element. This hydrodynamic action is accomplished by having the pressure-retaining seal provide at least one surface that converges gradually and gently (rather than abruptly) with the relatively movable sealing surface of the shaft element, so that the gentle convergence forms a hydrodynamic inlet for wedging the first fluid into the interface as a result of at least one direction of relative axial or rotational motion. In seals adapted for hydrodynamic lubrication in response to both relative rotation and one direction of relative axial motion, the gentle convergence may occur at a wavy flank of the seal that faces the first fluid. As a result of the wavy flank, the interface between the pressure-retaining seal and the sealing surface, which is sometimes called a "footprint," preferably has a wavy edge facing the first fluid.

Preferably, the ring first end seal, the inner balancing seal, and the outer balancing seal each have annular and generally circular two-part construction, and comprise a telescoping jacket made from plastic and an energizer element made from elastomer. Preferably, the ring first end seal, the inner balancing seal, and the outer balancing seal are each mounted in a face type seal groove. Preferably, each seal groove has a jacket support wall, an energizer compressing wall, and an energizer positioning wall. One or more of these face type seal grooves may optionally include a reinforcing wall that may have generally conical form, and may be interposed between the jacket support wall and the energizer compressing wall.

Each of the aforementioned face type seal grooves can be thought of as being formed in one machine component, and as opening toward and facing another machine component. These machine components may be referred to as first and second machine components if desired. Each seal groove is preferably generally circular, and may accurately be referred to as being annular, and as being a face seal type of seal groove.

Preferably, of these face type seals establishes sealing between one machine component and another by being located between and axially compressed between the one machine component and the other, or more specifically, between the generally planar, axially facing energizer compressing wall of the seal groove and a mating generally planar, axially facing surface of one of the machine components. Preferably, one of the machine components is the backup ring, and the other machine component is selected from the group consisting of the ring retainer and the bulkhead housing.

Preferably, the energizer element contacts and seals between, and is generally axially compressed between, the energizer compressing wall of the seal groove and an energizer contacting wall of the telescoping jacket. Preferably, a jacket sealing surface of the telescoping jacket faces and contacts a mating surface of a machine component. The axial compression of the energizer element causes the jacket sealing surface of the telescoping jacket to contact, and establish sealing, with respect to the aforementioned mating surface of the machine component.

Preferably, when the telescoping jacket is viewed in longitudinal cross-section, it has an L-shaped cross-section, with a first leg portion extending in a generally radial direction, and a second leg portion extending in a generally axial direction away from the first leg portion. Preferably, the energizer contacting wall and the jacket sealing surface are surfaces of the first leg portion of the telescoping jacket and face in generally opposite, axial directions. The energizer contacting wall is preferably generally flat, to maximize the room available within the seal groove for thermal expansion of the energizer element.

Preferably, the telescoping jacket includes an energizer supporting wall and a supported wall facing in generally opposite, generally radial directions, these walls preferably being surfaces of the second leg portion of the telescoping jacket. The supported wall preferably faces toward and adjoins the jacket support wall of the seal groove, and preferably has clearance with the jacket support wall in the absence of differential pressure. Preferably, the supported wall has contact with and is supported by the jacket support wall when the pressure of the first fluid is greater than the pressure of the second fluid, the pressure difference between the fluids causing the contact. The energizer supporting wall of the telescoping jacket is preferably generally conical, causing the second leg portion of the telescoping jacket to taper in radial thickness, becoming radially thinner where it is more distant from the first leg portion, and becoming radially thicker nearer to the first leg portion. Preferably when the pressure of the first fluid becomes greater than the pressure of the second fluid, the second leg portion deforms radially, such that part or all of the supported wall of the telescoping jacket comes into contact with the jacket support wall of the seal groove, eliminating the radial clearance between the supported wall and the jacket support wall and preventing or minimizing extrusion damage to the energizer element.

Preferably, the telescoping jacket covers (occludes) any axial clearance between the machine components being sealed, such that the telescoping jacket bridges the axial clearance, instead of the energizer element bridging the clearance. This protects the energizer element from high pressure extrusion damage.

The jacket support wall, and if present, the optional reinforcing wall, are exposed to generally radially acting hydraulic force resulting from the difference in pressure between the first fluid and the second fluid, and form a part of an annular groove wall that has radial thickness. The annular groove wall has to be strong enough to withstand the generally radially acting hydraulic force. The reinforcing wall, if present, is angled with respect to the jacket support wall and the energizer compressing wall of the seal groove. Preferably, the angle between the reinforcing wall and the jacket support wall is obtuse and preferably is 45°. Preferably, the angle between the reinforcing wall and the energizer compressing wall is obtuse and preferably is 45°. Preferably, the reinforcing wall, when present, is located between and adjoins the jacket support wall and the energizer compressing wall, and is located in both axially intermediate location and radially intermediate location to the jacket support wall and the energizer compressing wall. Preferably, the reinforcing wall is generally conical in shape.

The tapering thickness of the annular groove wall that is provided by the angulating nature of the reinforcing wall strengthens the annular groove wall because it makes the annular groove wall radially thicker (i.e., thicker radial wall depth) near the energizer compressing wall, which dramatically reduces differential pressure induced stress within the annular groove wall. The energizer positioning wall is preferably oriented at right angles with respect to the energizer compressing wall, and is preferably exposed to the first fluid and the first fluid pressure. A first portion of the energizer compressing wall is preferably exposed to and contacted by the first fluid, and a second portion of the energizer compressing wall preferably contacts the energizer element. A first portion of the energizer contacting wall is preferably exposed to and contacted by the first fluid, and a second portion of the energizer contacting wall preferably contacts the energizer element.

The optional reinforcing wall allows the radial thickness of the annular groove wall (the thickness between the jacket support wall and the shaft passageway) to be as thin as possible, considering the radial differential pressure-induced hydraulic load and the allowable wall material stress level. This allows the radial distance between the jacket support wall and the sealing surface of the shaft element to be as small as possible, minimizing the radial offset between the axially opposed hydraulic forces acting on the backup ring, and thereby minimizing the hydraulic force-related cross-sectional twisting of the backup ring.

The energizer supporting wall of the telescoping jacket preferably adjoins and intersects the energizer contacting wall at an inside jacket corner which may, if desired, be a radiused inside corner. Preferably, the angle between the energizer contacting wall and the energizer supporting wall is obtuse.

The supported wall of the telescoping jacket is preferably annular, and preferably generally circular, and preferably faces in a generally radial direction toward the jacket support wall of the seal groove.

Before assembly, the uncompressed axial dimension of the energizer element is typically greater than the axial depth of the seal groove, which means that in its uncompressed state, part of the energizer element typically projects out of the seal groove. Before assembly, this typically causes the first leg portion of the telescoping jacket to be located outside of the seal groove, and when this happens it means that no portion of the first leg portion of the telescoping jacket can interact with the seal groove to keep the telescoping jacket aligned with the seal groove during assembly, as compression of the energizer element occurs.

Even in circumstances where the axial length of the uncompressed energizer element is slightly less than the axial depth of the seal groove, the fact that a little bit of the first leg portion of the telescoping jacket would be telescoped inside of the seal groove is not enough to ensure that the telescoping jacket remains aligned with the seal groove during assembly, because a slight jarring action would be enough to cause the telescoping jacket to become misaligned with the seal groove, leading to damage of the telescoping jacket during assembly.

This problem could be solved by making the telescoping jacket thick enough that the energizer element could be well recessed within the seal groove prior to assembly, but that requires the axial depth of the seal groove to be deeper, which requires the radial thickness of the annular groove wall to be thicker, which has the negative effect of increasing the radial offset between the opposed first and second hydraulic forces acting on the backup ring. This would have the negative consequence of increasing the hydraulic force-induced cross-sectional twisting of the backup ring.

In the preferred embodiment of the present invention, part of the second leg portion of the telescoping jacket, including a portion of the supported wall, are telescoped within the jacket support wall of the seal groove prior to assembly, such that the supported wall overlaps with the jacket support wall. This telescoped, overlapping relationship keeps the telescoping jacket aligned with the seal groove during assembly as compression of the energizer element occurs, preventing assembly-related damage to the telescoping jacket.

Preferably, the backup ring is comprised of a steel ring portion and a bearing liner. The steel ring portion has a relief bore and a liner recess that includes a liner recess bore and a liner recess shoulder. The liner recess bore and the relief bore face generally radially inward toward the shaft element and the liner recess shoulder faces in a generally axial direction toward the inner first ring end. The bearing liner has a liner peripheral surface facing generally radially outward toward and contacting the liner recess bore. The bearing liner has a second liner end facing in a generally axial direction toward the liner recess shoulder and away from the inner first ring end. The relief bore is located in axially intermediate location to the second liner end and the inner second ring end and has radial clearance with the shaft element. The bearing liner forms the extrusion gap corner and forms at least part of the ring inner surface. This configuration is advantageous because it allows the bearing liner to be as radially thin as practicable so the steel ring portion can be as radially thick as possible, for maximum stiffness and twist resistance (as afforded by the modulus of elasticity of steel being greater than the modulus of elasticity of typical materials suitable for journal bearing service). Preferably, the bearing liner forms at least part of the inner first ring end and contacts and supports at least part of the second seal end of the pressure-retaining seal.

In the preceding description, the face type seals have been described in a general way, and the ring first end seal has been described in specific detail. Following is a more specific description of the preferred embodiment of the face type balancing seals, and their respective seal grooves.

Preferably, the bulkhead housing has an inner balancing seal groove of annular form opening toward the backup ring and including a jacket support wall, an energizer compressing wall, and an energizer positioning wall. The jacket support wall faces generally radially outward toward the energizer positioning wall and the energizer positioning wall faces generally radially inward toward the jacket support wall. The energizer compressing wall faces in a generally axial direction toward the backup ring.

Preferably, the inner balancing seal is comprised of two parts, one part being an energizer element composed at least in part from elastomer, and another part being a telescoping jacket composed at least in part from plastic. The telescoping jacket has a first leg portion extending in a radially outward direction toward the energizer positioning wall and away from the jacket support wall. The telescoping jacket has a second leg portion extending in a generally axial direction away from the backup ring and away from the first leg portion of the telescoping jacket. The first leg portion has a jacket sealing surface facing toward and contacting the backup ring and an energizer contacting wall facing toward and contacting the energizer element and facing generally away from the backup ring. The energizer element is compressed in a generally axial direction between the energizer contacting wall and the energizer compressing wall, which loads the jacket sealing surface generally axially against the backup ring. The second leg portion of the telescoping jacket has an energizer supporting wall facing toward the energizer element and a supported wall facing radially inward toward and adjoining the jacket support wall. The second leg portion is interposed between at least part of the energizer element and at least part of the jacket support wall. Preferably, the farther the second leg portion of the telescoping jacket of the inner balancing seal extends from the energizer contacting wall, the radially thinner the second leg portion becomes. Preferably, the energizer supporting wall of the telescoping jacket of the inner balancing seal is generally conical.

Preferably, the inner balancing seal groove has a reinforcing wall of generally conical form located between the jacket support wall and the energizer compressing wall and facing generally toward the energizer element.

Preferably, prior to final assembly, the second leg portion of the telescoping jacket of the inner balancing seal projects into the inner balancing seal groove, overlapping the jacket support wall of the inner balancing seal groove and aligning the telescoping jacket with the inner balancing seal groove.

Preferably, the bulkhead housing has an outer balancing seal groove of annular form opening toward the backup ring and including a jacket support wall, an energizer compressing wall, and an energizer positioning wall. The jacket support wall faces generally radially inward toward the energizer positioning wall and the energizer positioning wall faces generally radially outward toward the jacket support wall. The energizer compressing wall faces in a generally axial direction toward the backup ring.

Preferably, the outer balancing seal includes an energizer element composed at least in part from elastomer and includes a telescoping jacket composed at least in part from plastic. The telescoping jacket has a first leg portion extending in a radially inward direction toward the energizer positioning wall and away from the jacket support wall, and has a second leg portion extending in a generally axial direction away from the backup ring. The first leg portion of the telescoping jacket has a jacket sealing surface facing toward and contacting the backup ring and an energizer contacting wall facing toward and contacting the energizer element. The energizer element is compressed in a generally axial direction between the energizer contacting wall and the energizer compressing wall, which loads the jacket sealing surface in a generally axial direction against the backup ring. The second leg portion of the telescoping jacket has an energizer supporting wall facing toward the energizer element and a supported wall facing generally radially outward toward the jacket support wall. The second leg portion is interposed between at least part of the energizer element and at least part of the jacket support wall.

Preferably, the second leg portion of the telescoping jacket of the outer balancing seal extends in a generally axial direction from the energizer contacting wall, and the farther the second leg portion extends from the energizer contacting wall of the telescoping jacket of the outer balancing seal, the radially thinner the second leg portion becomes.

Preferably, prior to final assembly, the second leg portion of the telescoping jacket of the outer balancing seal telescopes into the outer balancing seal groove, overlapping the jacket support wall and aligning the telescoping jacket of the outer balancing seal with the outer balancing seal groove, for ease of assembly, and for damage-free assembly.

Preferably, the fluid communication passageway has oppositely facing first and second open ends and passes in a generally axial direction through said backup ring. The first open end faces away from the bulkhead housing and is located in radially intermediate location to the ring first end seal and the annular extension. The second open end opens toward the bulkhead housing and is located in radially intermediate relation to the inner and outer balancing seals and in radially intermediate relation to the outer locating shoulder of the bulkhead housing and the inner second ring end of the backup ring.

BRIEF DESCRIPTION OF THE SEVERAL VIEWS OF THE DRAWINGS

So that the features, advantages, and objects of the present invention are attained and can be understood in detail, a comprehensive description of the invention may be had by reference to the embodiments thereof which are illustrated in the appended drawings. It is to be noted, however, that the appended drawings only illustrate preferred embodiments of this invention, and are therefore not to be considered limiting of its scope. In the drawings.

DESCRIPTION OF THE PREFERRED EMBODIMENTS

All figures herein pertain to the same sealing assembly. FIGS. 1, 1A, 1B and 1C represent the device in the assembled state, and FIG. 2 represents part of the same device prior to final assembly.

FIG. 1

Figure 1:
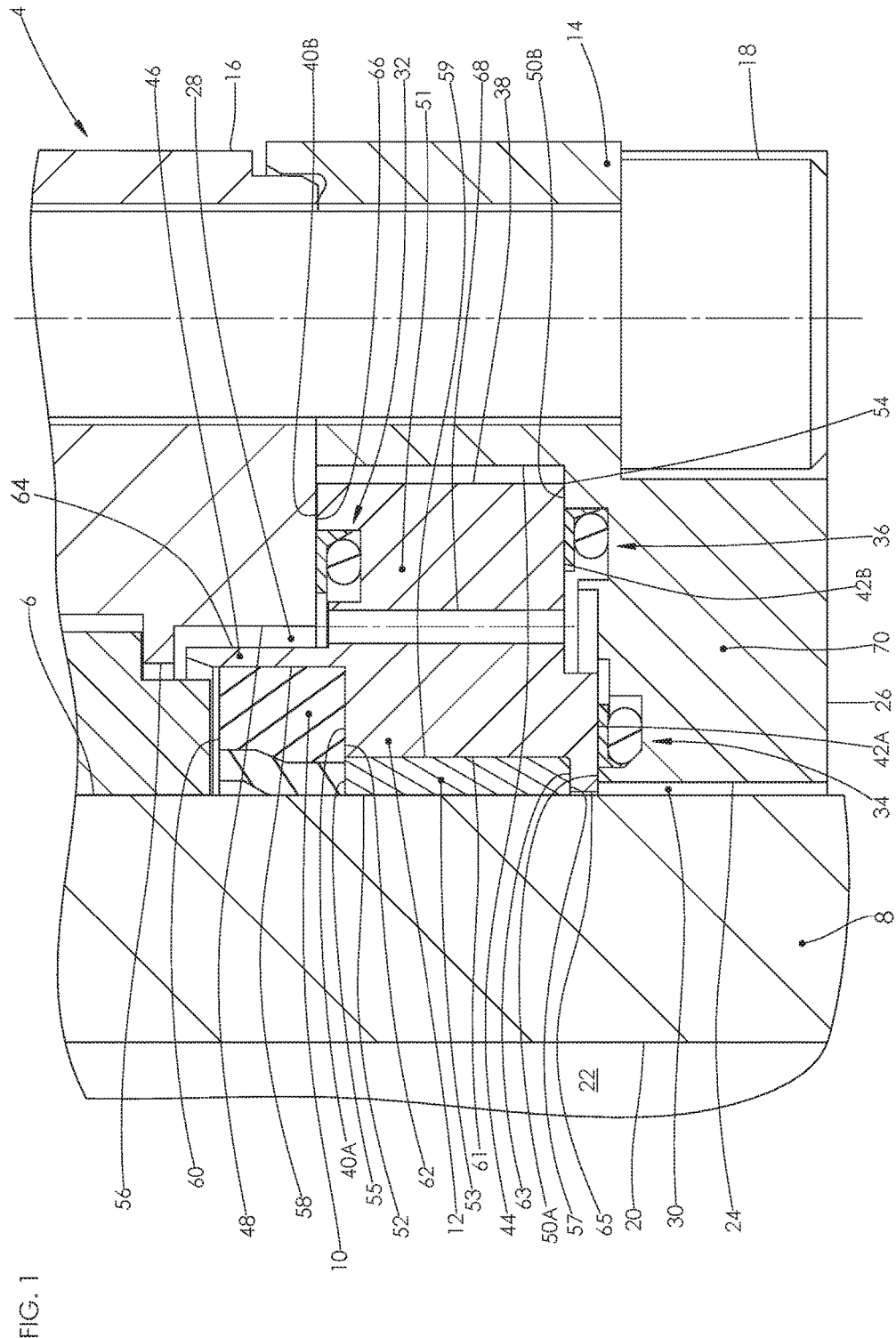
FIG. 1 is a fragmentary longitudinal cross-sectional view of a sealing assembly that is representative of a preferred embodiment of the present invention.
Figure 2:
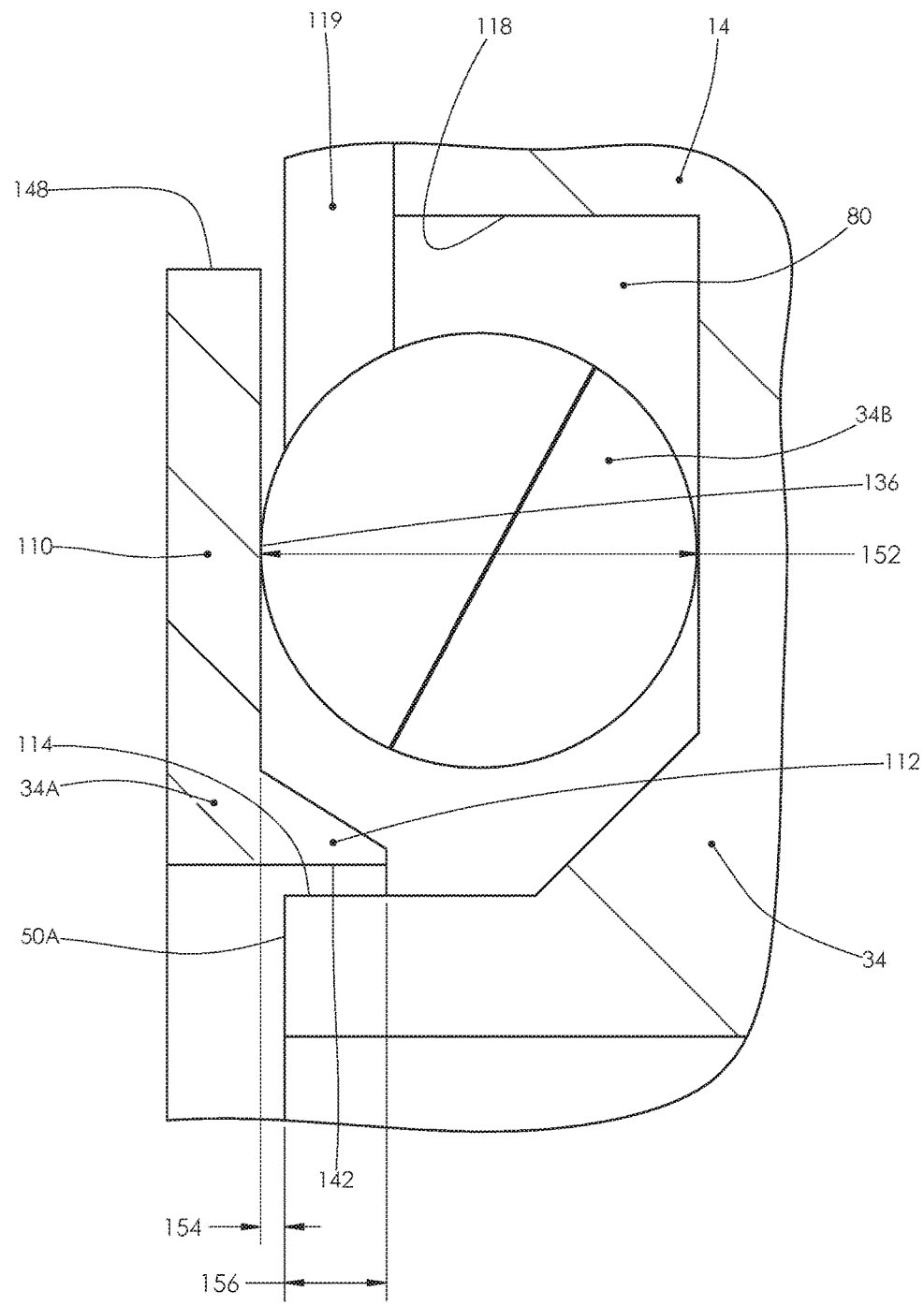
FIG. 2 is a fragmentary longitudinal cross-sectional view of a portion of the same sealing assembly shown in FIGS. 1 to 1C, but prior to final assembly.

FIG. 1 is a fragmentary longitudinal cross-sectional view showing a dynamic sealing assembly generally at 4, where the sealing surface 6 of a shaft element 8 is surrounded and contacted by a pressure-retaining seal 10 that is located by a backup ring 12. The pressure-retaining seal 10 and the backup ring 12 are of annular form.

The term "longitudinal cross-sectional view" used throughout this specification means the imaginary cutting plane of the cross-sectional view is aligned with and passes through the theoretical axis of the shaft element 8. The term "axis" is well-understood in mechanical engineering, and in the field of drafting.

The sealing assembly 4 preferably also includes a bulkhead housing 14 and a ring retainer 16, both of which preferably have annular form. Although other methods are possible, the ring retainer 16 and bulkhead housing 14 are preferably retained together by a pattern of bolts 18 that are generally axially oriented, the axes of the bolts 18 being generally parallel to the axis of the shaft element 8.

The sealing assembly 4 is of the general type disclosed by commonly assigned U.S. Pat. No. 9,429,238, "Dynamic Backup Ring Assembly" and by commonly assigned U.S. Patent Publication 20160356382, "High Pressure Dynamic Sealing Arrangement," which are incorporated herein by reference for all purposes.

In washpipe assemblies of oilfield swivels, the shaft element 8 is commonly referred to as a washpipe. In other types of equipment, the shaft element 8 is typically referred to as a shaft or a mandrel. In some types of equipment, such as oilfield rotary control devices, the shaft element 8 may incorporate a shaft bore 20 that contains a fluid media 22. In an oilfield swivel, the fluid media 22 is typically flowing, and is typically drilling fluid, which is also referred to as drilling mud.

The shaft element 8 may have relative rotary movement, relative axial movement, and/or relative lateral movement with respect to other components of the sealing assembly 4. For example, the shaft element 8 may be rotationally and/or axially movable, relative to the bulkhead housing 14, the ring retainer 16, and the backup ring 12. The sealing assembly 4 is designed to accommodate lateral misalignment, deflection, and lateral motion (such as dynamic runout) of the shaft element 8, the backup ring 12, and the pressure-retaining seal 10 relative to the bulkhead housing 14 and the ring retainer 16.

The bulkhead housing 14 preferably incorporates a shaft passageway 24 of annular form that faces generally radially inward, and preferably is located radially outward of and surrounds a portion of the shaft element 8, and preferably is located radially outward of and surrounds a portion of the sealing surface 6 of the shaft element 8.

The shaft element 8 is typically supported and guided for motion, such as rotation and/or axial movement, by one or more bearings, which are not shown. The guidance of shaft elements by bearings is well known in the prior art, and has been for many centuries. The aforementioned lateral misalignment and dynamic runout are caused by factors such as bearing internal and mounting clearances, and machining eccentricity. The aforementioned lateral deflection is typically related to side loading.

The shaft passageway 24 is typically large enough to accommodate anticipated levels of relative lateral motion between the bulkhead housing 14 and the shaft element 8 without heavily loaded contact occurring between the shaft element 8 and the shaft passageway 24. Variations are, however, possible where the shaft passageway 24 serves as a journal bearing bore that locates the shaft element 8 laterally. A bulkhead end surface 26 of the bulkhead housing 14 preferably faces in a generally axial direction away from the ring retainer 16.

The backup ring 12 is preferably captured between, and axially located by, surfaces of the bulkhead housing 14 and the ring retainer 16.

The shaft element 8, the ring retainer 16, the backup ring 12, and the bulkhead housing 14 may be made from any suitable material, as for example metal. As shown, the backup ring 12 may be made from more than one component, if desired.

A first fluid 28 having a first fluid pressure is located within the sealing assembly 4 inboard of the pressure-retaining seal 10, and preferably at least a portion of the first fluid 28 is located within the ring retainer 16. A portion of the shaft element 8 that is located inboard of the pressure-retaining seal 10 is preferably located within the ring retainer 16, and this portion of the shaft element 8 is preferably exposed to and wetted by the first fluid 28 and exposed to the first fluid pressure. More specifically, a portion of the sealing surface 6 of the shaft element 8 is preferably located within the ring retainer 16, and this portion of the sealing surface 6 is preferably exposed to and wetted by the first fluid 28 and exposed to the first fluid pressure. The first fluid 28 is preferably a liquid-type lubricant, such as oil or hydraulic fluid.

A second fluid 30 having a second fluid pressure is located outboard of the pressure-retaining seal 10. A portion of the second fluid 30 is preferably located radially between the shaft element 8 and the shaft passageway 24 of the bulkhead housing 14, exposing a portion of the shaft element 8 to the second fluid 30 and the second fluid pressure, and exposing the shaft passageway 24 of the bulkhead housing 14 to the second fluid 30 and the second fluid pressure. More specifically, a portion of the second fluid 30 is preferably located radially between the sealing surface 6 of the shaft element 8 and the shaft passageway 24 of the bulkhead housing 14, exposing a portion of the sealing surface 6 to the second fluid 30 and the second fluid pressure, and exposing the shaft passageway 24 of the bulkhead housing 14 to the second fluid 30 and the second fluid pressure. It should be understood that in FIG. 1, the sealing assembly 4 is illustrated as being located within and surrounded by the second fluid 30, which is typically the atmosphere of the earth. This means that the exterior surfaces of the bulkhead housing 14 and the ring retainer 16 are exposed to and contacted by the second fluid 30, as are the heads of the bolts 18. If the scaling assembly 4 were part of a pressure staged system, however, the second fluid may be a liquid-type fluid such as a lubricant, as taught by the prior art of commonly assigned U.S. Pat. No. 9,429,238.

Preferably, at least a portion of the sealing surface 6 of the shaft element 8 is located within the bulkhead housing 14. Preferably, the sealing surface 6 of the shaft element 8 has a portion thereof that is located inboard of the pressure-retaining seal 10 that is exposed to the first fluid 28 and the first fluid pressure. Preferably, the sealing surface 6 of the shaft element 8 has a portion thereof that is located outboard of the pressure-retaining seal 10 that is exposed to the second fluid 30 and the second fluid pressure. Thus, it can accurately be said that, preferably, the shaft element 8 has a portion thereof exposed to the first fluid 28, and a portion thereof exposed to the second fluid 30.

In many types of applications, the second fluid 30 is typically the atmosphere of the planet earth. In other applications, the second fluid 30 may be something other than the atmosphere of the planet earth. The pressure of the first fluid 28 may be greater than the pressure of the second fluid 30. In fact, the pressure of the first fluid 28 is typically greater than the pressure of the second fluid 30 during operation of the sealing assembly 4.

The pressure-retaining seal 10 is in sealing engagement with the sealing surface 6 of the shaft element 8. Preferably, the first fluid 28 contacts the pressure-retaining seal 10. The pressure-retaining seal 10 partitions the first fluid 28 from the second fluid 30 and retains the first fluid pressure, withstanding the usually large pressure difference between the first fluid 28 and the second fluid 30 that may occur in service. In other words, the pressure-retaining seal 10 serves as a boundary between the first fluid 28 and the second fluid 30, and also serves as a boundary between the first fluid pressure and the second fluid pressure.

When used herein, the term "partitions" is not meant to imply perfect separation of the first and second fluids, because it is well known in the art that many types of dynamic seals have small but acceptable fluid leak rates. For example, the type of packing most commonly used in oilfield washpipe assemblies (see U.S. Pat. No. 2,764,428) has a slow but acceptable leak rate that is apparently related to the surface texture created by fabric reinforcement of the elastomer used to form the packing. For another example, various types of seals developed by the inventor and his associates have a slow but acceptable leak rate resulting from a hydrodynamic pumping action that pumps seal lubricant into the dynamic sealing interface in response to relative rotation; see U.S. Pat. Nos. 4,610,319, 5,230,520, 5,738,358, 5,873,576, 6,036,192, 6,109,618, 6,120,036, 6,315,302, 6,382,634, 6,685,194, 6,767,016, 7,052,020, 7,562,878, 7,770,898, 8,056,904, 8,075,000, 8,550,467, 9,086,151, 9,103,445 and 9,121,504. For another example, the nearly inevitable misalignments that occur in sealing assemblies cause common U and V spring-loaded lip seals and garter spring-loaded lip seals to have a leak but acceptable leak rate during rotary operation. Likewise, the hydrodynamic activity associated with relative reciprocation causes typical lip seals to have a slight leak rate that has the benefit of lubricating the dynamic sealing interface. As a further example, factors, such as the nearly inevitable misalignments that occur in sealing assemblies, cause mechanical face seals to have a slow but acceptable leak rate during rotary operation.

If desired, the first fluid 28 and the first fluid pressure can be provided by any suitable pressure supply, such as, but not limited to, one of the types of pressure supplies described in conjunction with the prior art. One form of a suitable pressure supply would be one of the prior art computer-controlled pressure supplies, where a hydraulic fluid is circulated through an orifice. Either the orifice size or the flow rate is varied to control the first fluid pressure. Another example of a suitable pressure supply would be the differential area piston arrangement described in conjunction with prior art washpipe assemblies; for example, see the lubricant supplies shown in U.S. Pat. Nos. 2,150,529, 2,608,385, 6,007,105 and U.S. Pub. Appl. No. 20160356382. Various types of prior art pressure supplies are described in the "Kalsi Seals Handbook," which is a publication of Kalsi Engineering Inc. of Sugar Land, Tex.

For the purposes of this specification, the term "fluid" has its broadest meaning, encompassing both liquids and gases. The first fluid 28 is preferably a liquid-type lubricant such as a synthetic or natural oil, although other fluids are also perfectly suitable in some applications. The first fluid 28 may be any type of inboard fluid or combination of fluids that the pressure-retaining seal 10 may be exposed to and retain in service. Likewise, the second fluid 30 may be any type of outboard fluid or combination of fluids that the pressure-retaining seal 10 may be exposed to in service. In this specification, the terms "inboard" and "outboard" are expressed relative to the pressure-retaining seal 10. A first seal end 60 of the pressure-retaining seal 10 faces inboard and a second seal end 62 faces outboard.

The assembly preferably incorporates a ring first end seal shown generally at 32, an inner balancing seal shown generally at 34, and an outer balancing seal shown generally at 36. Each of the seals 32, 34, and 36 are preferably composed of two components that are described in more detail in conjunction with subsequent figures. The seals 32, 34, and 36 provide sealing in face-sealing fashion, establishing a sealed relationship with the components they are axially compressed between by virtue of the sealing contact force they establish at the interfaces with the components they are compressed between. This contact force allows the face sealing elements to block the passage of fluid between the components they are compressed between. The aforementioned face sealing elements, and their respective locating seal grooves, are preferably radially spaced from, located radially outward from, and encircle the shaft element 8, and are preferably radially spaced from, located radially outward from, and encircle the sealing surface 6 of the shaft element 8.

Preferably, at least a portion of each of the following seals is exposed to the first fluid 28 and the first fluid pressure: pressure-retaining seal 10; ring first end seal 32; inner balancing seal 34; and outer balancing seal 36. More specifically, the inner portion of the ring first end seal 32, the outer portion of the inner balancing seal 34, and the inner portion of the outer balancing seal 36 are preferably exposed to the first fluid 28 and the first fluid pressure.

Preferably, at least a portion of each of the following seals is exposed to the second fluid 30: pressure-retaining seal 10; ring first end seal 32; inner balancing seal 34; and outer balancing seal 36. More specifically, the outer portion of the ring first end seal 32; the inner portion of the inner balancing seal 34; and the outer portion of the outer balancing seal 36 preferably have a portion thereof exposed to the second fluid 30 and the second fluid pressure.

As taught by U.S. Pat. No. 9,429,238, the backup ring 12 preferably has a ring outer surface 38, and the second fluid 30 and the second fluid pressure can be communicated to the ring outer surface 38 by a radial hole (not shown) through the backup ring 12 or through the bulkhead housing 14, or by capturing the second fluid 30 and the second fluid pressure in the annular space surrounding the ring outer surface 38 at the time of assembly, or (as shown) by simply leaving the interface between the ring retainer 16 and the bulkhead housing 14 unsealed so that the second fluid 30 and the second fluid pressure can seep between the ring retainer 16 and the bulkhead housing 14.

Preferably, the backup ring 12 has an inner first ring end 40A an outer first ring end 40B, an inner second ring end 42A and an outer second ring end 42B.

Assuming theoretically perfect concentric alignment for the sake of discussion, the shaft element 8 shares the theoretical axis of the sealing assembly 4, and the ring retainer 16 is separated from the axis by a radial distance, the backup ring 12 is separated from the axis by a radial distance, and preferably, the radial distance separating the ring retainer 16 from the axis is greater than the radial distance separating the backup ring 12 from the axis, and preferably at least a part of the ring retainer 16 is exposed to the first fluid 28 (as shown) and the first fluid pressure, and preferably the inner second ring end 42A and the outer second ring end 42B of the backup ring 12 face in a generally axial direction away from the ring retainer 16. (As a simplification, the inner second ring end 42A and the outer second ring end 42B can be combined into a single axially facing surface, as shown by FIG. 7 of commonly assigned U.S. Pat. No. 9,429,238. As an alternate simplification, the inner second ring end 42A and the outer second ring end 42B can be a pair of separate, axially facing surfaces laying on the same plane.)

The sealing surface 6 is separated from the theoretical axis by a radial distance, and preferably, the radial distance separating the ring retainer 16 from the axis is greater than the radial distance separating the sealing surface 6 from the axis, and the radial distance separating the backup ring 12 from the axis is preferably no less than the radial distance separating the sealing surface 6 from the axis.

The bulkhead housing 14 and ring retainer 16 are preferably mounted stationary with respect to one another in the axial, lateral, and circumferential directions, with the exception of pressure-induced deflection. The bulkhead housing 14 may incorporate a radially inwardly facing ring pocket bore 44 that is located radially outward of, radially spaced from, faces toward, and encircles at least a portion of the ring outer surface 38 of the backup ring 12, and has radial clearance with respect to the ring outer surface 38. A portion of the backup ring 12 is preferably located radially between the ring pocket bore 44 and the sealing surface 6. The ring outer surface 38 preferably faces radially outward toward the ring pocket bore 44, as shown. For ease of manufacture, the ring outer surface 38 may be generally cylindrical, if desired.

It can be appreciated that it is a matter of design choice whether to incorporate the ring pocket bore 44 as a feature of the bulkhead housing 14 or as a feature of the ring retainer 16, the ring pocket bore 44 primarily providing the necessary axial and radial space to accommodate a portion of the backup ring 12. It can therefore be said that the ring pocket bore 44 can be formed in one of the components selected from the group consisting of the bulkhead housing 14 and the ring retainer 16. It is preferred that the ring pocket bore 44 be a feature of the bulkhead housing 14 as shown, because then, the material radially outward of the ring pocket bore 44 strengthens the bulkhead housing 14, allowing the bulkhead housing 14 to better resist pressure-induced axial deflection, particularly in the general region of the bulkhead housing 14 that is located radially inward of the heads of the pattern of bolts 18 (i.e., the region of the bulkhead housing 14 that is located axially between the backup ring 12 and the bulkhead end surface 26).

Preferably, the backup ring 12 has an annular extension 46 encircling the pressure-retaining seal 10, and preferably the ring retainer 16 has a receiving recess 48 encircling the annular extension 46. Preferably, the receiving recess 48 is of annular form.

The radial distance between the ring pocket bore 44 and the sealing surface 6 of the shaft element 8 is preferably greater than the radial distances separating the following features from the sealing surface 6: the ring outer surface 38; the annular extension 46; the receiving recess 48; the ring first end seal 32; the inner balancing seal 34; and the outer balancing seal 36.

In this specification, the definition of the words "adjoin", "adjoins", and "adjoining" includes the commonly accepted "adjoin" definition "to be close to or in contact with one another" that is provided by the Merriam-Webster online dictionary for the word "adjoin". Although this definition is provided herein, this is not an example of the inventor being his own lexicographer, since the definition given is simply the commonly understood and accepted definition.

Preferably, the bulkhead housing 14 has an inner locating shoulder 50A and an outer locating shoulder 50B that face in a generally axial direction toward and adjoin the inner second ring end 42A and the outer second ring end 42B, respectively. The inner second ring end 42A is located closer to the shaft element 8, compared to the outer second ring end 42B. Likewise, the inner locating shoulder 50A is located closer to the shaft element 8, compared to the outer locating shoulder S0B. If desired as a simplification, the inner locating shoulder 50A and the outer locating shoulder 50B can be formed into a single locating shoulder, or two shoulders laying on the same plane. For a simplification example, see FIG. 7 of commonly assigned U.S. Pat. No. 9,429,238.

Together, the inner locating shoulder 50A and the outer locating shoulder 50B and the ring pocket bore 44 form a recess, which might be termed a cavity, in which at least part of the backup ring 12 resides, as shown. Preferably, this recess or cavity is a result of the bulkhead housing 14 forming the ring pocket bore 44, because this arrangement provides the bulkhead housing 14 with more strength by virtue of the inclusion of the portion of the bulkhead housing 14 that is located radially outward from the ring pocket bore 44, making the bulkhead housing 14 stiffer and stronger and more capable of handling the hydraulic force of the pressure of the first fluid 28 acting axially upon the bulkhead housing 14, thus allowing the portion of the bulkhead housing 14 between the backup ring 12 and the bulkhead end surface 26 to be shorter than it would be if the ring pocket bore 44 were part of the ring retainer 16. Preferably, all the backup ring 12 and all the bulkhead housing 14 are larger than the sealing surface 6 of the shaft element 8, as shown.

Preferably, a portion of the backup ring 12 is exposed to and contacted by the first fluid 28 and the first fluid pressure and preferably a portion of the backup ring 12 is exposed to and contacted by the second fluid 30 and the second fluid pressure. Preferably, a portion of the backup ring 12 that is located in radially intermediate relation to the pressure-retaining seal 10 and the ring first end seal 32 and includes a portion of the annular extension 46 is exposed to and contacted by the first fluid 28 and the first fluid pressure. Preferably, a portion of the backup ring 12 that is located in radially intermediate relation to the inner balancing seal 34 and the outer balancing seal 36 is exposed to and contacted by the first fluid 28 and the first fluid pressure. Preferably, a portion of the backup ring 12 that is located in axially intermediate location to the ring first end seal 32 and the outer balancing seal 36 and includes the ring outer surface 38 is exposed to and contacted by the second fluid 30 and the second fluid pressure.

When used in this specification, the word "intermediate" has the normal dictionary meaning of, "occurring in the middle of a . . . series" (Merriam-Webster's Learner's Dictionary).

Preferably, a portion of the bulkhead housing 14 is exposed to and contacted by the first fluid 28 and preferably a portion of the bulkhead housing 14 is exposed to and contacted by the second fluid 30. Preferably, a portion of the bulkhead housing 14 that is located in radially intermediate relation to the inner balancing seal 34 and the outer balancing seal 36 is exposed to and contacted by the first fluid 28 and the first fluid pressure. Preferably, a portion of the bulkhead housing 14 that is located in axially intermediate location to the ring first end seal 32 and the outer balancing seal 36 and includes the ring pocket bore 44 is exposed to and contacted by the second fluid 30 and the second fluid pressure.

Preferably, a portion of the ring retainer 16 is exposed to and contacted by the first fluid 28 and preferably a portion of the ring retainer 16 is exposed to and contacted by the second fluid 30. Preferably, a portion of the ring retainer 16 that is located radially inward from the ring first end seal 32 is exposed to the first fluid 28 and the first fluid pressure, and preferably a portion of the ring retainer 16 that is located radially outward from the ring first end seal 32 is exposed to the second fluid 30 and the second fluid pressure.

Preferably, the ring retainer 16 surrounds at least part of the sealing surface 6 of the shaft element 8, and preferably, at least a portion of the sealing surface 6 is located inside of and is radially spaced from the ring retainer 16.

Preferably the pattern of bolts 18 pass axially through the bulkhead housing 14. The bulkhead housing 14 and the ring retainer 16 are preferably both of annular form, and preferably both are located radially outward of, radially spaced from, and encircle at least a portion of the sealing surface 6 of the shaft element 8, and preferably, at least some portions of the sealing surface 6 of the shaft element 8 are located within and surrounded by the bulkhead housing 14 and the ring retainer 16. If desired, to form a convenient modular sub-assembly, the ring retainer 16 can be secured to the bulkhead housing 14 with small axially oriented screws that are not shown, as they would be at a different angular location than shown by FIG. 1.

The sealing surface 6 of the shaft element 8 is an externally oriented, radially outwardly facing surface of generally cylindrical form that preferably faces radially outward toward the bulkhead housing 14, backup ring 12, ring retainer 16, and pressure-retaining seal 10.

Preferably, the ring retainer 16 is located radially outward of and encircles at least a portion of the shaft element 8. The shaft element 8 preferably passes completely through the bulkhead housing 14, backup ring 12, and ring retainer 16.

The pressure-retaining seal 10 is preferably a radially compressed sealing element, such as a Kalsi-brand hydrodynamic rotary shaft seal, and is comprised preferably at least in part from polymeric sealing material, and preferably includes at least some elastomer. Preferably, the pressure-retaining seal 10 establishes a sealed relationship with the components it contacts by virtue of the sealing contact force it establishes with the mating surfaces of the components it contacts. This contact force, which is preferably created by radial compression of the pressure-retaining seal 10, allows the pressure-retaining seal 10 to substantially block the passage of fluid between the components it contacts and is preferably compressed between, and allows the pressure-retaining seal 10 to block the first fluid pressure. In the event that a Kalsi-brand rotary shaft seal is used as the pressure-retaining seal 10, one should understand that such seals intentionally pump a minute film of the first fluid 28 through the interface between the pressure-retaining seal 10 and the shaft element 8, for the purpose of lubrication of the pressure-retaining seal 10. Once a film of the first fluid 28 passes through the dynamic interface of the pressure-retaining seal 10, it becomes part of, and attains the pressure of, the second fluid 30, and helps to lubricate the sliding interface between the backup ring 12 and the shaft element 8.

Within the family of Kalsi-brand rotary shaft seals, the pressure-retaining seal 10 is preferably selected from the group of hydrodynamic rotary seals described in the following U.S. Pat. No. 9,121,504 for "Rotary Seal With Improved Film Distribution;" U.S. Pat. No. 9,086,151 for "Low Torque Hydrodynamic Lip Geometry for Rotary Seals;" U.S. Pat. No. 8,550,467 for "Rotary Seal With Improved Film Distribution;" U.S. Pat. No. 8,056,904 for "Low Torque Hydrodynamic Lip Geometry for Bi-directional Rotation Seals;" U.S. Pat. No. 7,562,878 for "Low Torque Hydrodynamic Lip Geometry for Bi-directional Rotation Seals;" and/or U.S. Pat. No. 6,382,634 for "Hydrodynamic Seal With Improved Extrusion Abrasion and Twist Resistance."

Preferably, the backup ring 12 has a ring inner surface 52 that faces radially inward toward the sealing surface 6 of the shaft element 8. Preferably, the ring retainer 16 encircles a portion of the sealing surface 6 of the shaft element 8. Preferably, the shaft passageway 24 of the bulkhead housing 14 has a diameter and the ring inner surface 52 of the backup ring 12 has a diameter, and preferably the diameter of the ring inner surface 52 is smaller than the diameter of the shaft passageway 24.

Preferably, at least in larger diameter sealing assemblies, the ring inner surface 52 may be defined by a bearing liner 53 composed of a suitable bearing material, such as, but not limited to, a material such as a copper nickel tin alloy, bearing bronze, or beryllium copper. This allows the ring inner surface 52 to have exemplary journal bearing properties while allowing the remainder of the backup ring 12 to be made from a higher modulus material, such as steel, for maximum rigidity and cross-sectional twist resistance. In other words, the backup ring 12 may, if desired, have a steel ring portion 51. Also, by using steel for the steel ring portion 51 of the backup ring 12, the coefficient of thermal expansion of the backup ring 12 is dominated by the steel ring portion 51 of the backup ring 12. This is important in larger diameter sealing assemblies, because it minimizes temperature related changes to the clearance between the ring inner surface 52 of the backup ring 12 and the sealing surface 6 of the shaft element 8, because most shaft elements are made from steel. When the shaft element 8 and most of the backup ring 12 are made of steel, they have similar thermal expansion and contraction because they have similar coefficients of thermal expansion and contraction.

Preferably, a first liner end 55 of the bearing liner 53 forms part of the inner first ring end 40A of the backup ring 12. Preferably a second liner end 57 of the bearing liner 53 faces in a generally axial direction that is generally opposite to and away from the first liner end 55. Preferably, the ring inner surface 52 is located in axially intermediate location to the first liner end 55 and the second liner end 57, and is located in axially intermediate relation to the inner first ring end 40A and the inner second ring end 42A. Preferably, the bearing liner 53 also has a liner peripheral surface 59 that is generally cylindrical in form, and facing generally radially outward, away from the ring inner surface 52.

Preferably, the steel ring portion 51 of the backup ring 12 has a liner recess bore 61 facing in a generally radially inward direction toward and contacting the liner peripheral surface 59 of the bearing liner 53, and preferably the steel ring portion 51 of the backup ring 12 has a liner recess shoulder 63 facing in a generally axial direction toward and abutting the second liner end 57 of the bearing liner 53.

Preferably, the liner peripheral surface 59 of the bearing liner 53 has a press or shrink fit with the liner recess bore 61, or is soldered or bonded to the liner recess bore 61 or is secured by other means within the liner recess bore 61.

Preferably, the steel ring portion 51 of the backup ring 12 has a generally radially inwardly facing relief bore 65 that is located in intermediate axial relation to the second liner end 57 and the inner second ring end 42A, and preferably this relief bore 65 is more distant from the sealing surface 6 of the shaft element 8, compared to the ring inner surface 52 of the backup ring 12.

The bearing liner 53 typically has a larger coefficient of thermal contraction, compared to the steel ring portion 51 of the backup ring 12. When the bearing liner 53 is a shrink or press fit (i.e., an interference fit) with the liner recess bore 61, the degree of initial interference is preferably designed to be sufficient to prevent the differential thermal contraction-related loss of interference at the lowest intended service temperature. In other words, the initial interference between the liner peripheral surface 59 and the liner recess bore 61 is preferably greater than the differential thermal contraction between the liner peripheral surface 59 and the liner recess bore 61 at the lowest anticipated service temperature.

Preferably, the inner and outer balancing seals 34 and 36 are located directly radially outward of and encircle the sealing surface 6 of the shaft element 8. Preferably, the outer second ring end 42B of the backup ring 12 has an outer peripheral edge 54 that is spaced from the shaft element 8 by a radial distance, and preferably the outer balancing seal 36 is spaced from the shaft element 8 by a radial distance, and preferably, the radial distance spacing the outer peripheral edge 54 from the shaft element 8 is greater than the radial distance spacing the outer balancing seal 36 from the shaft element 8, the outer peripheral edge 54 preferably being exposed to the second fluid 30 and the second fluid pressure.

Preferably an annular portion of the inner second ring end 42A that is located in radially intermediate relation to the inner and outer balancing seals 34 and 36 is exposed to first fluid 28 and the first fluid pressure. Preferably an annular portion of the outer second ring end 42B that is located in radially intermediate relation to the inner and outer balancing seals 34 and 36 is exposed to first fluid 28 and the first fluid pressure. Preferably, at least part of the ring outer surface 38 is located more radially outward of the shaft element 8 than the outer balancing seal 36 and the ring first end seal 32, and preferably none of the ring outer surface 38 is exposed to the first fluid 28 or the first fluid pressure.

Preferably the ring retainer 16 has an innermost surface 56. Preferably the ring inner surface 52 of the backup ring 12 has a diameter and preferably the innermost surface 56 of the ring retainer 16 has a diameter, and preferably the diameter of the ring inner surface 52 is smaller than the diameter of the innermost surface 56 of the ring retainer 16.

One purpose of the backup ring 12 is to support the pressure-retaining seal 10 against differential pressure that may be acting across the pressure-retaining seal 10 due to the first fluid pressure of the first fluid 28 being greater than the second fluid pressure of the second fluid 30. An aspect of the backup ring 12 is to prevent or minimize the extrusion damage of the pressure-retaining seal 10. Another aspect of the backup ring 12 is to improve any intended hydrodynamic interfacial lubrication of the pressure-retaining seal 10 by minimizing the differential pressure induced contact pressure between the pressure-retaining seal 10 and the sealing surface 6 of the shaft element 8 near the backup ring 12.

The pressure-retaining seal 10 encircles part of the sealing surface 6 of the shaft element 8, and is preferably located at least partially inside of and encircled by the annular extension 46 of the backup ring 12. The backup ring 12 is annular, having generally circular form. The annular extension 46 of the backup ring 12 has a gland bore 58 that is located radially outward of, is radially spaced from, encircles, and faces generally toward, the sealing surface 6 of the shaft element 8. Preferably, at least a portion of the sealing surface 6 is located inside the gland bore 58 and therefore is inside of and encircled by the annular extension 46 of the backup ring 12, as shown.

Preferably, at least part of the pressure-retaining seal 10 is located between the sealing surface 6 of the shaft element 8 and the gland bore 58 of the backup ring 12. Preferably, the gland bore 58 is located radially outward of, encircles, and faces generally toward, and contacts, at least part of the pressure-retaining seal 10. At least part of the sealing surface 6 of the shaft element 8, and at least part of the pressure-retaining seal 10, are surrounded by the gland bore 58 of the backup ring 12. The pressure-retaining seal 10 is preferably retained within the gland bore 58 of the backup ring 12. Preferably, the pressure-retaining seal 10 has the first seal end 60 and the second seal end 62, and preferably at least part of the second seal end 62 is in contact with and supported by the inner first ring end 40A when differential pressure acts across the pressure-retaining seal 10, i.e., when the first fluid pressure of the first fluid 28 is greater than the second fluid pressure of the second fluid 30.

Preferably, the pressure-retaining seal 10 is held in radial compression between the sealing surface 6 of the shaft element 8 and the gland bore 58 of the backup ring 12, the radial compression causing the pressure-retaining seal 10 to establish sealing contact force with the sealing surface 6 of the shaft element 8, and with the gland bore 58 of the backup ring 12. During rotation or axial movement of the shaft element 8 relative to the bulkhead housing 14, the sealing surface 6 of the shaft element 8 preferably slips with respect to the pressure-retaining seal 10.

Preferably, the annular extension 46 of the backup ring 12 has a radially outwardly facing peripheral surface 64 that is located at least partially within the receiving recess 48 of the ring retainer 16, the receiving recess 48 being larger than, and spaced radially outward from the outwardly facing peripheral surface 64 of the backup ring 12, allowing the backup ring 12 to be laterally misaligned with respect to the receiving recess 48. Preferably, at least part of the annular extension 46 of the backup ring 12 is located radially inward of, and encircled by, the receiving recess 48 of the ring retainer 16, and preferably, at least part of the annular extension 46 of the backup ring 12 is located radially between the pressure-retaining seal 10 and the receiving recess 48.

The outer first ring end 40B of the backup ring 12 is preferably planar, and preferably parallel to the inner first ring end 40A, and preferably faces in the same axial direction as the inner first ring end 40A, as shown. The outer first ring end 40B preferably encircles at least a portion of the sealing surface 6 of the shaft element 8.

A retaining shoulder 66 of the ring retainer 16 preferably faces in a generally axial direction toward and adjoining the outer first ring end 40B of the backup ring 12. The backup ring 12 preferably has a fluid communication passageway 68 (typically in the form of a drilled hole) extending from the outer first ring end 40B to the outer second ring end 42B. Preferably, a portion of the retaining shoulder 66 that is located radially outward of the ring first end seal 32 is exposed to the second fluid 30 and the second fluid pressure. Preferably, the fluid communication passageway 68 is located in radially intermediate relation to the outer locating shoulder 50B and the inner second ring end 42A.

The inner locating shoulder 50A and the outer locating shoulder 50B of the bulkhead housing 14 are preferably generally planar in form and face in an axial direction, facing away from, and in a generally opposite direction compared to, the bulkhead end surface 26. Preferably, the inner and outer first ring ends 40A and 40B face away from the inner and outer locating shoulders 50A and 50B, and face away from the inner and outer second ring ends 42A and 42B.

Preferably, the bulkhead housing 14 has at least one inwardly projecting annular structure 70 that is located in axially intermediate relation to, and forms, the inner locating shoulder 50A and the bulkhead end surface 26, and has axial thickness between the outer locating shoulder 50B and the bulkhead end surface 26. Preferably, no inwardly projecting annular structure of the bulkhead housing 14 is interposed between the outer first ring end 40B of the backup ring 12 and the retaining shoulder 66 of the ring retainer 16, and preferably, no inwardly projecting annular structure of the bulkhead housing 14 is interposed between the inner second ring end 42A of the backup ring 12 and the inner locating shoulder 50A of the bulkhead housing 14. Preferably, no inwardly projecting annular structure of the bulkhead housing 14 is interposed between the outer second ring end 42B of the backup ring 12 and the outer locating shoulder 50B of the bulkhead housing 14. Likewise, preferably, no inwardly projecting annular structure of the bulkhead housing 14 is interposed between the inner second ring end 42A of the backup ring 12 and the inwardly projecting annular structure 70 of the bulkhead housing 14. Preferably, no inwardly projecting annular structure of the bulkhead housing 14 is interposed between the outer second ring end 42B of the backup ring 12 and the inwardly projecting annular structure 70 of the bulkhead housing 14.

Preferably, the axial distance between the inner locating shoulder 50A and the bulkhead end surface 26 is less than the axial distance between the outer locating shoulder 50I and the bulkhead end surface 26. Preferably, the axial distance between the inner second ring end 42A and the bulkhead end surface 26 is less than the axial distance between the outer second ring end 42B and the bulkhead end surface 26. Preferably, the axial distance between the inner first ring end 40A and the bulkhead end surface 26 is less than the axial distance between the outer first ring end 40B and the bulkhead end surface 26. Preferably, the axial distance between the second seal end 62 of the pressure-retaining seal 10 and the bulkhead end surface 26 is less than the axial distance between the retaining shoulder 66 and the bulkhead end surface 26.

Preferably, at least a portion of the relief bore 65 of the backup ring 12 is located directly radially outward of and encircles the sealing surface 6 of the shaft element 8, and preferably a portion of the sealing surface 6 of the shaft element 8 is located directly radially inwardly of the relief bore 65 of the backup ring 12. Preferably, as shown, the sealing surface 6 of the shaft element 8 penetrates (i.e., passes) completely through the relief bore 65, from the liner recess shoulder 63 to and preferably past the inner second ring end 42A, and preferably through at least part of the shaft passageway 24 of the bulkhead housing 14.

FIG. 1A

Figure 1A:
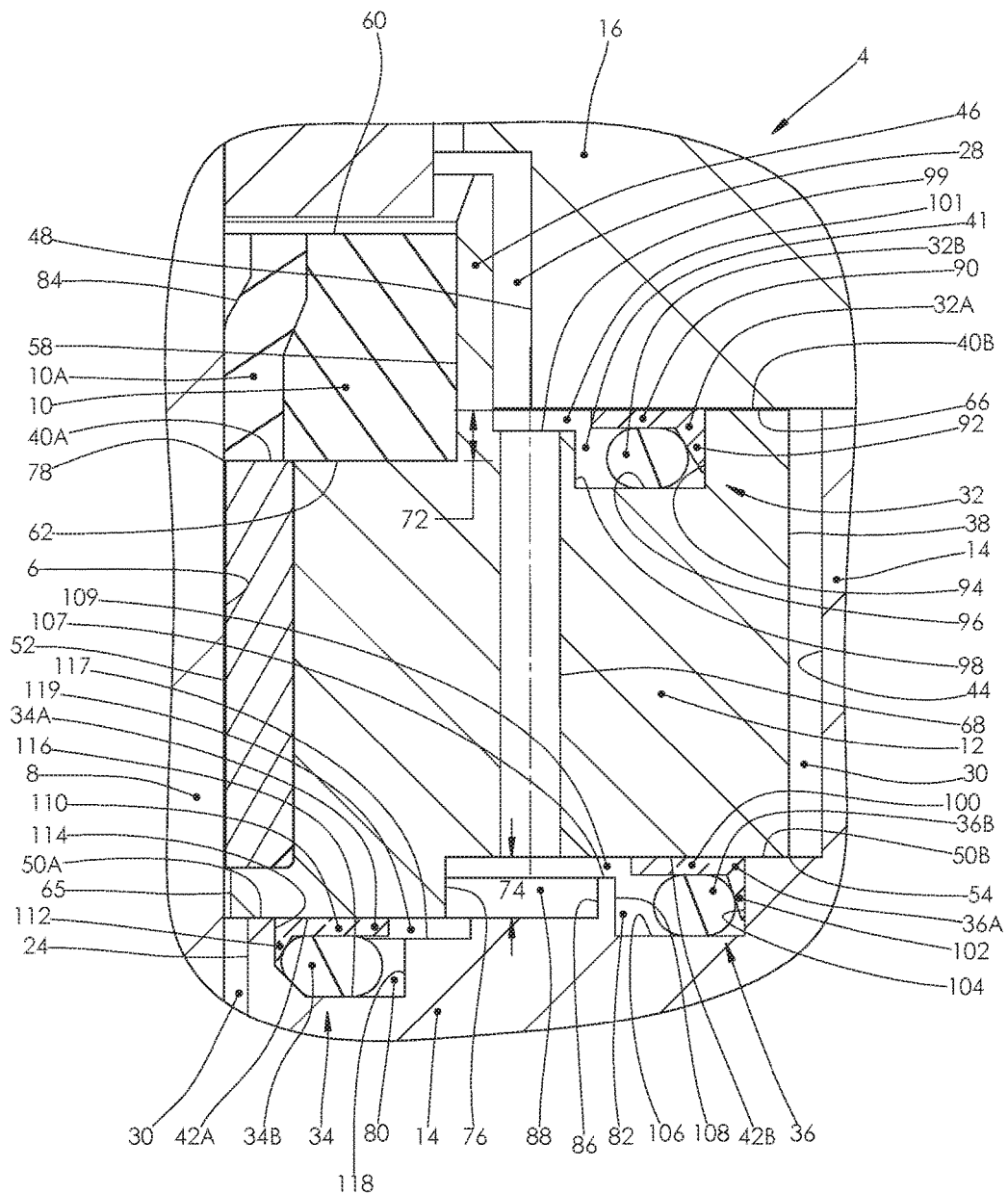
FIG. 1A is a fragmentary longitudinal cross-sectional view that is an enlargement of the cross-section illustrated in FIG. 1, to show more detail.

FIG. 1A is an enlargement of a portion of the sealing assembly 4 that is shown in FIG. 1, to show more detail.

The ring first end seal 32 is preferably located axially between a surface of the backup ring 12 and a surface of the ring retainer 16, as shown, partitioning the first fluid 28 from the second fluid 30, and preventing the first fluid 28 from escaping between the retaining shoulder 66 of the ring retainer 16 and the outer first ring end 40B of the backup ring 12 and into the second fluid 30. If desired, the ring first end seal 32 can be located by and at least partially within a first end groove 41 that is cut or otherwise formed into the outer first ring end 40B of the backup ring 12, as shown, such that the ring first end seal 32 is located between a surface of the first end groove 41 of the backup ring 12 and the retaining shoulder 66 of the ring retainer 16. One can appreciate, however, that as an alternative design choice, although somewhat less desirable, the first end groove 41 could be cut into the retaining shoulder 66 of the ring retainer 16, instead of into the outer first ring end 40B of the backup ring 12. Thus, it can be said that the first end groove 41 can be formed on one of the components selected from the group consisting of the backup ring 12 and the ring retainer 16. Preferably, the retaining shoulder 66 of the ring retainer 16 encircles at least part of the externally oriented sealing surface 6 of the shaft element 8 that locates the backup ring 12 laterally.

However configured, the ring first end seal 32 is exposed to and located between the second fluid 30 and the first fluid 28, and partitions the first fluid 28 and the first fluid pressure from the second fluid 30 and the second fluid pressure. Preferably, the ring first end seal 32 is located radially farther than said pressure-retaining seal 10 from the sealing surface 6 of the shaft element 8, and encircles the sealing surface 6.

The retaining shoulder 66 of the ring retainer 16, the inner first ring end 40A and outer first ring end 40B of the backup ring 12 are preferably flat surfaces, and preferably substantially parallel to one another.

Preferably, the ring first end seal 32 contacts and establishes sealing between the backup ring 12 and the ring retainer 16, and preferably the ring first end seal 32 is located directly radially outward from and encircles a part of the sealing surface 6 and preferably the ring first end seal 32 is located directly radially outward from and encircles at least part of the pressure-retaining seal 10. Preferably, the first end groove 41 is located radially outward from and encircles part of the sealing surface 6 and is located radially outward from and encircles part of the pressure-retaining seal 10, and is located radially outward from and encircles at least part of the gland bore 58.

Preferably, the sealing surface 6 of the shaft element 8 passes completely through the ring retainer 16, and preferably all the ring retainer 16 is larger than the sealing surface 6 of the shaft element 8.

Preferably, at least part of the sealing surface 6 of the shaft element 8 that is in contact with the pressure-retaining seal 10 is located within the ring retainer 16, and preferably the ring retainer 16 surrounds at least a part of the pressure-retaining seal 10, and surrounds at least part of the annular extension 46 of the backup ring 12.

The inner second ring end 42A and outer second ring end 42B of the backup ring 12 are preferably of generally planar form, and preferably face generally in the opposite direction from the inner first ring end 40A and the outer first ring end 40B. Preferably, the inner second ring end 42A faces toward and adjoins the inner locating shoulder 50A, and preferably the outer second ring end 42B faces toward and adjoins the outer locating shoulder 50B.

Preferably, the inner first ring end 40A and the outer first ring end 40B of the backup ring 12 are substantially flat surfaces that are substantially parallel to one another and preferably parallel to the inner second ring end 42A and outer second ring end 42B, which are also preferably substantially flat. Preferably, the inner first ring end 40A, and the outer first ring end 40B face in the same general axial direction. Preferably, the outer first ring end 40B faces away from the outer locating shoulder 50B of the bulkhead housing 14. Preferably, the inner first ring end 40A faces away from the inner locating shoulder 50A of the bulkhead housing 14. Preferably, the inner second ring end 42A and outer second ring end 42B are parallel to one another.

Preferably, the ring outer surface 38 of the backup ring 12 and the ring pocket bore 44 of the bulkhead housing 14 are exposed to the second fluid 30 and the second fluid pressure, which is preferably less than the first fluid pressure during operation. One way the second fluid pressure of the second fluid 30 may reach the ring outer surface 38 and the ring pocket bore 44 is because there is preferably no seal provided to establish sealing between the bulkhead housing 14 and the ring retainer 16, and therefore the second fluid 30 and t the second fluid pressure can pass through the unsealed and preferably clamped interface between the bulkhead housing 14 and the ring retainer 16.

As taught by the prior art, the backup ring 12 may incorporate a generally radially oriented communication hole (not shown) that communicates the second fluid 30 from a region of radial clearance between the ring inner surface 52 of the backup ring 12 and the sealing surface 6 of shaft element 8 to a region of radial clearance surrounding the ring outer surface 38 of the backup ring 12, as taught by U.S. Pat. No. 9,429,238. Preferably, this radially oriented communication hole communicates the second fluid 30 and the pressure of the second fluid 30 (the second fluid pressure) to the ring outer surface 38 of the backup ring 12, and to the surrounding ring pocket bore 44.

In some cases, the pressure of the second fluid 30 is merely atmospheric pressure, or some other negligible gas pressure. In such cases, if desired as a simplification, the atmospheric pressure or other negligible gas pressure can simply be trapped in the region surrounding the ring outer surface 38 of the backup ring 12 at the time of assembly. In such cases, the pressure applied to the ring inner surface 52 is substantially equal to the pressure applied to the ring outer surface 38, even though no pressure communication path to the ring outer surface 38 is provided once the sealing assembly 4 is assembled.

Preferably, the inner first ring end 40A and the outer first ring end 40B of the backup ring 12 are axially offset from one another by first end axial offset dimension 72, as taught by commonly assigned U.S. Pub. Appl. No. 20160356382. This axial offset produces a pressure imbalance length where the pressure differential between the first fluid 28 and the second fluid 30 acts radially outward on a portion of the gland bore 58, creating a radially outwardly acting hydraulic force that acts on the backup ring 12. This occurs because the pressure of the first fluid 28 acts through the polymeric material of the pressure-retaining seal 10. This radially outwardly acting pressure imbalance creates a moment that helps to counteract the twisting that would otherwise tend to occur as a result of the radial offset between the axially oriented hydraulic loads described below that act on the backup ring 12 from opposite directions. By providing a moment that helps to counteract this twisting, the dimensional stability of the ring inner surface 52 of the backup ring 12 is improved. As a result, the dimensional stability of the extrusion gap clearance between the ring inner surface 52 of the backup ring 12 and the sealing surface 6 of the shaft element 8 is improved by incorporation of the first end axial offset dimension 72.

Preferably, the inner second ring end 42A and the outer second ring end 42B of the backup ring 12 are axially offset from one another by a second end axial offset dimension 74, and to accommodate this offset, the inner locating shoulder 50A and the outer locating shoulder 50B are also axially offset by a similar amount. This novel axial offset between the inner second ring end 42A and the outer second ring end 42B produces a pressure imbalance length where the pressure differential between the first fluid 28 and the second fluid 30 acts radially inward on a projection outer surface 76 of the backup ring 12, creating a radially inwardly acting hydraulic force that acts on the backup ring 12. This radially inwardly acting pressure imbalance produces a moment that helps to counteract the twisting that would otherwise occur as a result of the radial offset between the axial hydraulic loads described below that act on the backup ring 12 from opposite directions. By counteracting this twisting, the dimensional stability of the ring inner surface 52 of the backup ring 12 is improved. As a result, the dimensional stability of the extrusion gap clearance between the ring inner surface 52 of the backup ring 12 and the sealing surface 6 of the shaft element 8 is improved by the incorporation of the second end axial offset dimension 74. It should be understood that the novel second end axial offset dimension 74 is the direct opposite of the second end axial offset shown in FIG. 6 of commonly assigned U.S. Pat. No. 9,429,238, and produces an oppositely acting moment, and is not directed at the same problem as the second end axial offset of U.S. Pat. No. 9,429,238. Preferably, the projection outer surface 76 is located in axially intermediate location to the inner and outer second ring ends 42A and 42B. Preferably, the projection outer surface 76 is also located in radially intermediate location to the inner and outer second ring ends 42A and 42B.

The inner first ring end 40A of the backup ring 12 preferably extends radially inward from the gland bore 58, and preferably an intersection between the inner first ring end 40A and the ring inner surface 52 forms an extrusion gap corner 78, it being understood in the art that extrusion gap corners are preferably slightly rounded external corners, the typically recommended corner radius being approximately 0.005 inches.

First end axial offset dimension 72 and second end axial offset dimension 74 can be used to fine tune the backup ring 12, in order to achieve objectives such as matching the slope of the pressure-deformed shape of the ring inner surface 52 to the slope of the pressure-deformed shape of the outwardly facing sealing surface 6 of the shaft element 8, or such as moving the zone of contact between the backup ring 12 and the shaft element 8 axially away from the extrusion gap corner 78 and the pressure-retaining seal 10, so that heat generated within the zone is axially remote from the pressure-retaining seal 10.

By using second end axial offset dimension 74 to control pressure-related distortion of the backup ring 12, the axial length of the backup ring 12 can be made shorter, because the additional strength provided by increased axial length is not needed to control pressure-related distortion. In addition to using first end axial offset dimension 72 and second end axial offset dimension 74 to control pressure related distortion of the backup ring 12, the axial thickness of the inwardly projecting annular structure 70 of the bulkhead housing 14 can be manipulated to control the slope of the inner locating shoulder 50A and the outer locating shoulder 50B, which in turn influences the pressure-related distortion of the backup ring 12. For example, the various pressure-related distortions of the components of the sealing assembly 4 can be designed so that contact between the backup ring 12 and the bulkhead housing 14 occurs either radially outward of the outer balancing seal 36, radially between the inner balancing seal 34 and the outer balancing seal 36, or radially inward of the inner balancing seal 34, if desired.

Compared to the prior art of commonly assigned U.S. Pub. Appl. No. 20160356382, "High pressure dynamic sealing arrangement", the use of the second end axial offset dimension 74 introduces additional tolerance stackup that tends to increase the extrusion gap clearance of one of the aforesaid inner and outer balancing seals 34 and 36. This negative consequence of using the second end axial offset dimension 74 is rendered more practicable for extreme differential pressure sealing conditions by the significantly enhanced high-pressure extrusion resistance that is provided by the novel telescoping jackets 32A, 34A, and 36A.

In the polymeric sealing industry, the term "extrusion gap" is well-understood by individuals who are skilled in the art. Preferably, the pressure-retaining seal 10 is exposed to the pressure of the second fluid 30 at the radial extrusion gap clearance that is present between the ring inner surface 52 of the backup ring 12 and the sealing surface 6 of the shaft element 8 at the extrusion gap corner 78. The pressure-retaining seal 10 must bridge/seal the extrusion gap in order to withstand the differential pressure between the first fluid 28 and the second fluid 30, and to prevent the pressure-driven wholesale loss of the first fluid 28.

The pressure-retaining seal 10 is of annular form. Preferably the first seal end 60 of the pressure-retaining seal 10 faces toward and is exposed to and contacts the first fluid 28, and preferably the second seal end 62 of the pressure-retaining seal 10 faces toward the inner first ring end 40A of the backup ring 12, the second seal end 62 preferably contacting, and supported by, the inner first ring end 40A of the backup ring 12. The second seal end 62 and the inner first ring end 40A are preferably located directly radially between the ring outer surface 38 and the sealing surface 6 of the shaft element 8, and are preferably encircled by the ring outer surface 38.

The ring inner surface 52 of the backup ring 12 is preferably substantially or generally cylindrical in the relaxed, unloaded state, but may have generally radial holes and/or axial or spiral grooves for various purposes, as taught by the prior art. The grooves, if present, should not extend to the inner first ring end 40A.

The ring inner surface 52 of the backup ring 12 faces in a generally radially inward direction toward and encircling the outwardly facing sealing surface 6 of the shaft element 8, establishing a journal bearing relationship therewith, and a region of clearance therewith. Preferably, the clearance between the ring inner surface 52 and the sealing surface 6 is made as small as practicable, considering factors such as tolerances, differential thermal expansion between the ring inner surface 52 of the backup ring 12 and the sealing surface 6 of the shaft element 8 during operation and, when idle, any pressure-induced outward deformation (pressure breathing) of the shaft element 8, and force imbalance and/or misalignment that may act on the backup ring 12 to cause the diameter and/or shape of the ring inner surface 52 to change.

Both the inner first ring end 40A and the ring inner surface 52 are preferably located radially outward of, are radially spaced from, and encircle the sealing surface 6 of the shaft element 8, the ring inner surface 52 preferably having an annular shape having a diameter that is larger than the diameter of the annular shape of the sealing surface 6 of the shaft element 8. Preferably, the region where the aforementioned bearing relationship exists is located in intermediate relation with the inner first ring end 40A and the inner second ring end 42A, and is located in intermediate relation with the inner first ring end 40A and the inner locating shoulder 50A, and is located in intermediate relation with the inner first ring end 40A and the inner balancing seal 34. Preferably, the aforementioned region of clearance is located in intermediate relation with the inner first ring end 40A and the inner second ring end 42A, and is located in intermediate relation with the inner first ring end 40A and the inner locating shoulder 50A, and is located in intermediate relation with the inner first ring end 40A and the inner balancing seal 34.

The ring inner surface 52 and the sealing surface 6 preferably have radial clearance with one another at most circumferential locations; this radial clearance forms what is known in the sealing industry as the extrusion gap at the inner first ring end 40A of the backup ring 12, and the pressure-retaining seal 10 must bridge this extrusion gap. The smaller the extrusion gap, the better the pressure-retaining seal 10 can withstand differential pressure between the first fluid 28 and the second fluid 30.

The outer first ring end 40B of the backup ring 12 preferably faces toward and adjoins the retaining shoulder 66. The ring first end seal 32 contacts, is axially located between, and establishes sealing between, the backup ring 12 and the ring retainer 16, partitioning the first fluid 28 and the pressure of the first fluid 28 from the second fluid 30 and the pressure of the second fluid 30. In this specification, the terms "pressure of the first fluid 28" and "first fluid pressure" are interchangeable, and the terms "pressure of the second fluid 30" and "second fluid pressure" are interchangeable.

A portion of the backup ring 12 is preferably located in axially intermediate relation to the retaining shoulder 66 of the ring retainer 16 and the outer locating shoulder 50B of the bulkhead housing 14, and this portion of the backup ring 12 is preferably located directly between the retaining shoulder 66 and the outer locating shoulder SOB, and the backup ring 12 is preferably located axially by the retaining shoulder 66 and a shoulder selected from a group consisting of the inner locating shoulder 50A and the outer locating shoulder 50B of the bulkhead housing 14.

The inner second ring end 42A of the backup ring 12 preferably faces toward and adjoins the inner locating shoulder 50A of the bulkhead housing 14. The outer second ring end 42B of the backup ring 12 preferably faces toward and adjoins the outer locating shoulder 50B of the bulkhead housing 14.

The inner locating shoulder 50A and the outer locating shoulder 50B of the bulkhead housing 14 are preferably generally planar in form and preferably face in an axial direction, generally toward the backup ring 12. The outer locating shoulder 50B faces generally toward the retaining shoulder 66 of the ring retainer 16 and the inner locating shoulder 50A faces generally toward the second seal end 62 of the pressure-retaining seal 10. In turn, the second seal end 62 of the pressure-retaining seal 10 faces generally toward the inner locating shoulder 50A of the bulkhead housing 14.

The inner locating shoulder 50A preferably faces generally toward and adjoins the inner second ring end 42A of the backup ring 12, and the outer locating shoulder 50B preferably faces generally toward and adjoins the outer second ring end 42B of the back-up ring 12.

The retaining shoulder 66 of the ring retainer 16 preferably faces in an axial direction generally toward the outer locating shoulder 50B of the bulkhead housing 14, and preferably faces generally toward and adjoins the outer first ring end 40B of the backup ring 12.

The retaining shoulder 66 of the ring retainer 16 is axially separated from the outer locating shoulder 50B of the bulkhead housing 14 by a separation distance, and the outer first ring end 40B of the backup ring 12 is separated from the outer second ring end 42B of the backup ring 12 by an end-to-end distance, the separation distance between the retaining shoulder 66 and the outer locating shoulder 50B being slightly greater than the end-to-end distance between the outer first ring end 40B and the outer second ring end 42B, leaving the backup ring 12 unclamped axially, and relatively free to move laterally with any lateral motion of the shaft element 8.

The inner balancing seal 34 and the outer balancing seal 36 are preferably located axially between, and in sealed contact with, the backup ring 12 and the bulkhead housing 14. The inner balancing seal 34 and the outer balancing seal 36 retain the first fluid 28 and the first fluid pressure between them, the first fluid 28 and the first fluid pressure being preferably communicated to the region between the inner balancing seal 34 and the outer balancing seal 36 by the fluid communication passageway 68.

Preferably, the inner balancing seal 34 is located by and at least partially in, a face-type inner balancing seal groove 80. Preferably, the outer balancing seal 36 is located by and at least partially in, a face-type outer balancing seal groove 82. Preferably, the inner and outer balancing seals 34 and 36 partition the pressure of the first fluid 28 from the pressure of the second fluid 30.

If desired, the inner and outer balancing seal grooves 80 and 82 can be cut or otherwise formed into the inner locating shoulder 50A and outer locating shoulder S0B of the bulkhead housing 14, as shown, opening toward the backup ring 12. Alternately, as a less desirable design choice, the inner and outer balancing seal grooves 80 and 82 can be formed into the backup ring 12, opening toward the bulkhead housing 14. Therefore, it can be said that the inner and outer balancing seal grooves 80 and 82 can be formed in a component selected from the group consisting of the bulkhead housing 14 and the backup ring 12.

The inner and outer balancing seals 34 and 36 are located radially outward from, and encircle, the shaft element 8, and preferably encircle the sealing surface 6 of the shaft element 8. Preferably, the outer balancing seal 36 is located radially outward from, and is radially spaced from the inner balancing seal 34, establishing an annular sealed region therebetween. Because the second end axial offset dimension 74 may be less than the axial depth of the outer balancing seal groove 82, as shown, the outer balancing seal 36 may encircle a portion of the inner balancing seal 34 and the inner balancing seal groove 80, as shown, such that a portion of the outer balancing seal groove 82 is located directly radially outward of the inner balancing seal groove 80, as shown.

The pressure-retaining seal 10 preferably has a plastic layer 10A that contacts the sealing surface 6 of the shaft element 8 and contacts the inner first ring end 40A of the backup ring 12 and bridges the extrusion gap clearance between the ring inner surface 52 of the backup ring 12 and the sealing surface 6 of the shaft element 8, preventing gross leakage and loss of the first fluid 28. This plastic layer 10A stiffens the pressure-retaining seal 10, making it more extrusion resistant, compared to a seal made completely from elastomer. Preferably, the portion of the pressure-retaining seal 10 that is not part of the plastic layer 10A is made from elastomer.

The pressure-retaining seal 10 bridges the extrusion gap clearance between the ring inner surface 52 of the backup ring 12 and the sealing surface 6 of the shaft element 8, preventing gross leakage and loss of the first fluid 28, whether the pressure-retaining seal 10 has a plastic layer 10A, or as a simplification, is composed entirely of elastomer, or has some other seal construction known to the art. In other words, the pressure-retaining seal 10 seals the extrusion gap between the ring inner surface 52 and the sealing surface 6 of the shaft element 8 at the extrusion gap corner 78, retaining the pressure of the first fluid 28.

As previously noted, the pressure-retaining seal 10 preferably also has an elastomer layer that contacts the gland bore 58 and the inner first ring end 40A of the backup ring 12 as shown. It should be noted that the second seal end 62 of the pressure-retaining seal 10 that faces and contacts the inner first ring end 40A of the backup ring 12 is closer to the inner locating shoulder 50A of the bulkhead housing 14, compared to the first seal end 60 of the pressure-retaining seal 10.

The pressure-retaining seal 10 preferably has a fluid facing surface 84 that is exposed to and contacted by the first fluid 28 and is sloped relative to the sealing surface 6 of the shaft element 8, providing and having gradual convergence with the sealing surface 6. The fluid facing surface 84 preferably varies in axial location around the circumference of the pressure-retaining seal 10, thus forming a seal hydrodynamic inlet that produces a controlled pumping action that forces a very thin lubricating film of the first fluid 28 between the pressure-retaining seal 10 and the sealing surface 6 of the shaft element 8 during periods of relative rotation between the pressure-retaining seal 10 and the sealing surface 6 in accordance with the principles described in the above-referenced rotary seal patents, and preferably a portion of this lubricating film escapes in a controlled manner into the clearance between the ring inner surface 52 of the backup ring 12 and the sealing surface 6 of the shaft element 8, becoming part of the second fluid 30 and establishing a lubricating film between the ring inner surface 52 of the backup ring 12 and the sealing surface 6 of the shaft element 8, thereby minimizing wear of the ring inner surface 52 and minimizing wear of the sealing surface 6.

By virtue of the preferred hydrodynamic pumping action of the pressure-retaining seal 10, the portion of the thin lubricating film that enters the clearance region between the ring inner surface 52 of the backup ring 12 and the sealing surface 6 of the shaft element 8 thus becomes a part of the second fluid 30, and in becoming a part of the second fluid 30, acquires the pressure of the second fluid 30 it is now part of. Preferably, the ring inner surface 52 of the backup ring 12 is in tangential contact with the sealing surface 6 of the shaft element 8, forming a circumferentially gradually converging hydrodynamic bearing inlet. In other words, the ring inner surface 52 preferably establishes a journal bearing relationship with the sealing surface 6, locating the backup ring 12 laterally.

Preferably the ring inner surface 52, the hydrodynamic bearing inlet, and the journal bearing relationship are located in axially intermediate relation to the pressure-retaining seal 10 and the inner locating shoulder 50A of the bulkhead housing 14, and are located in axially intermediate relation to the pressure-retaining seal 10 and the inner balancing seal 34, and are located in axially intermediate relation to the inner first ring end 40A and the inner second ring end 42A, and are located in axially intermediate relation to the pressure-retaining seal 10 and the inner second ring end 42A. In other words, in the order of the features, the pressure-retaining seal 10 comes first, the ring inner surface 52 comes second, and the inner second ring end 42A comes third.

The backup ring 12 has a radial thickness between the ring inner surface 52 and the ring outer surface 38, and the optional radially oriented communication hole (not shown) preferably passes completely though this radial thickness. Preferably, the optional radially oriented communication hole is located between, and axially spaced from, the outer first ring end 40B and the outer second ring end 42B of the backup ring 12, and is located between and axially spaced from the ring first end seal 32 and the outer balancing seal 36, and is located between and axially spaced from the retaining shoulder 66 of the ring retainer 16 and the outer locating shoulder 50B of the bulkhead housing 14, and is located between and axially spaced from the inner first ring end 40A and the inner second ring end 42A, and is located between and axially spaced from the pressure-retaining seal 10 and the inner second ring end 42A. This optional radially oriented communication hole preferably has first and second oppositely facing open ends, the first open end facing generally radially inward toward the sealing surface 6 of the shaft element 8, and the second open end being located generally radially outward of the first open end and facing generally radially outward and away from the sealing surface 6 of the shaft element 8.

The inner and outer balancing seals 34 and 36 and the ring first end seal 32 partition the first fluid 28 from the second fluid 30, and partition the pressure of the first fluid 28 from the pressure of the second fluid 30.

Both the ring inner surface 52 and the ring outer surface 38 of the backup ring 12 are exposed to and contacted by the second, fluid 30, and the pressure of the second fluid 30, enabling the backup ring 12 to be approximately radially pressure balanced, and therefore relatively immune to pressure related radial deformation. The region of radial clearance between the ring inner surface 52 of the backup ring 12 and the sealing surface 6 of shaft element 8 forms what is in the sealing industry commonly called an "extrusion gap" at the inner first ring end 40A, and the first fluid 28 is prevented from freely passing through this extrusion gap by the pressure-retaining seal 10.

Preferably, all of the ring retainer 16 is larger than the sealing surface 6 of the shaft element 8. The sealing surface 6 of the shaft element 8 preferably passes completely through the ring inner surface 52 of the backup ring 12, and preferably passes completely through the backup ring 12, the inner second ring end 42A and the outer second ring end 42B preferably being located radially outward of and encircling the sealing surface 6, and the sealing surface 6 preferably entering at least a portion of the shaft passageway 24 of the bulkhead housing 14, and if desired may pass completely through the shaft passageway 24, the shaft passageway 24 preferably being larger than and located radially outward from the shaft sealing surface 6 and preferably encircling at least part of the shaft sealing surface 6, and preferably all of the bulkhead housing 14 being larger than, and located radially outward from, the shaft sealing surface 6.

The ring inner surface 52 of the backup ring 12 is preferably located closer to the sealing surface 6, compared to the shaft passageway 24, and preferably, no part of the bulkhead housing 14 is closer to the sealing surface 6 of the shaft element 8, compared to the ring inner surface 52 of the backup ring 12. Preferably, the ring inner surface 52 has a diameter and the shaft passageway 24 has a diameter, and preferably the diameter of the ring inner surface 52 is smaller than the diameter of the shaft passageway 24.

Preferably, the bulkhead housing 14 has several surfaces forming diameters, and preferably the diameter of the shaft passageway 24 is the smallest of the diameters formed by the several surfaces of the bulkhead housing 14. Preferably, the sealing surface 6 of the shaft element 8 passes completely through the bulkhead housing 14.

The ring outer surface 38 of the backup ring 12 is preferably located radially outward of the ring inner surface 52, and the radial distance from the ring outer surface 38 to the sealing surface 6 of the shaft element 8 is greater than the radial distance from the shaft passageway 24 to the shaft sealing surface 6.

The inner and outer balancing seals 34 and 36 are each exposed to, contacted by, and located between the second fluid 30 and the first fluid 28, and each of the inner and outer balancing seals 34 and 36 prevents the first fluid 28 from escaping between the backup ring and the bulkhead housing and into the second fluid 30, and seals the second fluid 30 from the first fluid 28. The outer balancing seal 36 is more radially distant from the shaft element 8, compared to the inner balancing seal 34 and compared to the ring first end seal 32. The inner and outer balancing seals 34 and 36 are axially separated from the ring first end seal 32, and do not contact the outer first ring end 40B or the inner first ring end 40A. Preferably, no portion of the ring outer surface 38 of the backup ring 12, and no portion of the ring inner surface 52 of the backup ring 12, is exposed to the pressure of the first fluid 28. The ring first end seal 32 does not contact the inner first ring end 40A, does not contact the inner second ring end 42A, does not contact the outer second ring end 42B, does not contact the ring outer surface 38, and does not contact the annular extension 46.

Operationally, the pressure-retaining seal 10 and the ring first end seal 32 define a first hydraulic area A1 (FIG. 1B) that is acted on by the pressure of the first fluid 28, producing a first axially acting hydraulic force that acts on the backup ring 12 in a first axial direction toward the inner locating shoulder 50A and outer locating shoulder 50B of the bulkhead housing 14. The inner and outer balancing seals 34 and 36 define a second hydraulic area A2 (FIG. 1B) that is acted on by the pressure of the first fluid 28, producing a second axially acting hydraulic force that acts on the backup ring 12 in a second axial direction, toward the retaining shoulder 66 of the ring retainer 16, the first and second axial directions being opposite. The second hydraulic area A2 is located farther from the sealing surface 6, compared to the first hydraulic area A1, which means that the first and second axially acting forces are radially misaligned. This radial misalignment creates a moment that tends to torsionally twist the backup ring, and tends to cause the ring inner surface 52 to become slightly conical in service, even though it is preferably cylindrical in its relaxed, unstressed state. This coning effect related to the radial offset of the oppositely acting hydraulic forces is addressed, as described above, by the moments created by first end axial offset dimension 72 and/or the second end axial offset dimension 74. It should be understood that as a simplification, the offset represented by the first end axial offset dimension 72 and/or the second end axial offset dimension 74 can be eliminated.

Preferably, by making the first and second hydraulic areas A1 and A2 substantially equal, the first and second axially acting hydraulic forces are substantially equal, and substantially cancel one another out, leaving the backup ring 12 substantially axially force balanced, and therefore relatively free to move laterally with any lateral motion of the sealing surface 6 of the shaft element 8, the backup ring 12 being positioned laterally with respect to the sealing surface 6 of the shaft element 8 by contact between the ring inner surface 52 of the backup ring 12 and the sealing surface 6 of the shaft element 8.

Preferably, no portion of the pressure-retaining seal 10 is located directly between the inner first ring end 40A and the inner second ring end 42A of the backup ring 12. Preferably, no portion of the backup ring 12 is smaller than the sealing surface 6 of the shaft element 8.

Preferably, a portion of the inner second ring end 42A of the backup ring 12 that is located radially inward of the inner balancing seal 34, is exposed to the second fluid 30 and the pressure of the second fluid 30, and preferably, a portion of the inner second ring end 42A that is radially outward of the inner balancing seal 34 and radially inward of the outer balancing seal 36 is exposed to the first fluid 28 and the pressure of the first fluid 28.

Preferably, a portion of the outer second ring end 42B that is located radially outward of the inner balancing seal 34 and radially inward of the outer balancing seal 36 is exposed to the first fluid 28 and the pressure of the first fluid 28, and preferably, a portion of the outer second ring end 42B that is located radially outward of the outer balancing seal 36 is exposed to the second fluid 30 and the pressure of the second fluid 30.

Preferably, a portion of the bulkhead housing 14 that is radially inward of the inner balancing seal 34 is exposed to the second fluid 30 and the pressure of the second fluid 30, and preferably, a portion of the bulkhead housing 14 that is located radially outward of the inner balancing seal 34 and radially inward of the outer balancing seal 36 is exposed to the first fluid 28 and the pressure of the first fluid 28, and preferably a portion of the bulkhead housing 14 that is located radially outward of the outer balancing seal 36 is exposed to the second fluid 30 and the pressure of the second fluid 30.

Preferably, a portion of the inner second ring end 42A of the backup ring 12 that is located radially inward of the inner balancing seal 34, is exposed to the second fluid 30 and the pressure of the second fluid 30, and preferably, a portion of the inner second ring end 42A that is radially outward of the inner balancing seal 34 and radially inward of the outer balancing seal 36 is exposed to the first fluid 28 and the pressure of the first fluid 28.

Preferably, a portion of the outer second ring end 42B of the backup ring 12 that is radially outward of the inner balancing seal 34 and radially inward of the outer balancing seal 36 is exposed to the first fluid 28 and the pressure of the first fluid 28, and preferably, a portion of outer second ring end 42B that is located radially outward of the outer balancing seal 36 is exposed to the second fluid 30 and the pressure of the second fluid 30.

Preferably, the bulkhead housing 14 has several surfaces of annular form, one of them being the shaft passageway 24, and preferably the shaft passageway 24 is closer to the shaft element 8 than the several other surfaces, and is exposed to the second fluid 30 and the pressure of the second fluid 30.

Preferably, the ring first end seal 32 is radially closer the sealing surface 6 compared to the outer balancing seal 36, and encircles part of the sealing surface 6.

Preferably, the retaining shoulder 66 of the ring retainer 16 adjoins the outer first ring end 40B of the backup ring 12. Preferably, the inner locating shoulder 50A of the bulkhead housing 14 adjoins the backup ring 12 at the inner second ring end 42A thereof, and preferably, the outer locating shoulder 50B of the bulkhead housing 14 adjoins the backup ring 12 at the outer second ring end 42B thereof.

Preferably, a planar interface is present between the retaining shoulder 66 of the ring retainer 16 and the adjoining outer first ring end 40B of the backup ring 12, and preferably the planar interface is sealed by the ring first end seal 32, and preferably, the planar interface, the retaining shoulder 66, and the outer first ring end 40B are located directly radially outward of the pressure-retaining seal 10.

Preferably, no portion of the bulkhead housing 14 is located directly between the inner second ring end 42A and the inner locating shoulder 50A. Preferably, no portion of the bulkhead housing 14 is located directly between the outer second ring end 42B and the outer locating shoulder 50B. Preferably, no portion of the bulkhead housing 14 is located directly between the outer first ring end 40B and the retaining shoulder 66.

Preferably, the backup ring 12 is located inside a component selected from a group consisting of the ring retainer 16 and the bulkhead housing 14. Preferably, the outer locating shoulder 50B faces in a generally axial direction toward the retaining shoulder 66.

The second fluid 30 is preferably located radially outward from and contacts ring first end seal 32, and the first fluid 28 is preferably located radially inward from and contacts ring first end seal 32. Radially outward of the ring first end seal 32 the retaining shoulder 66 of the ring retainer 16 is contacted by the second fluid 30 and exposed to the pressure of the second fluid 30. Radially inward of the ring first end seal 32 the retaining shoulder 66 of the ring retainer 16 is contacted by the first fluid 28 and exposed to the pressure of the first fluid 28. Thus, preferably the ring retainer 16 is exposed to the second fluid 30 and the pressure of the second fluid 30, and is exposed to the first fluid 28 and the pressure of the first fluid 28.

Preferably, at least a portion of the sealing surface 6 of the shaft element 8 that locates the backup ring 12 laterally is located within and surrounded by at least a portion of the retaining shoulder 66, such that at least a portion of the retaining shoulder 66 encircles a portion of the sealing surface 6.

Preferably, the outer peripheral edge 54 of the outer second ring end 42B of the backup ring 12 is spaced from the shaft element 8 by a radial distance, and preferably the outer balancing seal groove 82 is spaced from the shaft element 8 by a radial distance, and preferably the inner balancing seal groove 80 is spaced from the shaft element 8 by a radial distance and preferably, the radial distance spacing the outer peripheral edge 54 from the shaft element 8 is greater than the radial distance spacing the outer balancing seal groove 82 from the shaft element 8, and preferably the radial distance spacing the outer balancing seal groove 82 from the shaft element 8 is greater than the radial distance spacing the inner balancing seal groove 80 from the shaft element 8.

Preferably, all of the backup ring 12 is larger than, located directly radially outward from, and encircles a portion of the sealing surface 6 of the shaft element 8. Preferably, at least part of the inner second ring end 42A, at least part of the outer second ring end 42B, and at least part of the pressure-retaining seal 10 are exposed to the first fluid 28 and the pressure of the first fluid 28. Preferably, no portion of the ring inner surface 52 of the backup ring 12 extends axially beyond the sealing surface 6 of the shaft element 8.

The backup ring 12 is positioned in supporting engagement with the pressure-retaining seal 10, and is interposed between the pressure-retaining seal 10 and the inner locating shoulder 50A of the bulkhead housing 14.

Preferably, the fluid communication passageway 68 passes through the backup ring 12 in a generally axial direction from the outer first ring end 40B to the outer second ring end 42B, and has two open ends facing in generally opposite directions, one open end preferably facing generally away from the bulkhead housing 14, and the other open end preferably facing generally toward the bulkhead housing 14, and opening into the annular sealed region that is located radially between and established by the inner and outer balancing seals 34 and 36, the fluid communication passageway 68 preferably containing and communicating the first fluid 28 and the first fluid pressure to the aforesaid annular sealed region, the annular sealed region being exposed to the first fluid 28 and the pressure of the first fluid 28. Preferably, one open end of the fluid communication passageway 68 is located radially between and in intermediate relation to the annular extension 46 and the first end groove 41, and between the annular extension 46 and the ring outer surface 38 of the backup ring 12. Preferably, one open end of the fluid communication passageway 68 is located in radially intermediate relation to the inner and outer balancing seals 34 and 36 and faces and opens generally toward the inner locating shoulder 50A of the bulkhead housing 14, the open end separated from the shaft element 8 by a radial distance, the radial distance separating the opening from the shaft element 8 being greater than the radial distance separating the inner balancing seal 34 from the shaft element 8 and is less than the radial distance separating the outer balancing seal 36 from the shaft element 8. Preferably, the fluid communication passageway 68 is located in axially intermediate relation to the outer first ring end 40B and the outer second ring end 42B.

The bulkhead housing preferably has a radially inwardly facing step surface 86 that is located in axially intermediate relation to the inner locating shoulder 50A and outer second ring end 42B of the bulkhead housing 14, and the step surface 86 is preferably located radially outward of and encircles and faces radially inward toward the projection outer surface 76 of the backup ring 12. Together, the projection outer surface 76, the step surface 86, the inner locating shoulder 50A, and the outer second ring end 42B preferably form an annular lubricant communication pathway 88 for rapid circumferential communication of the first lubricant pressure. The projection outer surface 76 preferably faces generally radially outward toward the step surface 86.

Preferably, one open end of the fluid communication passageway 68 opens in to the annular lubricant communication pathway 88, and is located in radially intermediate location to the projection outer surface 76 and the step surface 86. Compared to the radial distance between the step surface 86 and the sealing surface 6 of the shaft element 8, the radial distance between the fluid communication passageway 68 and the sealing surface 6 is less. Compared to the radial distance between the fluid communication passageway 68 and the sealing surface 6 of the shaft element 8, the radial distance between the projection outer surface 76 and the sealing surface 6 is less. Compared to the radial distance between the fluid communication passageway 68 and the shaft element 8, the radial distance between the inner balancing seal 34 and the shaft element 8 is less. Compared to the radial distance between the outer balancing seal 36 and the shaft element 8, the radial distance between the fluid communication passageway 68 and the shaft element 8 is less. Compared to the radial distance between the outer balancing seal 36 and the sealing surface 6 of the shaft element 8, the radial distance between the ring first end seal 32 and the sealing surface 6 is less.

Preferably, the outer balancing seal groove 82 is located radially outward of and encircles part of the annular lubricant communication pathway 88, and preferably the annular lubricant communication pathway 88 is located in radially intermediate location to the outer balancing seal groove 82 and the inner balancing seal groove 80.

The inner balancing seal 34 is separated from the shaft element 8 by a radial distance and the outer balancing seal 36 is separated from the shaft element 8 by a radial distance, and the fluid communication passageway 68 is separated from the shaft element 8 by a radial distance, the radial distance separating the fluid communication passageway 68 from the shaft element 8 being greater than the radial distance separating the inner balancing seal 34 from the shaft element 8 and being less than the radial distance separating the outer balancing seal 36 from the shaft element 8. Preferably, the annular lubricant communication pathway 88 is separated from the shaft element 8 by a radial distance, the radial distance separating the annular lubricant communication pathway 88 from the shaft element 8 being greater than the radial distance separating the inner balancing seal 34 from the shaft element 8 and being less than the radial distance separating the outer balancing seal 36 from the shaft element 8.

From the foregoing description, it can be appreciated that the bulkhead housing 14 has annular form, and a portion of the bulkhead housing 14 is exposed to and contacted by the first fluid 28 and the pressure of the first fluid 28, and portions of the bulkhead housing 14 are exposed to and contacted by the second fluid 30, where the pressure of the second fluid 30 is preferably less than the pressure of the first fluid 28 during service. It can also be appreciated that portions of the backup ring 12 are exposed to and contacted by the first fluid 28 and the pressure of the first fluid 28, and portions of the backup ring 12 are exposed to and contacted by the second fluid 30 and the pressure of the second fluid 30.

The fluid communication passageway 68 is preferably located in radially intermediate relation to the inner and outer balancing seals 34 and 36, and in radially intermediate relation to the projection outer surface 76 and the step surface 86, and between the ring inner surface 52 and the ring outer surface 38, and is preferably generally axially oriented, as shown. The fluid communication passageway 68 is preferably located radially more distant from the sealing surface 6 of the shaft element 8, compared to the radial distances that separate the annular extension 46 of the backup ring 12 and the inner balancing seal 34 from the sealing surface 6 of the shaft element 8. The fluid communication passageway 68 is preferably located radially less distant from the sealing surface 6, compared to the radial distances that separate the ring first end seal 32 and the outer balancing seal 36 from the sealing surface 6.

Preferably, at least a portion of the backup ring 12 is located inside the bulkhead housing 14, as shown, and preferably at least a portion of the backup ring 12 is located inside the ring retainer 16.

The ring outer surface 38 of the backup ring 12 preferably faces in a generally radially outward direction away from the shaft element 8, and in a generally opposite direction than that of the ring inner surface 52, and may be a generally cylindrical surface. At least a portion of the ring outer surface 38 of the backup ring 12 is preferably located between and in intermediate relation to the outer locating shoulder 50B of the bulkhead housing 14 and the retaining shoulder 66 of the ring retainer 16.

Preferably, none of the ring inner surface 52 of the backup ring 12 is exposed to the pressure of the first fluid 28, and preferably all of the ring inner surface 52 is exposed to the pressure of the second fluid 30.

Preferably, the ring inner surface 52 has at least one diametric dimension and the sealing surface 6 of the shaft element 8 has a diameter, and preferably no diametric dimension of the ring inner surface 52 is smaller than the diameter of the sealing surface 6.

The fluid communication passageway 68 preferably communicates the first fluid 28 and its pressure to the above-described second hydraulic area A2, at least some of the first fluid 28 being located between the inner and outer balancing seals 34 and 36, at least some of the second hydraulic area A2 exposed to the first fluid 28, the inner and outer balancing seals 34 and 36 each located between and exposed to the first fluid 28 and the second fluid 30 and each sealing the first fluid 28 from the second fluid 30.

As taught by the prior art, a generally radially oriented ring anti-rotation pin (not shown) preferably engages a pin recess (not shown) that is formed in the ring pocket bore 44, and preferably engages a radial hole (not shown) that is formed in the backup ring 12. The purpose of the ring anti-rotation pin is to prevent the backup ring 12 from rotating with the shaft element 8.

Preferably, the ring first end seal 32 is comprised of a novel telescoping jacket 32A and a companion energizer element 32B, the inner balancing seal 34 is comprised of a novel telescoping jacket 34A and a companion energizer element 34B, and the outer balancing seal 36 is comprised of a novel telescoping jacket 36A and a companion energizer element 36B. The energizer elements 32B, 34B and 36B are composed of a polymeric material, and the polymeric material is preferably an elastomer cured from an elastomer compound or a combination of one or more elastomer compounds. The telescoping jackets 32A, 34A and 36A are preferably each made from a polymer, and the polymer is preferably a plastic having good resistance to high pressure extrusion damage, and having low friction. The reader should understand that not all of the telescoping jackets have to be made from the same plastic—for example, it may be preferable to use a more expensive and extrusion resistant plastic for the telescoping jacket that is exposed to the greatest extrusion gap clearance, and it may be preferable to use a less expensive but less extrusion resistant plastic for the telescoping jacket that is exposed to less extrusion gap clearance. One factor that may influence the sizes of the extrusion gap clearances the telescoping jackets face and must bridge is pressure-related deformation of the bulkhead housing 14. Another factor that may influence these extrusion gap clearances is the minor pressure related deformation of the backup ring 12.

The telescoping jacket 32A is preferably generally L-shaped when viewed in longitudinal cross-section, and preferably has a first leg portion 90 thereof extending in a generally radial direction that is located between the energizer element 32B and the retaining shoulder 66 of the ring retainer 16, and preferably has a second leg portion 92 thereof extending in a generally axial direction that is located between the energizer element 32B and an outer, generally circular jacket support wall 94 of the first end groove 41. The first end groove 41 has an energizer compressing wall 96 that faces in a generally axial direction toward and abuts the energizer element 32B, and faces toward the telescoping jacket 32A, and toward the retaining shoulder 66. The retaining shoulder 66 faces toward and abuts the telescoping jacket 32A, and faces toward the energizer element 32B, and the energizer compressing wall 96. The energizer element 32B is compressed between the energizer compressing wall 96 and the first leg portion 90 of the telescoping jacket 32A and loads the first leg portion 90 against the retaining shoulder 66 of the ring retainer 16, producing a sealing effect between the ring retainer 16 and the backup ring 12.

The first end groove 41 also preferably has an energizer positioning wall 98 that faces in a generally radially outwardly direction toward, and is encircled by, the energizer element 32B, the telescoping jacket 32A, and the jacket support wall 94. The jacket support wall 94 faces in a generally radially inward direction toward, and encircles, the telescoping jacket 32A, the energizer element 32B, and the energizer positioning wall 98. The first leg portion 90 of the telescoping jacket 32A is preferably located between the energizer element 32B and the retaining shoulder 66 of the ring retainer 16.

The backup ring 12 preferably has a first leg relief surface 99 that faces in a generally axial direction toward the retaining shoulder 66 of the ring retainer 16. The first leg relief surface 99 is located radially inward from the energizer positioning wall 98 and radially inward from the first end groove 41 and is axially offset from the outer first ring end 40B by an axial distance that at its minimum tolerance dimension is preferably greater than, and preferably not less than, the maximum axial thickness of the first leg portion 90 of the telescoping jacket 32A. This offset creates a first leg relief space 101 that is located radially inward of the first end groove 41 and prevents crushing of the first leg portion 90 of the telescoping jacket 32A in the event that the first leg portion 90 accidently overlaps the energizer positioning wall 98 prior to final assembly of the sealing assembly 4. Preferably, the first leg relief surface 99 extends radially inward past the receiving recess 48 of the ring retainer 16. That is to say the first leg relief surface 99 preferably extends radially closer to the shaft element 8, compared to the distance between the receiving recess 48 and the shaft element 8. Preferably, the first leg portion 90 of the telescoping jacket 32A has an axial thickness that is no more than the offset axial distance between the first leg relief surface 99 and the retaining shoulder 66 of the ring retainer 16.

The telescoping jacket 36A is preferably generally L-shaped when viewed in longitudinal cross-section, and preferably has a first leg portion 100 thereof extending in a generally radial direction that is located between the energizer element 36B and the outer second ring end 42B of the backup ring 12. The telescoping jacket 36A preferably has a second leg portion 102 thereof extending in a generally axial direction that is located between the energizer element 36B and an outer, generally circular jacket support wall 104 of the outer balancing seal groove 82. The outer balancing seal groove 82 has an energizer compressing wall 106 that faces in a generally axial direction toward and abuts the energizer element 36B, and faces toward the telescoping jacket 36A, and faces toward the outer second ring end 42B of the backup ring 12. The outer second ring end 42B faces toward and abuts the telescoping jacket 36A, and faces toward the energizer element 36B, and faces toward the energizer compressing wall 106. The energizer element 36B is compressed between the energizer compressing wall 106 and the first leg portion 100 of the telescoping jacket 36A and loads the first leg portion 100 against the outer second ring end 42B of the backup ring 12, producing a sealing effect between the bulkhead housing 14 and the backup ring 12.

Preferably, the outer balancing seal groove 82 also has an energizer positioning wall 108 that faces in a generally radially outward direction toward, and is encircled by, the energizer element 36B, the telescoping jacket 36A, and the jacket support wall 104. The jacket support wall 104 preferably faces in a generally radially inward direction toward, and encircles, the telescoping jacket 36A, the energizer element 36B, and the energizer positioning wall 108. The first leg portion 100 of the telescoping jacket 36A is preferably located between the energizer element 36B and the outer second ring end 42B of the backup ring 12.

The bulkhead housing 14 preferably has a first leg relief surface 107 that is located radially inward from the energizer positioning wall 108 and faces in a generally axial direction toward the outer second ring end 42B of the backup ring 12, the first leg relief surface 107 being axially offset from the outer locating shoulder 50B by a first axial distance that, at its minimum dimension, is preferably greater than, and not less than, the maximum axial thickness of the first leg portion 100 of the telescoping jacket 36A, and the first leg relief surface 107 being axially offset from the outer second ring end 42B of the backup ring 12 by a second axial distance that at its minimum tolerance dimension is preferably greater than, and not less than, the maximum axial thickness of the first leg portion 100 of the telescoping jacket 36A. The axial offset of the first leg relief surface 107 produces a first leg relief space 109 for the first leg portion 100 of the telescoping jacket 36A of the outer balancing seal 36, the first leg relief space 109 being located radially inward of the outer balancing seal groove 82 and preventing crushing of the first leg portion 100 of the telescoping jacket 36A in the event that the first leg portion 100 accidently overlaps the energizer positioning wall 108 prior to final assembly of the sealing assembly 4. Preferably, the first leg relief surface 107 extends radially inward to the step surface 86.

The telescoping jacket 34A is preferably generally L-shaped when viewed in longitudinal cross-section, and preferably has a first leg portion 110 thereof extending in a generally radial direction that is located between the energizer element 34B and the inner second ring end 42A of the backup ring 12. The telescoping jacket 34A preferably has a second leg portion 112 thereof extending in a generally axial direction that is located between the energizer element 34B and an inner, generally circular jacket support wall 114 of the inner balancing seal groove 80. The inner balancing seal groove 80 has an energizer compressing wall 116 that faces in a generally axial direction toward and abuts the energizer element 34B, and faces toward the telescoping jacket 34A, and faces toward the inner second ring end 42A of the backup ring 12. The inner second ring end 42A faces toward and abuts the telescoping jacket 34A, and faces toward the energizer element 34B, and faces toward the energizer compressing wall 116. The energizer element 34B is compressed between the energizer compressing wall 116 and the first leg portion 110 of the telescoping jacket 34A and loads the first leg portion 110 against the inner second ring end 42A of the backup ring 12, producing a sealing effect between the bulkhead housing 14 and the backup ring 12.

The inner balancing seal groove 80 also has an energizer positioning wall 118 that faces in a generally radially inward direction toward, and encircling, the energizer element 34B, the telescoping jacket 34A, and the jacket support wall 114. The jacket support wall 114 faces in a generally radially outward direction toward, and encircled by, the telescoping jacket 34A, the energizer element 34B, and the energizer positioning wall 118. The first leg portion 110 of the telescoping jacket 34A is preferably located between the energizer element 34B and the inner second ring end 42A of the backup ring 12.

The bulkhead housing 14 preferably has a first leg relief surface 117 facing in a generally axial direction toward said inner second ring end 42A of the backup ring 12, the first leg relief surface 117 being located radially outward from the energizer positioning wall 118 of the inner balancing seal groove 80 and being axially offset from the inner locating shoulder 50A by an first axial distance that is preferably greater than, and not less than, the maximum axial thickness of the first leg portion 110 of the telescoping jacket 34A, the first leg relief surface 117 also being axially offset from the inner second ring end 42A of the backup ring 12 by a second offset axial distance, the maximum axial thickness of the first leg portion of the telescoping jacket 34A being no more than the minimum second offset axial distance. This axial offset of the first leg relief surface 117 creates a first leg relief space 119 that is located radially outward of the inner balancing seal groove 80 and prevents crushing of the first leg portion 110 of the telescoping jacket 34A in the event that the first leg portion 110 accidently overlaps the energizer positioning wall 118 prior to final assembly of the sealing assembly 4. Preferably, the first leg relief surface 117 extends radially outward of the projection outer surface 76. That is to say the first leg relief surface preferably extends radially farther from the shaft element 8, compared to the distance between the projection outer surface 76 and the shaft element 8.

The energizer elements 32B, 34B and 36B are preferably axially compressed face sealing elements, such as, but not limited to, O-rings, and comprised preferably at least in part from polymeric sealing material, and preferably the polymeric material is elastomer. If desired, energizer elements 32B, 34B and 36B can be bonded to telescoping jackets 32A, 34A and 36A, respectively. If desired, energizer elements 32B, 34B and 36B can be stacked together with telescoping jackets 32A, 34A and 36A, respectively, during the process of assembly.

One advantage of the ring first end seal 32, inner balancing seal 34, and outer balancing seal 36 is that they can bridge higher differential pressure better than all-elastomer seals. Another advantage is that the breakout and sliding friction is less than that of direct compression-type elastomeric seals, such as O-rings. This reduced friction reduces the bearing load at the interface between the ring inner surface 52 of the backup ring 12 and the sealing surface 6 of the shaft element 8.

It can be appreciated that as a simplification, the offset represented by the second end axial offset dimension 74 can be omitted, such that the inner locating shoulder 50A and outer locating shoulder SOB of the bulkhead housing 14 are located on the same plane, and may even form a single locating shoulder, and such that the inner second ring end 42A and the outer second ring end 42B form a single second ring end, as taught by FIG. 7 of commonly assigned U.S. Pat. No. 9,429,238. It can be appreciated that as a simplification, telescoping jackets 32A, 34A and 36A can be eliminated, such that the energizer element 32B provides sealing between the backup ring 12 and the ring retainer 16, and such that the energizer elements 34B and 36B provide sealing between the backup ring 12 and the bulkhead housing 14, as taught by FIG. 7 of commonly assigned U.S. Pat. No. 9,429,238.

It can also be appreciated that, as a simplification, the offset represented by the first end axial offset dimension 72 can be omitted, as taught by FIG. 7 of commonly assigned U.S. Pat. No. 9,429,238.

FIG. 1B

Figure 1B:
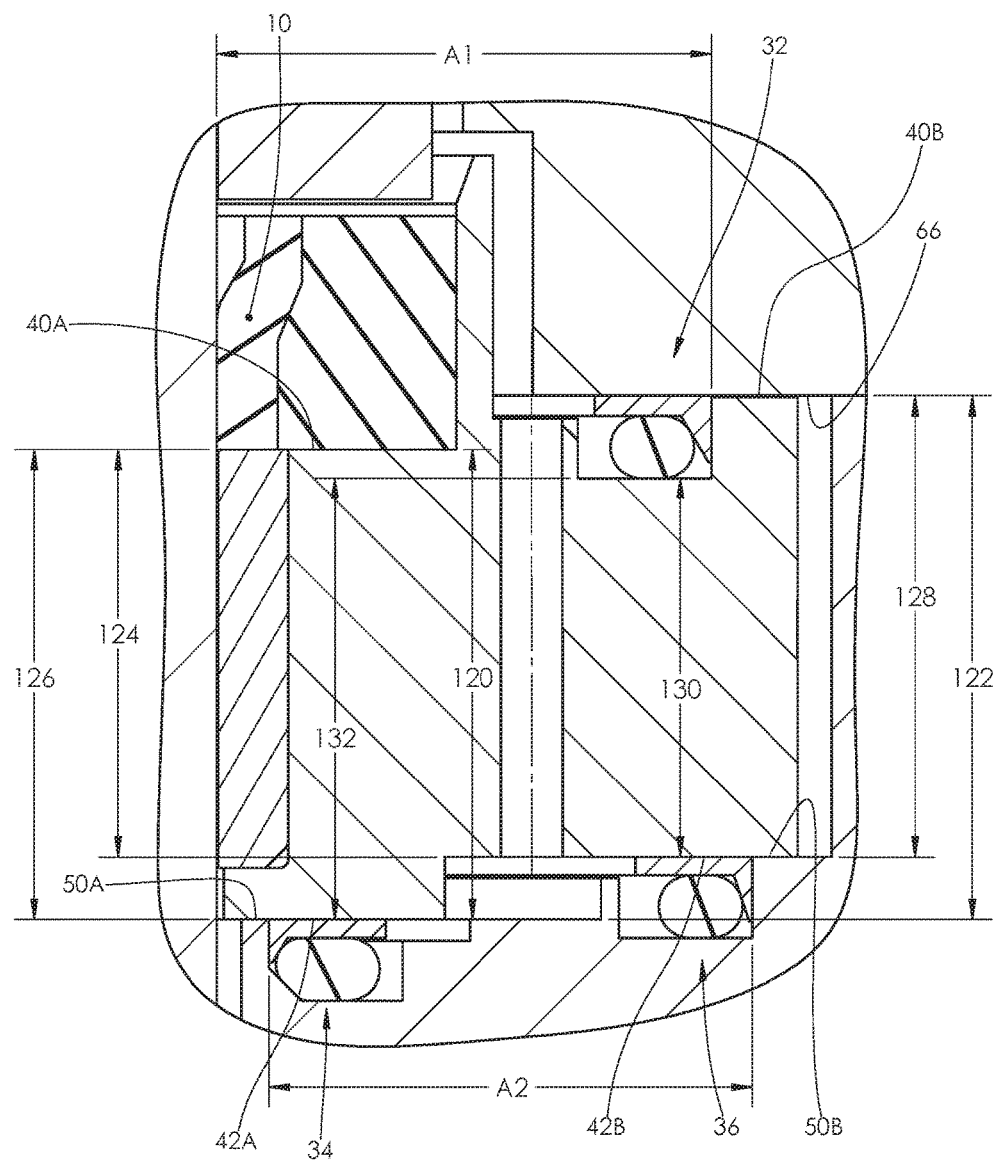
FIG. 1B is the same fragmentary longitudinal cross-sectional view as FIG. 1A, but with different annotations.

The image of FIG. 1B is the same fragmentary cross-section as the image of FIG. 1A. FIG. 1A uses conventional drafting extension and dimension lines, as taught by the seventh edition of the book "Technical Drawing" by Giesecke, et al (MacMillan Publishing Co., Inc. 1980) to depict axial (sometimes referred to as linear) distances.

The axial distance 120 between the pressure-retaining seal 10 and the inner locating shoulder 50A is preferably less than the axial distance 122 between the retaining shoulder 66 and the inner locating shoulder 50A.

The axial distance 124 between the inner first ring end 40A and the outer second ring end 42B is preferably less than the axial distance 126 between the inner first ring end 40A and the inner second ring end 42A.

The axial distance 128 between the retaining shoulder 66 and the outer locating shoulder 50B is preferably less than the axial distance 122 between the retaining shoulder 66 and the inner locating shoulder 50A.

The axial distance 130 between the ring first end seal 32 and the outer balancing seal 36 is preferably less than the axial distance 132 between the ring first end seal 32 and the inner balancing seal 34.

FIG. 1C

Figure 1C:
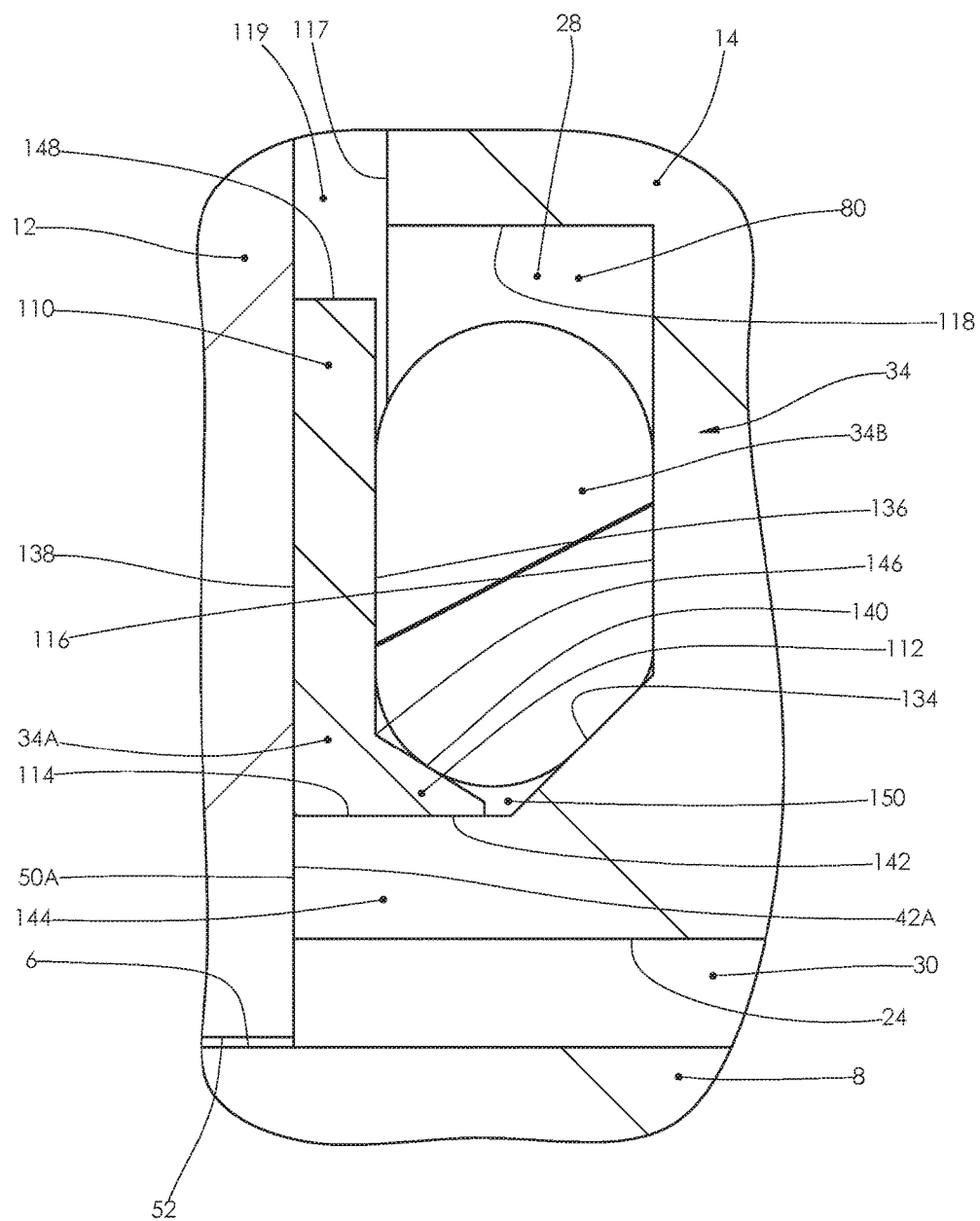
FIG. 1C is a fragmentary longitudinal cross-sectional view that is an enlargement of the cross-section illustrated in FIG. 1A, to show more detail.

FIG. 1C is an enlargement of a portion of the geometry that is shown in FIGS. 1, 1A and 1B, in order that the reader may better understand the concept of the ring first end seal 32, the inner balancing seal 34, and the outer balancing seal 36 that are shown in FIGS. 1, 1A and 1B. Specifically, FIG. 1C is an enlargement of the inner balancing seal 34 that is shown in FIGS. 1, 1A and 1B—the inner balancing seal 34 is being used as an example to explain the sealing features that are shared by the ring first end seal, the inner balancing seal, and the outer balancing seal that are shown in FIGS. 1, 1A and 1B.

Referring now to FIG. 1C, the inner balancing seal is shown generally at 34, and is comprised of a telescoping jacket 34A and an energizer element 34B, which are preferably located at least partially within the inner balancing seal groove 80. The inner balancing seal groove 80 preferably includes a jacket support wall 114, an energizer compressing wall 116, an energizer positioning wall 118, and may optionally include a reinforcing wall 134.

The inner balancing seal groove 80 is formed in a first machine component, which is herein referred to as the bulkhead housing 14. The inner balancing seal groove 80 opens toward and faces a second machine component, which is herein referred to as the backup ring 12. The inner balancing seal groove 80 is preferably generally circular, and may accurately be referred to as being annular, and as being a face seal type of seal groove.

The inner balancing seal 34 establishes sealing between the bulkhead housing 14 and the backup ring 12. The energizer element 34B contacts and seals between, and is axially compressed between, the energizer compressing wall 116 of the bulkhead housing 14 and an energizer contacting wall 136 of the telescoping jacket 34A. A jacket sealing surface 138 of the telescoping jacket 34A faces and contacts a mating sealing surface of the backup ring 12, and this sealing surface is herein typically referred to as the inner second ring end 42A of the backup ring 12. The axial compression of the energizer element 34B causes the jacket sealing surface 138 of the telescoping jacket 34A to contact, and establish sealing, with respect to the inner second ring end 42A of the backup ring 12.

When the telescoping jacket 34A (which is preferably generally circular) is viewed in longitudinal cross-section, it has an L-shaped cross-section, as shown, with a first leg portion 110 extending in a radially outward direction from a second leg portion 112 and toward the energizer positioning wall 118, and the second leg portion 112 extending in a generally axial direction from the first leg portion 110 and away from the backup ring 12. The energizer contacting wall 136 of the telescoping jacket 34A and the jacket sealing surface 138 of the telescoping jacket 34A preferably face in generally opposite, and generally axial directions, and are preferably surfaces of the first leg portion 110.

The energizer contacting wall 136 of the telescoping jacket 34A is preferably generally flat, as shown, to allow more room within the inner balancing seal groove 80 for thermal expansion of the energizer element 34B.

The telescoping jacket 34A also preferably includes an energizer supporting wall 140 and a supported wall 142 that face in generally opposite, generally radial directions, and are preferably surfaces of the second leg portion 112 of the telescoping jacket 34A. The supported wall 142 of the telescoping jacket 34A preferably faces toward and adjoins the jacket support wall 114 of the inner balancing seal groove 80, preferably having clearance with the jacket support wall 114 in the absence of differential pressure, and preferably having contact with the jacket support wall 114 in the presence of differential pressure acting from the first fluid 28 to the second fluid 30, the differential pressure causing the aforesaid contact. The energizer supporting wall 140 is preferably generally conical as shown, so that the second leg portion 112 tapers in radial thickness, becoming less thick as it becomes more distant from the first leg portion 110 of the telescoping jacket 34A. In practice, when the pressure of the first fluid 28 becomes greater than the second fluid 30, the second leg portion 112 deforms, such that part or all of the supported wall 142 of the telescoping jacket 34A contacts the jacket support wall 114 of the face-type inner balancing seal groove 80, so that there is no radial clearance between the supported wall 142 and the jacket support wall 114 for the energizer element 34B to extrude into.

The telescoping jacket 34A covers or occludes any axial clearance between the inner second ring end 42A of the backup ring 12 and the inner locating shoulder 50A of the bulkhead housing 14, so that the material of the telescoping jacket 34A bridges the axial clearance, rather than the material of the energizer element 34B, thereby protecting the energizer element 34B from high pressure extrusion damage.

The jacket support wall 114 and the optional reinforcing wall 134 are preferably located in intermediate relation to the inner locating shoulder 50A and the energizer compressing wall 116, and are exposed to generally radially inwardly acting hydraulic force resulting from the difference in pressure between the first fluid 28 and the second fluid 30, and preferably form a part of an annular groove wall 144 that has to be strong enough to resist the generally radially inwardly acting hydraulic force. The tapering form provided by the angulated nature of the reinforcing wall 134 strengthens the annular groove wall 144 by making the annular wall radially thicker as it approaches nearer to the energizer compressing wall 116. Preferably, the optional reinforcing wall 134 is located between and in intermediate relation to and adjoining the jacket support wall 114 and the energizer compressing wall 116. The jacket support wall 114 is preferably located at right angles with respect to the energizer compressing wall 116. The angle between the jacket support wall 114 and the reinforcing wall 134 is preferably obtuse. The angle between the energizer compressing wall 116 and the reinforcing wall 134 is also preferably obtuse. The energizer positioning wall 118 is preferably oriented at a right angle with respect to the energizer compressing wall 116.

The reinforcing wall 134 strengthens the annular groove wall 144, allowing the radial thickness of the annular groove wall 144 between the jacket support wall 114 and the shaft passageway 24 to be as thin as possible for the pressure load and allowable stress level of the annular groove wall 144, which in turn allows the radial distance between the jacket support wall 114 and the sealing surface 6 of the shaft element 8 to be as short as possible, which minimizes the radial offset between the oppositely oriented hydraulic forces that act on the backup ring 12, which minimizes the pressure-induced cross-sectional twisting of the backup ring 12.

Preferably the energizer supporting wall 140 adjoins the energizer contacting wall 136 at an inside jacket corner 146, and if desired, the inside jacket corner 146 may be a radiused inside corner. Preferably, the angle between the energizer contacting wall 136 and the energizer supporting wall 140 is obtuse. Preferably, the jacket sealing surface 138 and the energizer contacting wall 136 are generally parallel with respect to one another, and face in generally opposite directions. Preferably, a peripheral leg surface 148 of the first leg portion 110 is generally parallel to and faces generally away from the supported wall 142 of the telescoping jacket 34A, and preferably the peripheral leg surface 148 faces generally away from the supported wall 142 and faces generally toward the first leg relief space 119 that is created by the location of the first leg relief surface 117. Preferably, the peripheral leg surface 148 and the supported wall 142 face in generally opposite radial directions. Preferably, the energizer positioning wall 118 and the jacket support wall 114 face toward one another, and face in opposite radial directions.

The tapering radial thickness of the second leg portion 112 makes the free end of the second leg portion 112 easier to deflect with radially acting hydraulic force acting through the energizer element 34B, so that the clearance gap between the jacket support wall 114 and the annular groove wall 144 closes (is eliminated) at relatively low levels of differential pressure between the first fluid 28 and the second fluid 30.

In the presence of high differential pressure between the first fluid 28 and the second fluid 30, the pressure of the first fluid 28 acts all the way to the jacket support wall 114, because the pressure acts through the elastomer of the energizer element 34B as if the elastomer were a fluid, and because the energizer element 34B deforms into the annular void 150 that exists between itself, the second leg portion 112, the jacket support wall 114, and if present, the optional reinforcing wall 134. In other words, in a high differential pressure situation, the energizer element 34B deforms until it touches the jacket support wall 114. Thus, the jacket support wall 114 defines the inner boundary of the aforementioned second hydraulic area A2, because the first fluid pressure acts through the elastomer of the energizer element 34B as if the elastomer were a fluid—all the way to the jacket support wall 114. This means that the first fluid pressure acts axially on the telescoping jacket 34A all the way to the jacket support wall 114.

The supported wall 142 of the telescoping jacket 34A is preferably annular, and preferably generally circular, and preferably faces generally radially inward toward, and encircles the jacket support wall 114 of the inner balancing seal groove 80 and the sealing surface 6 of the shaft element 8.

The energizer supporting wall 140 of the telescoping jacket 34A is preferably annular, and preferably generally circular, and faces generally radially outward away from, and encircles the jacket support wall 114 of the inner balancing seal groove 80, and faces generally radially outward away from the sealing surface 6 of the shaft element 8.

Referring momentarily back to FIGS. 1 and 1A, it can be appreciated that ring first end seal 32 and outer balancing seal 36 are constructed similarly to the inner balancing seal 34. The main difference is the orientation of the L-shaped cross-section of ring first end seal 32 and outer balancing seal 36 is opposite to that of the inner balancing seal 34, in keeping with the direction of differential pressure acting on the ring first end seal 32 and outer balancing seal 36. One other main difference is that the first end groove 41 for ring first end seal 32 and the outer balancing seal groove 82 for outer balancing seal 36 are slightly simpler than the inner balancing seal groove 80 for the inner balancing seal 34, not having the optional reinforcing wall 134 of the inner balancing seal groove 80. In other words, the designs of the first end groove 41 for ring first end seal 32 and the outer balancing seal groove 82 for outer balancing seal 36 are a simplification of the design of the inner balancing seal groove 80 for the inner balancing seal 34.

FIG. 2

FIG. 2 shows the inner balancing seal 34 before final assembly, in order to show an advantage of the preferred embodiment of the present invention. The element axial dimension 152 of the uncompressed energizer element 34B is typically greater than the axial length of the energizer positioning wall 118, which means that in its uncompressed state, part of the energizer element 34B typically sticks (projects) out of the inner balancing seal groove 80 in the axial direction, as shown. Because the energizer element 34B is uncompressed, the energizer contacting wall 136 and the peripheral leg surface 148 of the telescoping jacket 34A typically stick out of (are located outside of) the inner balancing seal groove 80 by height dimension 154, which means that no portion of the first leg portion 110 of the telescoping jacket 34A, such as the peripheral leg surface 148, can interact with the inner balancing seal groove 80 to keep the telescoping jacket 34A aligned with the seal groove 80 during assembly.

In this specification, the definition of the specific word "telescoped" includes the commonly accepted definition of a part that fits and slides within another. For example, see the Random House Webster's Unabridged Dictionary, Second Edition. Although this definition is provided herein, this is not an example of the inventor being his own lexicographer, since the definition given is simply a commonly understood and accepted definition.

Even in circumstances where the element axial dimension 152 is slightly less than the axial length of the energizer positioning wall 118, such that height dimension 154 is negative, the fact that peripheral leg surface 148 would be telescoped slightly inside the energizer positioning wall 118 would not be sufficient to ensure that the telescoping jacket 34A remains aligned with the inner balancing seal groove 80 during assembly, because a slight jarring action would be sufficient to cause the telescoping jacket 34A to become misaligned with the inner balancing seal groove 80, leading to damage of the telescoping jacket 34A during assembly.

As shown in FIG. 2, a part of the second leg portion 112 of the telescoping jacket 34A, including a portion of the supported wall 142, is telescoped within the jacket support wall 114 of the inner balancing seal groove 80 prior to assembly, keeping the telescoping jacket 34A aligned with the inner balancing seal groove 80 during assembly as the energizer element 34B is being compressed, and thus preventing damage to the telescoping jacket 34A during final assembly.

Another way of describing this novel aspect of the invention is that prior to final assembly, when the energizer element 34B is still uncompressed, part of the second leg portion 112 projects inside the inner balancing seal groove 80 by telescoped dimension 156 such that the second leg portion 112 and its supported wall 142 project inside the jacket support wall 114 both prior to and after final assembly.

Due to free state flexibility of the telescoping jacket 34A and tolerances of the supported wall 142 and the jacket support wall 114, prior to final assembly the clearance between the supported wall 142 and the jacket support wall 114 can allow the telescoping jacket 34A to become out of round, which in the absence of the first leg relief space 119 would put a bit of the first leg portion 110 at risk of being caught between and possibly crushed between the backup ring 12 (FIG. 1C) and the bulkhead housing 14 during assembly. The first leg relief space 119 provided by the axial position of the first leg relief surface completely eliminates this risk.

NOMENCLATURE LIST first hydraulic area A1
second hydraulic area A2
sealing assembly 4
sealing surface 6
shaft element 8
pressure-retaining seal 10
plastic layer 10A
backup ring 12
bulkhead housing 14
ring retainer 16
bolts 18
shaft bore 20
fluid media 22
shaft passageway 24
bulkhead end surface 26
first fluid 28
second fluid 30
ring first end seal 32
telescoping jacket 32A
energizer element 32B
inner balancing seal 34
telescoping jacket 34A
energizer element 34B
outer balancing seal 36
telescoping jacket 36A
energizer element 36B
ring outer surface 38
inner first ring end 40A
outer first ring end 40B
first end groove 41
inner second ring end 42A
outer second ring end 42B
ring pocket bore 44
annular extension 46
receiving recess 48
inner locating shoulder 50A
outer locating shoulder 50B
steel ring portion 51
ring inner surface 52
bearing liner 53
outer peripheral edge 54
first liner end 55
innermost surface 56
second liner end 57
gland bore 58
liner peripheral surface 59
first seal end 60
liner recess bore 61
second seal end 62
liner recess shoulder 63
outwardly facing peripheral surface 64
relief bore 65
retaining shoulder 66
fluid communication passageway 68
inwardly projecting annular structure 70
first end axial offset dimension 72
second end axial offset dimension 74
projection outer surface 76
extrusion gap corner 78
inner balancing seal groove 80
outer balancing seal groove 82
fluid facing surface 84
step surface 86
annular lubricant communication pathway 88
first leg portion 90 (of the telescoping jacket 32A)
second leg portion 92 (of the telescoping jacket 32A)
jacket support wall 94 (of the first, end groove 41)
energizer compressing wall 96 (of the first end groove 41)
energizer positioning wall 98 (of the first end groove 41)
first leg relief surface 99
first leg portion 100 (of the telescoping jacket 36A)
first leg relief space 101
second leg portion 102 (of the telescoping jacket 36A)
jacket support wall 104 (of the outer balancing seal groove 82)
energizer compressing wall 106 (of the outer balancing seal groove 82)
first leg relief surface 107
energizer positioning wall 108 (of the outer balancing seal groove 82)
first leg relief space 109
first leg portion 110 (of the telescoping jacket 34A)
second leg portion 112 (of the telescoping jacket 34A)
jacket support wall 114 (of the inner balancing seal groove 80)
energizer compressing wall 116 (of the inner balancing seal groove 80)
first leg relief surface 117
energizer positioning wall 118 (of the inner balancing seal groove 80)
first leg relief space 119
axial distance 120 (between pressure-retaining seal 10 and inner locating shoulder 50A)
axial distance 122 (between retaining shoulder 66 and inner locating shoulder 50A)
axial distance 124 (between outer first ring end 40B and outer second ring end 42B)
axial distance 126 (between outer first ring end 40B and inner second ring end 42A)
axial distance 128 (between retaining shoulder 66 and outer locating shoulder 50B)
axial distance 130 (between the ring first end seal 32 and outer balancing seal 36)

axial distance 132 (between the ring first end seal 32 and inner balancing seal 34)
reinforcing wall 134
energizer contacting wall 136
jacket sealing surface 138
energizer supporting wall 140
supported wall 142
annular groove wall 144
inside jacket corner 146
peripheral leg surface 148
annular void 150
element axial dimension 152
height dimension 154
telescoped dimension 156

In view of the foregoing it is evident that the embodiments of the present invention are adapted to attain some or all of the aspects and features hereinabove set forth, together with other aspects and features which are inherent in the apparatus disclosed herein.

Even though several specific geometries are disclosed in detail herein, many other geometrical variations employing the basic principles and teachings of this invention are possible. The foregoing disclosure and description of the invention are illustrative and explanatory thereof, and various changes in the size, shape and materials, as well as in the details of the illustrated construction, may be made without departing from the spirit of the invention. The present embodiments are, therefore, to be considered as merely illustrative and not restrictive, the scope of the invention being indicated by the claims rather than the foregoing description, and all changes which conic within the meaning and range of equivalence of the claims are therefore intended to be embraced therein.

I claim:

1. A sealing assembly comprising:
  a bulkhead housing having inner and outer locating shoulders facing in a generally axial direction;
  a first fluid having a first fluid pressure and a second fluid having a second fluid pressure;
  a shaft element defining an externally-oriented sealing surface of generally cylindrical form, at least part of said shaft element being located at least partially within and encircled by said bulkhead housing, and being relatively movable with respect to said bulkhead housing;
  a ring retainer located radially outward of and surrounding at least a portion of said sealing surface of said shaft element and defining a retaining shoulder facing in a generally axial direction toward said outer locating shoulder of said bulkhead housing, an axial distance separating said inner locating shoulder from said retaining shoulder and an axial distance separating said outer locating shoulder from said retaining shoulder, the axial distance separating said inner locating shoulder from said retaining shoulder being greater than the axial distance separating said outer locating shoulder from said retaining shoulder;
  a backup ring of generally circular form positioned axially by said retaining shoulder of said ring retainer and at least one of said inner and outer locating shoulders of said bulkhead housing, said backup ring comprised of a steel ring portion and a bearing liner, said backup ring having an outer first ring end with at least a portion thereof facing in a generally axial direction toward and adjoining said retaining shoulder, and having inner and outer second ring ends with at least a portion of said inner second ring end facing in a generally axial direction toward and adjoining said inner locating shoulder and at least a portion of said outer second ring end facing in a generally axial direction toward and adjoining said outer locating shoulder, said outer first ring end and said outer second ring end facing in generally opposite directions, and said retaining shoulder facing in a generally axial direction toward said outer first ring end;
  an annular extension protruding generally axially from said backup ring at a location radially inward of said outer first ring end, a surface of said annular extension forming at least part of a gland bore facing generally radially inward toward, encircling, and separated radially from said sealing surface, at least a portion of said annular extension located within and encircled by said ring retainer and at least part of said annular extension being located within and encircled by said retaining shoulder;
  an inner first ring end of said backup ring located in radially intermediate relation to said annular extension and said sealing surface of said shaft element and located radially outward of and encircling a portion of said sealing surface, said inner first ring end located in axially intermediate location to said outer first ring end and said inner second ring end, said inner first ring end facing in a generally axial direction away from said inner second ring end, said inner first ring end facing away from said inner locating shoulder and said outer first ring end facing away from said outer locating shoulder;
  a ring inner surface of said backup ring facing generally radially inward toward and establishing a region of clearance and a journal bearing relationship with said sealing surface, and said sealing surface locating said backup ring laterally;
  a ring outer surface of said backup ring facing generally radially outward and located in axially intermediate relation to said outer first ring end and said outer second ring end and located radially outward of and encircling at least a portion of said ring inner surface, said ring inner surface and said ring outer surface being exposed to said second fluid pressure;
  an intersection between said inner first ring end and said ring inner surface of said backup ring forming an extrusion gap corner, said extrusion gap corner being an external corner, said outer first ring end being separated from said outer second ring end by an axial distance, and said outer first ring end being separated from said inner second ring end by an axial distance, said axial distance separating said outer first ring end from said outer second ring end being less than said axial distance separating said outer first ring end from said inner second ring end;
  a pressure-retaining seal located at least partially within said gland bore of said backup ring, said pressure-retaining seal being in sealing contact with said gland bore and with said sealing surface of said shaft element and partitioning said first fluid pressure from said second fluid pressure;
  a ring first end seal contacting and providing sealing between said ring retainer and said backup ring, partitioning said first fluid and said first fluid pressure from said second fluid and said second fluid pressure, and preventing said first fluid from escaping between said retaining shoulder and said outer first ring end and into said second fluid, said ring first end seal located radially farther than said pressure-retaining seal from said sealing surface and encircling said sealing surface;

said pressure-retaining seal and said ring first end seal defining a first hydraulic area exposed to said first fluid pressure, said first fluid pressure acting over said first hydraulic area and producing an axially oriented first hydraulic force acting on said backup ring in a first hydraulic force direction generally toward said inner and outer locating shoulders of said bulkhead housing;

inner and outer balancing seals exposed to and located between said first and second fluids and contacting and providing sealing between said backup ring and said bulkhead housing, partitioning said first fluid and said first fluid pressure from said second fluid and said second fluid pressure, said inner balancing seal preventing the escape of said first fluid between said inner second ring end and said inner locating shoulder and into said second fluid, and said outer balancing seal preventing the escape of said first fluid between said outer second ring end and said outer locating shoulder and into said second fluid;

a portion of said bulkhead housing radially inward of said inner balancing seal exposed to said second fluid and said second fluid pressure, a portion of said bulkhead housing radially outward of said inner balancing seal and radially inward of said outer balancing seal exposed to said first fluid and said first fluid pressure;

said inner and outer balancing seals defining a second hydraulic area exposed to said first fluid pressure, said first fluid pressure acting over said second hydraulic area and producing an axially oriented second hydraulic force acting on said backup ring in a second hydraulic force direction generally toward said retaining shoulder of said ring retainer;

at least one of said inner and outer balancing seals comprising a telescoping jacket composed of plastic and an energizer element composed of elastomer, said telescoping jacket having a second leg portion joined to a first leg portion, said first leg portion extending in a generally radial direction and said second leg portion extending in a generally axial direction;

at least one of said inner and outer balancing seals located within an annular seal groove having a jacket support wall, an energizer positioning wall, an energizer compressing wall, and a reinforcing wall, said jacket support wall facing generally radially toward said energizer positioning wall and said energizer positioning wall facing generally radially toward said jacket support wall, said reinforcing wall located between said jacket support wall and said energizer compressing wall, said reinforcing wall oriented at an angle with respect to said jacket support wall and said angle being obtuse, said energizer element contacting and compressed in a generally axial direction between said energizer compressing wall and said first leg portion of said telescoping jacket facing and adjoining said jacket support wall;

said bulkhead housing having a first leg relief surface facing in a generally axial direction toward said backup ring and radially spaced from said jacket support wall, said first leg relief surface axially offset from said backup ring by an offset axial distance creating a first leg relief space between said backup ring and said bulkhead housing, said first leg portion of said telescoping jacket having an axial thickness, and said axial thickness of said first leg portion being no more than said offset axial distance; and said steel ring portion of said backup ring having a liner recess bore, a liner recess shoulder, and a relief bore, said liner recess bore and said relief bore facing generally radially inward toward said shaft element and said liner recess shoulder facing in a generally axial direction toward said inner first ring end, said bearing liner having a liner peripheral surface facing generally radially outward toward and contacting said liner recess bore, and having a second liner end facing in a generally axial direction toward said liner recess shoulder and away from said inner first ring end, said relief bore located in axially intermediate location to said second liner end and said inner second ring end and having radial clearance with said shaft element, said bearing liner forming said extrusion gap corner and forming at least part of said ring inner surface, said bearing liner forming at least part of said inner first ring end and contacting and supporting at least part of said pressure-retaining seal.

2. A sealing assembly comprising:

a bulkhead housing of annular form having at least one locating shoulder facing in a generally axial direction;

a first fluid having a first fluid pressure and a second fluid having a second fluid pressure;

a shaft element being relatively movable with respect to said bulkhead housing and defining a radially outward facing sealing surface of generally cylindrical form;

a ring retainer of annular form located radially outward of and encircling at least a portion of said sealing surface of said shaft element, said ring retainer defining a retaining shoulder facing generally toward said locating shoulder of said bulkhead housing and separated from said locating shoulder by an axial dimension, said ring retainer having a radially inward facing surface forming an annular receiving recess located in radially spaced relation to said sealing surface and encircling at least part of said sealing surface, said locating shoulder of said bulkhead housing facing generally toward said retaining shoulder;

a backup ring of generally circular form located axially by said retaining shoulder and said locating shoulder, and having an outer first ring end with at least a portion thereof facing and adjoining said retaining shoulder and having at least one second ring end having at least a portion thereof facing and adjoining said locating shoulder, said outer first ring end and said second ring end facing in generally opposite directions, said backup ring having a ring inner surface that is larger than, and facing generally radially inward toward, said sealing surface and establishing an extrusion gap clearance therewith and establishing a bearing relationship therewith locating said backup ring radially, at least part of said sealing surface located within said ring inner surface, said backup ring having a ring outer surface facing generally radially outward and located in axially intermediate relation to said retaining shoulder and said locating shoulder, said outer first ring end located radially outward of and encircling at least a portion of said sealing surface;

an annular extension protruding axially from said backup ring at a radially intermediate location to said outer first ring end and said ring inner surface, a surface of said annular extension forming at least part of a gland bore facing radially inward toward, encircling, and separated radially from said sealing surface, at least a portion of said annular extension located within and encircled by said annular receiving recess of said ring retainer and at least part of said annular extension located within and encircled by said retaining shoulder;

an inner first ring end of said backup ring located in radially intermediate relation to said annular extension and said sealing surface and located radially outward of and encircling a portion of said sealing surface;

said annular extension located radially in intermediate location to said inner first ring end and said outer first ring end;

a pressure-retaining seal located at least partially within said gland bore and having sealing contact with said backup ring and with said sealing surface of said shaft element and partitioning said first fluid from said second fluid;

a ring first end seal contacting and providing sealing between said ring retainer and said backup ring, partitioning said first fluid and said first fluid pressure from said second fluid and said second fluid pressure, and preventing said first fluid from escaping between said retaining shoulder and said outer first ring end and into said second fluid, said ring first end seal located radially farther than said pressure-retaining seal from said sealing surface and located radially outward from and encircling said sealing surface and located radially outward from said pressure-retaining seal;

said pressure-retaining seal and said ring first end seal defining a first hydraulic area exposed to said first fluid pressure, said first fluid pressure acting over said first hydraulic area and producing an axially oriented first hydraulic force acting on said backup ring in a first hydraulic force direction generally toward said locating shoulder of said bulkhead housing and generally away from said ring retainer;

inner and outer balancing seals exposed to and located between said first and second fluids and contacting and providing sealing between said backup ring and said bulkhead housing, partitioning said first fluid and said first fluid pressure from said second fluid and said second fluid pressure, and preventing said first fluid from escaping between said second ring end and said locating shoulder and into said second fluid;

a portion of said bulkhead housing radially inward of said inner balancing seal exposed to said second fluid and said second fluid pressure, a portion of said bulkhead housing radially outward of said inner balancing seal and radially inward of said outer balancing seal exposed to said first fluid and said first fluid pressure;

said inner and outer balancing seals defining a second hydraulic area exposed to said first fluid pressure, said first fluid pressure acting over said second hydraulic area and producing a second axially oriented hydraulic force acting on said backup ring in a second hydraulic force direction generally toward said retaining shoulder of said ring retainer and generally away from said locating shoulder of said bulkhead housing;

said bulkhead housing having an inner balancing seal groove of annular form opening toward said backup ring and including a jacket support wall, an energizer compressing wall, and an energizer positioning wall, said jacket support wall facing generally radially outward toward said energizer positioning wall, said energizer positioning wall facing generally radially inward toward said jacket support wall, and said energizer compressing wall facing in a generally axial direction toward said backup ring;

said inner balancing seal comprising an energizer element composed at least in part from elastomer and a telescoping jacket composed at least in part from plastic, said telescoping jacket having a second leg portion joined to a first leg portion, said first leg portion extending in a radial direction and said second leg portion extending in a generally axial direction, said first leg portion having a jacket sealing surface contacting and establishing a low friction, sealed relationship with said backup ring and having an energizer contacting wall contacting and establishing a sealed relationship with said energizer element and facing generally away from said backup ring, said energizer element compressed between said energizer contacting wall and said energizer compressing wall and loading said jacket sealing surface against said backup ring, said energizer element in non-contacting relationship with said backup ring, said second leg portion of said telescoping jacket having an energizer supporting wall facing toward said energizer element and having a supported wall facing radially inward toward and adjoining said jacket support wall, said second leg portion interposed between at least part of said energizer element and at least part of said jacket support wall.

3. The sealing assembly of claim 2, wherein said inner balancing seal groove has a reinforcing wall of generally conical form located between said jacket support wall and said energizer compressing wall and facing generally toward said energizer element, said telescoping jacket separated axially from and in non-contacting relationship with said reinforcing wall.

4. The sealing assembly of claim 2, wherein said inner balancing seal groove has a reinforcing wall of generally conical form located between said jacket support wall and said energizer compressing wall and facing generally toward said energizer element, the farther said second leg portion extends from said energizer contacting wall, the radially thinner said second leg portion becomes, said second leg portion being separated axially from and in non-contacting relationship with said reinforcing wall.

5. The sealing assembly of claim 3, wherein said energizer supporting wall is generally conical.

6. The sealing assembly of claim 2, wherein an intersection between said inner first ring end and said inner surface of said backup ring forming an extrusion gap corner, said backup ring has a bearing liner composed of bearing material and forming at least part of said ring inner surface of said backup ring and forming said extrusion gap corner.

7. The sealing assembly of claim 2, wherein prior to final assembly, said second leg portion of said telescoping jacket projects in a generally axial direction into said inner balancing seal groove, overlapping and encircling a portion of said jacket support wall and radially aligning said telescoping jacket with said inner balancing seal groove.

8. The sealing assembly of claim 2, wherein said bulkhead housing has a first leg relief surface facing in a generally axial direction toward said backup ring, and located radially outward from said inner balancing seal groove, said first leg relief surface axially offset from said backup ring by an offset axial distance creating a first leg relief space, and said first leg portion of said telescoping jacket having an axial thickness, said axial thickness of said first leg portion being no more than said offset axial distance.

9. A sealing assembly comprising:

a bulkhead housing of annular form having inner and outer locating shoulders facing in a generally axial direction and having a shaft passageway of annular form and facing generally radially inward, said shaft passageway being the innermost surface of said bulkhead housing;

a ring retainer having a retaining shoulder facing in a generally axial direction toward said outer locating shoulder of said bulkhead housing;

a backup ring of annular form, at least a portion of said backup ring located between said retaining shoulder and said outer locating shoulder, said backup ring having an outer first ring end with at least a portion thereof facing and adjoining said retaining shoulder and facing in a generally axial direction away from said outer locating shoulder, and having an inner first ring end facing in a generally axial direction away from said inner locating shoulder, and having an inner second ring end with at least a portion thereof facing and adjoining said inner locating shoulder and an outer second ring end with at least a portion thereof facing and adjoining said outer locating shoulder, said outer first ring end and said outer second ring end facing in generally opposite directions, and said inner first ring end and said inner second ring end facing in generally opposite directions;

an annular extension protruding axially from said backup ring at a radially intermediate location to said outer first ring end and said inner first ring end and forming at least a portion of a generally radially inwardly facing gland bore, said backup ring having a ring inner surface facing generally inward and located in axially intermediate location to said inner first ring end and said inner second ring end, and having a ring outer surface facing generally radially outward and located in axially intermediate location to said outer first ring end and said outer second ring end;

a shaft element having a radially outward facing sealing surface of generally cylindrical form that is smaller in diameter than said ring inner surface, at least part of said sealing surface located within and encircled by said annular extension of said backup ring, at least part of said sealing surface located within and encircled by said ring inner surface of said backup ring and establishing a region of clearance therewith, and at least part of said shaft element located within and encircled by said shaft passageway of said bulkhead housing;

an intersection between said inner first ring end and said ring inner surface of said backup ring forming an extrusion gap corner, said extrusion gap corner being an external corner, said outer first ring end being separated from said outer second ring end by an axial distance, and said outer first ring end being separated from said inner second ring end by an axial distance, said axial distance separating said outer first ring end from said outer second ring end being less than said axial distance separating said outer first ring end from said inner second ring end, said inner second ring end being axially offset from said outer second ring end and said offset producing a pressure imbalance length, a projection outer surface being located in intermediate relation to said inner second ring end and said outer second ring end and facing in a generally radially outward direction;

a pressure-retaining seal located at least partially within said gland bore of said backup ring and in sealing contact with said backup ring and with said sealing surface of said shaft element and partitioning a first fluid having a first fluid pressure from a second fluid having a second fluid pressure, at least a portion of said gland bore encircling a part of said sealing surface;

inner and outer balancing seals located radially outward of and encircling said shaft element and contacting said bulkhead housing and said backup ring, said inner balancing seal preventing the escape of said first fluid between said inner second ring end and said inner locating shoulder and into said second fluid, and said outer balancing seal preventing the escape of said first fluid between said outer second ring end and said outer locating shoulder and into said second fluid;

a ring first end seal contacting and providing sealing between said ring retainer and said backup ring, partitioning said first fluid and said first fluid pressure from said second fluid and said second fluid pressure, and preventing said first fluid from escaping between said retaining shoulder and said outer first ring end and into said second fluid; and said first fluid pressure acting radially inward along said pressure imbalance length, producing a moment promoting dimensional stability of said ring inner surface.

10. The sealing assembly of claim 9, wherein said ring first end seal is located radially outward from and encircling at least part of said gland bore and located radially outward from and encircling at least part of said pressure-retaining seal, and said extrusion gap corner and said inner first ring end are located in axially intermediate relation to said outer first ring end and said outer second ring end, said inner first ring end being separated from said outer second ring end by an axial distance and being separated from said inner second ring end by an axial distance, said axial distance separating said inner first ring end from said outer second ring end being less than said axial distance separating said inner first ring end from said inner second ring end.

11. The sealing assembly of claim 9, wherein said bulkhead housing has an inner balancing seal groove of annular form opening toward said inner second ring end of said backup ring and includes a jacket support wall, an energizer compressing wall, and an energizer positioning wall, said jacket support wall facing generally radially outward toward said energizer positioning wall, said energizer positioning wall facing generally radially inward toward said jacket support wall, and said energizer compressing wall facing in a generally axial direction toward said backup ring;

said inner balancing seal comprising an energizer element composed at least in part from elastomer and a telescoping jacket composed at least in part from plastic, said telescoping jacket having a first leg portion extending in a radially outward direction toward said energizer positioning wall and away from said jacket support wall, and having a second leg portion extending in a generally axial direction away from said inner second ring end of said backup ring and away from said first leg portion of said telescoping jacket, said first leg portion having a jacket sealing surface facing toward and contacting said inner second ring end of said backup ring and having an energizer contacting wall facing toward and contacting said energizer element, said energizer element being compressed between said energizer contacting wall and said energizer compressing wall and loading said jacket sealing surface into contact with said inner second ring end of said backup ring, said second leg portion of said telescoping jacket having an energizer supporting wall facing toward said energizer element and having a supported wall facing generally radially inward toward and adjoining said jacket support wall, said second leg portion being interposed between at least part of said energizer element and at least part of said jacket support wall.

12. The sealing assembly of claim 9, wherein said backup ring has a bearing liner composed of bearing material and forming at least part of said ring inner surface of said backup ring and forming at least part of said inner first ring end of said backup ring, and forming said extrusion gap corner, and said backup ring has a relief bore facing radially inward toward said shaft element and located in intermediate relation to said bearing liner and said inner second ring end.

13. The sealing assembly of claim 11, wherein said inner balancing seal groove has a reinforcing wall of generally conical form located between said jacket support wall and said energizer compressing wall and facing generally toward said energizer element, and said second leg portion in spaced apart from and in non-contacting relationship with said reinforcing wall.

14. The sealing assembly of claim 9, wherein a fluid communication passageway having oppositely facing first and second open ends passes in a generally axial direction through said backup ring, said first open end facing away from said bulkhead housing and located in radially intermediate location to said ring first end seal and said annular extension, and said second open end opening toward said bulkhead housing and located in radially intermediate relation to said inner and outer balancing seals, said fluid communication passageway communicating said first fluid pressure to said projection outer surface.

15. A sealing assembly comprising:
a bulkhead housing of annular form having at least one locating shoulder facing in a generally axial direction and having a shaft passageway of annular form and facing generally radially inward, said shaft passageway being the innermost surface of said bulkhead housing;
a ring retainer of annular form having a retaining shoulder facing in a generally axial direction toward said locating shoulder of said bulkhead housing;
a backup ring of generally circular form comprised of a steel ring portion and a bearing liner, at least a portion of said backup ring located between said retaining shoulder of said ring retainer and said locating shoulder of said bulkhead housing, said backup ring having an outer first ring end with at least a portion thereof facing and adjoining said retaining shoulder and facing in a generally axial direction away from said locating shoulder, and having an inner first ring end facing in a generally axial direction away from said locating shoulder, and having at least one second ring end with at least a portion thereof facing and adjoining said locating shoulder, said outer first ring end and said second ring end facing in generally opposite directions, and said inner first ring end and said second ring end facing in generally opposite directions;
an annular extension protruding axially from said backup ring at a radially intermediate location to said outer first ring end and said inner first ring end and forming at least a portion of a generally radially inward facing gland bore,
said backup ring having a ring inner surface facing generally radially inward, and having a ring outer surface facing generally radially outward and located in axially intermediate location to said outer first ring end and said second ring end;
a shaft element having an externally oriented sealing surface of generally cylindrical form that is smaller in diameter than said ring inner surface, at least part of said sealing surface located within and encircled by said annular extension of said backup ring, at least part of said sealing surface located within and encircled by said ring inner surface of said backup ring and establishing a region of clearance therewith, and at least part of said shaft element located within and encircled by said shaft passageway of said bulkhead housing;
an intersection between said inner first ring end and said ring inner surface of said backup ring forming an extrusion gap corner, said outer first ring end being separated from said second ring end by an axial distance, and said extrusion gap corner being separated from said second ring end by an axial distance, said axial distance separating said extrusion gap corner from said second ring end being less than said axial distance separating said outer first ring end from said second ring end, and said extrusion gap corner is an external corner and located in axially intermediate relation to said outer first ring end and said second ring end;
said steel ring portion of said backup ring having a liner recess bore, a liner recess shoulder, and a relief bore, said liner recess bore and said relief bore facing radially inward toward said shaft element and said liner recess shoulder facing in a generally axial direction toward said inner first ring end, said bearing liner having a liner peripheral surface facing radially outward toward and contacting said liner recess bore, and having a second liner end facing in a generally axial direction toward said liner recess shoulder and away from said inner first ring end, said relief bore being located in axially intermediate location to said second liner end and said second ring end and having radial clearance with said shaft element, said bearing liner forming said extrusion gap corner and forming at least part of said ring inner surface;
a pressure-retaining seal located at least partially within said gland bore of said backup ring and in sealing contact with said backup ring and with said sealing surface of said shaft element and partitioning a first fluid having a first fluid pressure from a second fluid having a second fluid pressure, at least a portion of said gland bore encircling a part of said sealing surface;
inner and outer balancing seals located radially outward of and encircling said shaft element and contacting said bulkhead housing and said backup ring and preventing the escape of said first fluid between said bulkhead housing and said backup ring and into said second fluid, said bearing liner forming at least part of said inner first ring end and contacting and supporting at least part of said pressure-retaining seal; and
a ring first end seal contacting and providing sealing between said ring retainer and said backup ring, partitioning said first fluid and said first fluid pressure from said second fluid and said second fluid pressure, and preventing said first fluid from escaping between said retaining shoulder and said outer first ring end and into said second fluid, said ring first end seal located radially outward from and encircling at least part of said gland bore and located radially outward from and encircling at least part of said pressure-retaining seal.

16. The sealing assembly of claim 15, wherein said bulkhead housing has an inner balancing seal groove of annular form opening toward said backup ring and including a jacket support wall, an energizer compressing wall, and an energizer positioning wall, said jacket support wall facing generally radially outward toward said energizer positioning wall, said energizer positioning wall facing generally radially inward toward said jacket support wall, and said energizer compressing wall facing in a generally axial direction toward said backup ring;

said inner balancing seal comprising an energizer element composed at least in part from elastomer and a telescoping jacket composed at least in part from plastic, said telescoping jacket having a first leg portion extending in a radial direction and a second leg portion extending in a generally axial direction, said first leg portion having a jacket sealing surface facing toward and contacting said backup ring and having an energizer contacting wall facing toward and contacting said energizer element, said energizer element compressed between said energizer contacting wall and said energizer compressing wall and loading said jacket sealing surface against said backup ring, said second leg portion having an energizer supporting wall facing generally toward said energizer element and having a supported wall facing radially inward toward and adjoining said jacket support wall, said second leg portion interposed between at least part of said energizer element and at least part of said jacket support wall.

17. The sealing assembly of claim 16, wherein said inner balancing seal groove has a reinforcing wall of generally conical form located between said jacket support wall and said energizer compressing wall and facing generally toward said energizer element.

18. The sealing assembly of claim 16, wherein said second leg portion extends from said energizer contacting wall, and the farther said second leg portion extends from said energizer contacting wall, the radially thinner said second leg portion becomes.

19. The sealing assembly of claim 15, wherein said sealing surface of said shaft element passes completely through said relief bore.

20. A sealing assembly comprising:
    a bulkhead housing of annular form having at least one locating shoulder facing in a generally axial direction;
    a first fluid having a first fluid pressure and a second fluid having a second fluid pressure;
    a shaft element being relatively movable with respect to said bulkhead housing and defining a radially outward oriented sealing surface of generally cylindrical form;
    a ring retainer of annular form located radially outward of and encircling at least a portion of said sealing surface of said shaft element, said ring retainer defining a retaining shoulder facing generally toward said locating shoulder of said bulkhead housing and separated from said locating shoulder by an axial dimension, said ring retainer having a radially inward facing surface forming an annular receiving recess located in radially spaced relation to said sealing surface and encircling at least part of said sealing surface, said locating shoulder of said bulkhead housing facing generally toward said retaining shoulder;
    a backup ring of generally circular form located axially by said retaining shoulder and said locating shoulder, and having an outer first ring end with at least a portion thereof facing and adjoining said retaining shoulder and having at least one second ring end having at least a portion thereof facing and adjoining said locating shoulder, said outer first ring end and said second ring end facing in generally opposite directions, said backup ring having a ring inner surface that is larger in diameter than, and facing generally radially inward toward, said sealing surface and establishing an extrusion gap clearance therewith and a bearing relationship therewith locating said backup ring radially, said backup ring having a ring outer surface facing generally radially outward and located in axially intermediate relation to said retaining shoulder and said locating shoulder, said outer first ring end located radially outward of and encircling at least a portion of said sealing surface, at least part of said sealing surface located within said ring inner surface;
    an annular extension protruding axially from said backup ring at a location radially intermediate to said outer first ring end and said ring inner surface, a surface of said annular extension forming at least part of a gland bore facing generally radially inward toward, encircling, and separated radially from said sealing surface, at least a portion of said annular extension located within and encircled by said annular receiving recess of said ring retainer and at least part of said annular extension encircled by said retaining shoulder;
    an inner first ring end of said backup ring located in radially intermediate relation to said annular extension and said sealing surface and located radially outward of and encircling a portion of said sealing surface;
    said annular extension located radially in intermediate location to said inner first ring end and said outer first ring end;
    a pressure-retaining seal of annular form located at least partially within said gland bore and having sealing contact with said backup ring and with said sealing surface of said shaft element and partitioning said first fluid from said second fluid;
    a ring first end seal contacting and providing sealing between said ring retainer and said backup ring, partitioning said first fluid and said first fluid pressure from said second fluid and said second fluid pressure, and preventing said first fluid from escaping between said retaining shoulder and said outer first ring end and into said second fluid, said ring first end seal located radially farther than said pressure-retaining seal from said sealing surface and located radially outward from and encircling said sealing surface and located radially outward from said pressure-retaining seal;
    said pressure-retaining seal and said ring first end seal defining a first hydraulic area exposed to said first fluid pressure, said first fluid pressure acting over said first hydraulic area and producing an axially oriented first hydraulic force acting on said backup ring in a first hydraulic force direction generally toward said locating shoulder of said bulkhead housing;
    inner and outer balancing seals exposed to and located between said first and second fluids and contacting and providing sealing between said backup ring and said bulkhead housing, partitioning said first fluid and said first fluid pressure from said second fluid and said second fluid pressure, and preventing said first fluid from escaping between said backup ring and said bulkhead housing and into said second fluid;
    a portion of said bulkhead housing radially inward of said inner balancing seal exposed to said second fluid and said second fluid pressure, a portion of said bulkhead housing radially outward of said inner balancing seal and radially inward of said outer balancing seal exposed to said first fluid and said first fluid pressure;
    said inner and outer balancing seals defining a second hydraulic area exposed to said first fluid pressure, said first fluid pressure acting over said second hydraulic area and producing a second axially oriented hydraulic force acting on said backup ring in a second hydraulic force direction generally toward said retaining shoulder of said ring retainer;

said bulkhead housing having an outer balancing seal groove of annular form opening in a generally axial direction toward said backup ring and including a jacket support wall, an energizer compressing wall, and an energizer positioning wall, said jacket support wall facing generally radially inward toward said energizer positioning wall, said energizer positioning wall facing generally radially outward toward said jacket support wall, and said energizer compressing wall facing in a generally axial direction toward said backup ring;

said outer balancing seal comprising an energizer element composed at least in part from elastomer and a telescoping jacket composed at least in part from plastic, said telescoping jacket having a first leg portion extending in a radial direction and a second leg portion extending in a generally axial direction, said first leg portion having a jacket sealing surface facing toward and contacting and establishing a sealing interface with said backup ring and having an energizer contacting wall facing toward and contacting and establishing a sealing interface with said energizer element, a part of said first leg portion being exposed to and contacted by said first fluid, said energizer element compressed in a generally axial direction between said energizer contacting wall and said energizer compressing wall and loading said jacket sealing surface against said backup ring, said second leg portion having a energizer supporting wall facing toward said energizer element and having a supported wall facing generally radially outward and adjoining said jacket support wall, said second leg portion interposed between at least part of said energizer element and at least part of said jacket support wall.

21. The sealing assembly of claim 20, wherein said second leg portion extends from said energizer contacting wall, and the farther said second leg portion extends from said energizer contacting wall, the radially thinner said second leg portion becomes.

22. The sealing assembly of claim 20, wherein an intersection between said inner first ring end and said ring inner surface of said backup ring forming an extrusion gap corner, said backup ring has a bearing liner composed of bearing material and forming at least part of said ring inner surface of said backup ring and forming said extrusion gap corner.

23. The sealing assembly of claim 20, wherein prior to final assembly, said second leg portion of said telescoping jacket telescopes into said outer balancing seal groove, overlapping said jacket support wall and radially positioning said telescoping jacket.

24. The sealing assembly of claim 20, wherein said bulkhead housing has a first leg relief surface located radially inward of said outer balancing seal groove and facing in a generally axial direction toward said backup ring, said first leg relief surface being axially offset from said backup ring by an offset axial distance, said first leg portion of said telescoping jacket having an axial thickness that is no greater than said offset axial distance, and the axial offset of said first leg relief surface producing a first leg relief space for said first leg portion of said telescoping jacket of said outer balancing seal.

25. A sealing assembly comprising:
first and second machine components;
said first machine component having a seal groove of annular form opening in a generally axial direction toward said second machine component and including a jacket support wall, an energizer compressing wall, and an energizer positioning wall, said jacket support wall and said energizer positioning wall oriented generally radially and generally facing one another, and said energizer compressing wall facing in a generally axial direction toward said second machine component;

a seal located at least partially within said seal groove and comprising an energizer element composed at least in part from elastomer and a telescoping jacket composed at least in part from plastic, said seal retaining a first fluid;

said telescoping jacket having a first leg portion extending in a radial direction, said first leg portion having a jacket sealing surface facing generally axially toward and contacting and establishing a sealed relationship with said second machine component and having an energizer contacting wall facing generally axially toward and contacting and establishing a sealed relationship with said energizer element, said energizer element compressed between said energizer contacting wall and said energizer compressing wall and loading said jacket sealing surface against said second machine component, part of said first leg portion being exposed to said first fluid;

said telescoping jacket having a second leg portion joined to said first leg portion, said second leg portion extending in a generally axial direction and having an energizer supporting wall facing generally toward said energizer element and having a supported wall facing generally radially and adjoining said jacket support wall, said second leg portion interposed between at least part of said energizer element and at least part of said jacket support wall.

26. The sealing assembly of claim 25, wherein said seal groove further comprises a reinforcing wall of generally conical form located between said jacket support wall and said energizer compressing wall and facing generally toward said energizer element, said second leg portion being located radially outward from and encircling at least a portion of said jacket support wall and said energizer element being located radially outward from and encircling at least a portion of said jacket support wall, at least a portion of said energizer element being located radially inward from and encircled by said energizer positioning wall, the second leg portion being spaced apart from said reinforcing wall.

27. The sealing assembly of claim 25, wherein said seal groove has a reinforcing wall of generally conical form located between said jacket support wall and said energizer compressing wall and facing generally toward said energizer element, the farther said second leg portion extends from said first leg portion, the radially thinner said second leg portion becomes, said second leg portion being separated axially from and in non-contacting relationship with said reinforcing wall.

28. The sealing assembly of claim 27, wherein said seal groove has a reinforcing wall of generally conical form located between said jacket support wall and said energizer compressing wall and facing generally toward said energizer element, said energizer supporting wall is generally conical, said second leg portion being separated axially from and in non-contacting relationship with said reinforcing wall.

29. The sealing assembly of claim 25, wherein prior to final assembly, said second leg portion of said telescoping jacket telescopes into said seal groove, overlapping said jacket support wall and aligning said telescoping jacket with said seal groove.

30. The sealing assembly of claim 25, wherein said jacket support wall faces in a generally radially outward direction, said energizer positioning wall faces in a generally radially inward direction, and said supported wall of said second leg portion faces in a generally radially inward direction.

31. The sealing assembly of claim 25, wherein said jacket support wall faces in a generally radially inward direction, said energizer positioning wall faces in a generally radially outward direction, and said supported wall of said second leg portion faces in a generally radially outward direction.

32. The sealing assembly of claim 25, wherein said first machine component further comprises a first leg relief surface facing in a generally axial direction toward said second machine component, said first leg relief surface axially offset from said second machine component by an offset axial distance creating a first leg relief space between said first and second machine components, and said first leg portion of said telescoping jacket having an axial thickness and said axial thickness being no more than said offset axial distance.

33. The sealing assembly of claim 25, wherein said first leg portion being interposed between said energizer element and said second machine component and separating said energizer element from said second machine component, no part of said energizer element contacting said second machine component.

34. The sealing assembly of claim 25, wherein said jacket sealing surface is generally parallel to said energizer contacting wall.

35. The sealing assembly of claim 20, wherein said first leg portion is interposed between and separates said energizer element from said backup ring, no part of said energizer element contacting said backup ring.

36. The sealing assembly of claim 20, wherein said jacket sealing surface is generally parallel to said energizer contacting wall.

* * * * *